United States Patent
Ishihara

(10) Patent No.: US 7,839,552 B2
(45) Date of Patent: Nov. 23, 2010

(54) OPTICAL SCANNING DEVICE AND IMAGE DISPLAY APPARATUS USING THE SAME

(75) Inventor: Keiichiro Ishihara, Yokohama (JP)

(73) Assignee: Canon Kabushiki Kaisha (JP)

( * ) Notice: Subject to any disclaimer, the term of this patent is extended or adjusted under 35 U.S.C. 154(b) by 4 days.

(21) Appl. No.: 11/317,919

(22) Filed: Dec. 22, 2005

(65) Prior Publication Data
US 2006/0139718 A1    Jun. 29, 2006

(30) Foreign Application Priority Data
Dec. 24, 2004    (JP) .............................. 2004-373920

(51) Int. Cl.
G02B 26/08    (2006.01)
G02B 26/10    (2006.01)
G02B 26/12    (2006.01)
(52) U.S. Cl. ............... 359/206.1; 359/207.3; 359/207.5
(58) Field of Classification Search ................ 359/205, 359/206.1
See application file for complete search history.

(56) References Cited

U.S. PATENT DOCUMENTS

| | | | |
|---|---|---|---|
| 4,108,532 A | | 8/1978 | Minoura |
| 4,253,724 A | * | 3/1981 | Minoura et al. ............. 359/206 |
| 4,861,983 A | * | 8/1989 | Sasada et al. ................ 250/235 |
| 5,009,472 A | * | 4/1991 | Morimoto ................... 359/206 |
| 5,107,364 A | * | 4/1992 | Morimoto et al. ........... 359/212 |
| 5,715,078 A | * | 2/1998 | Shiraishi .................. 359/204.1 |
| 6,626,542 B2 | | 9/2003 | Yamamoto et al. |
| 6,775,039 B2 | * | 8/2004 | Sakai .......................... 359/198 |
| 6,937,372 B2 | * | 8/2005 | Kandori et al. ............. 359/198 |
| 7,182,466 B2 | | 2/2007 | Sunaga |
| 7,242,506 B2 | * | 7/2007 | Kandori et al. ............. 359/202 |
| 2002/0163702 A1 | * | 11/2002 | Hori et al. ................... 359/204 |

FOREIGN PATENT DOCUMENTS

EP    0 285 097    10/1988

(Continued)

OTHER PUBLICATIONS

Hecht, Eugene, Optics, 2002, Pearson Education, Inc., Fourth Edition, 162.*

(Continued)

*Primary Examiner*—Stephone B Allen
*Assistant Examiner*—Jade R Chwasz
(74) *Attorney, Agent, or Firm*—Rossi, Kimms & McDowell LLP

(57) ABSTRACT

An optical scanning device, which comprises a light source unit, a scanning unit for scanning a scanning surface with a light from the light source unit in a first direction and a second direction orthogonal to the first direction, and an optical unit for guiding the scanning light onto the scanning surface. The scanning unit has a deflection surface which sine-wave-drives in the first direction. The optical unit has an optical surface whose arbitrary cross section in the first direction has a shape where a second order derivative of the function representing a shape of the cross section changes so as to diverge a light stronger as toward the periphery from the center. And the optical surface is configured by arranging the shape of each cross section in the first direction in the second direction.

17 Claims, 35 Drawing Sheets

FOREIGN PATENT DOCUMENTS

| | | | |
|---|---|---|---|
| EP | 1 450 558 A1 | | 8/2004 |
| EP | 1450558 A1 | * | 8/2004 |
| JP | 5-53051 | | 3/1993 |
| JP | 05173087 A | * | 7/1993 |
| JP | 11-084291 A | | 3/1999 |
| JP | 2001-281583 A | | 10/2001 |
| JP | 2002-296503 A | | 10/2002 |
| JP | 2003-075767 A | | 3/2003 |
| JP | 2003-279879 | | 10/2003 |

OTHER PUBLICATIONS

Korean Office Action dated Jun. 18, 2007 for Korean counterpart application No. 10-2005-0128536 (without English translation).
Notification of the First Office Action dated Feb. 2, 2007 issued for Chiniese counterpart application No. 200510134082.X (English translation).
European Search Report dated Feb. 14, 2006.
Communication from European Patent Office dated Feb. 24, 2006.

* cited by examiner

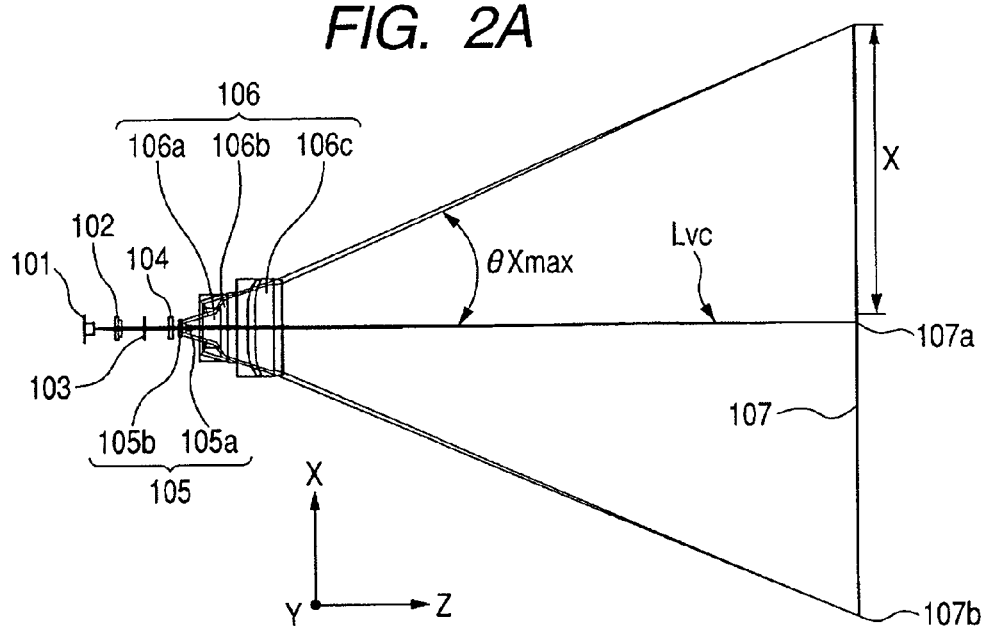
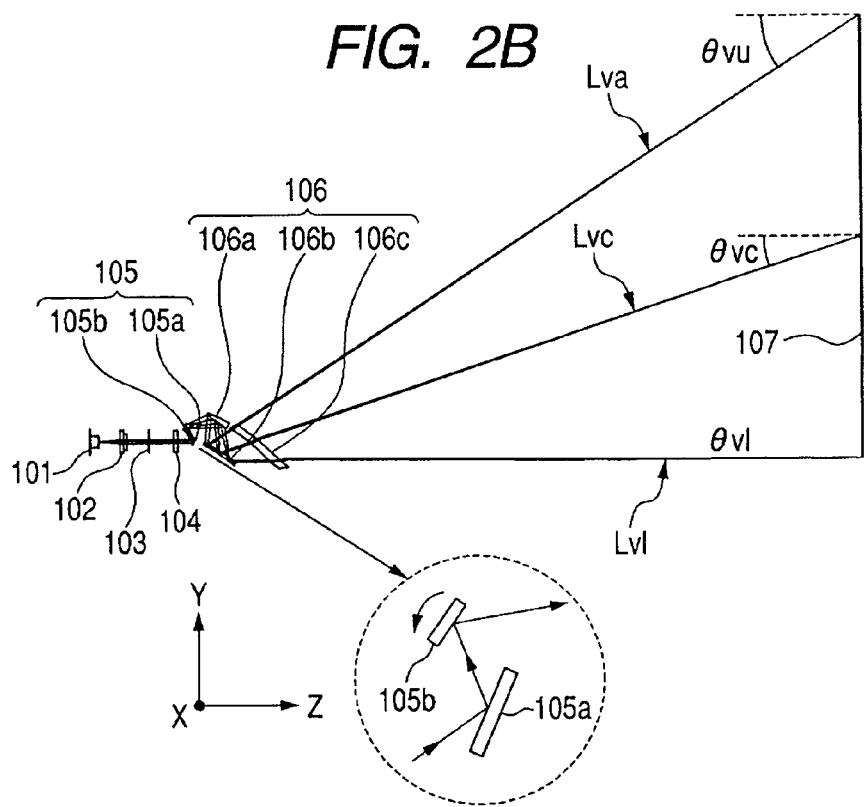

BENDING OF SCANNING LINE

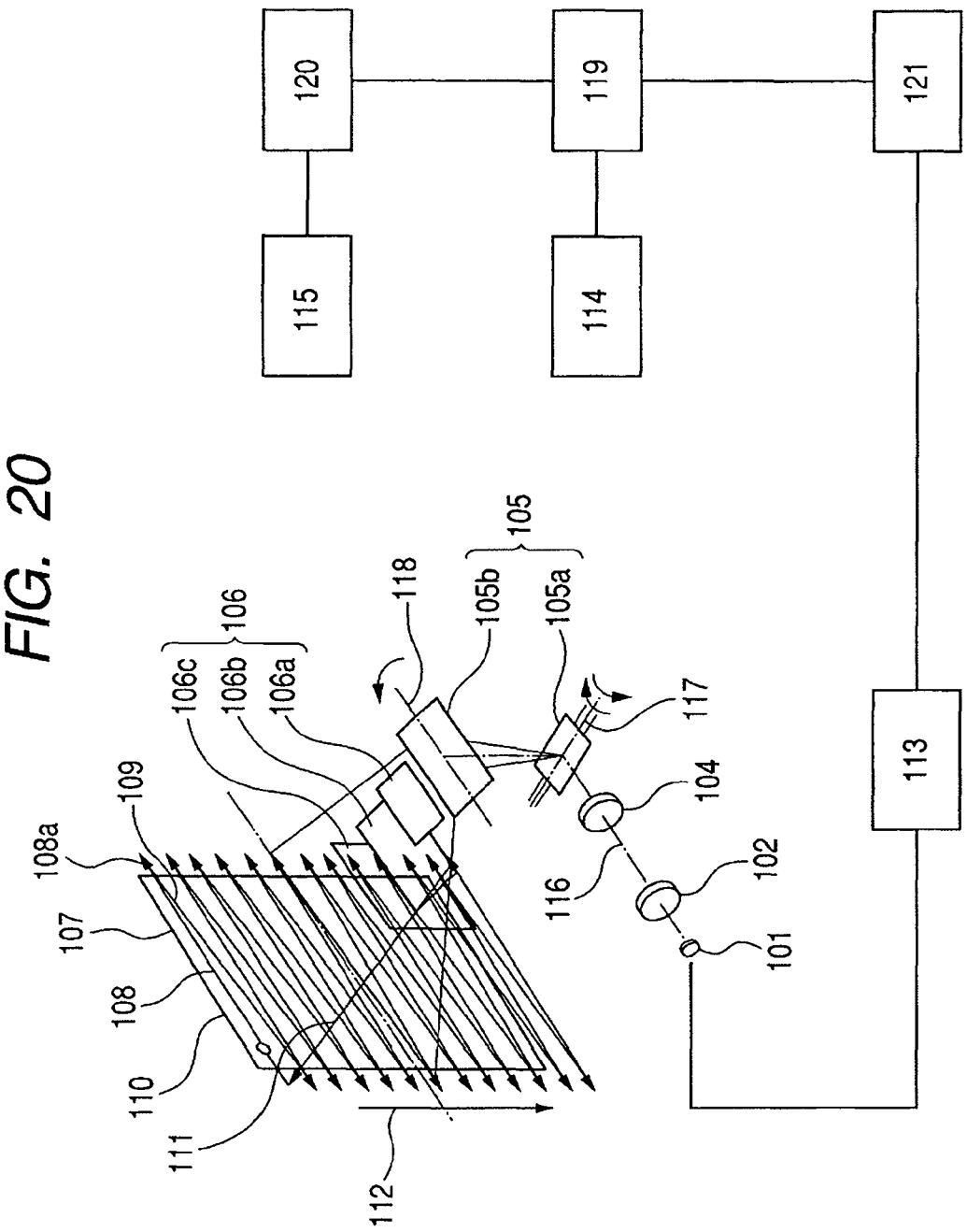

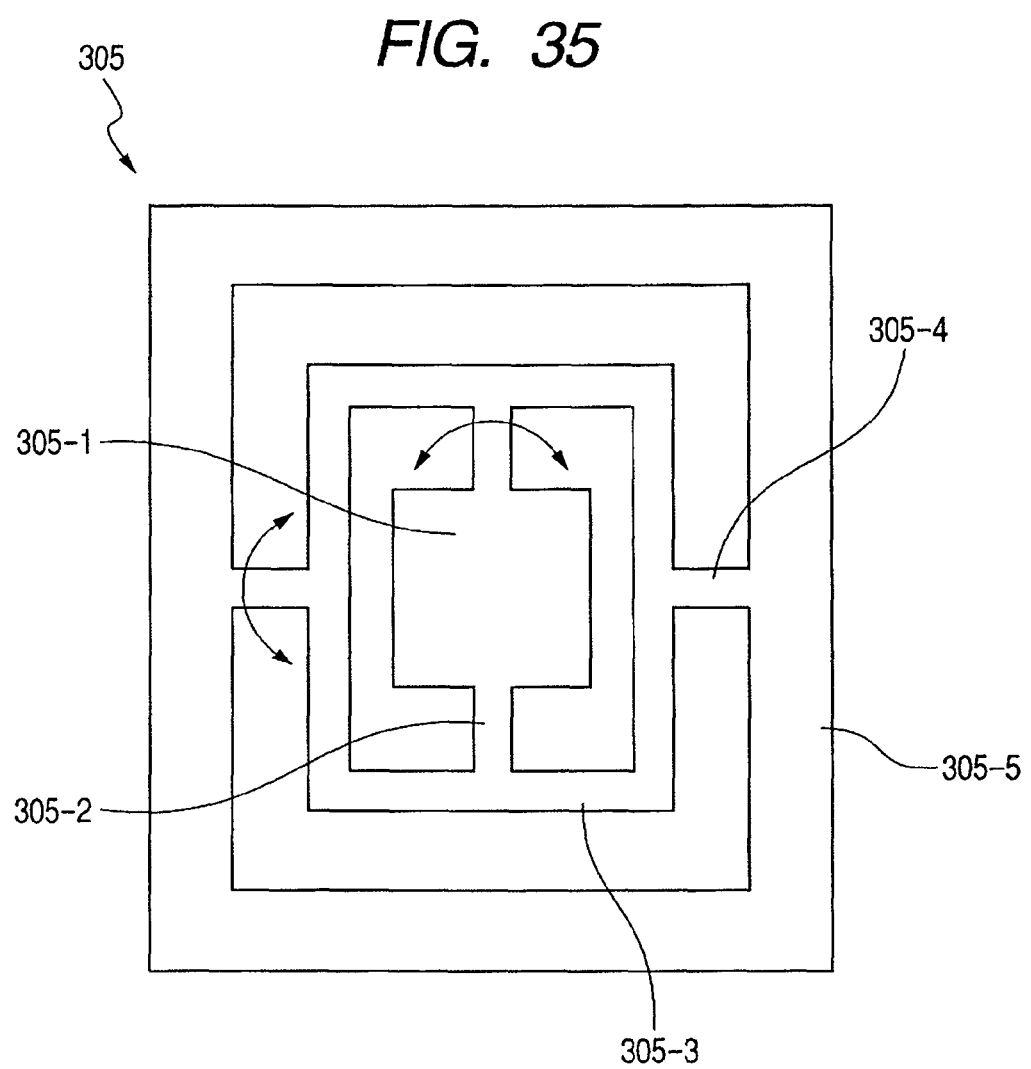

OPTICAL SCANNING DEVICE AND IMAGE DISPLAY APPARATUS USING THE SAME

BACKGROUND OF THE INVENTION

1. Field of the Invention

The present invention relates to an optical scanning device and a scanning type image display apparatus using the same, and in particular, it projects and displays a two-dimensional image on a scanning surface, for example, a screen surface by two-dimensionally scanning a light by a scanning device.

2. Description of the Related Art

A variety of optical scanning devices have been proposed, in which a spot (beam spot) of the light beam emitted from a light source is two-dimensionally optically scanned on a scanning surface, and by the residual image effect, a two-dimensional image is formed (for example, see Japanese Patent Application Laid-Open Nos. 2001-281583 and H11-84291)

In the optical scanning device, as means to scan the light beam from the light source, a polygon mirror, a galvanic mirror, a MEMS device prepared by a MEMS (Micro Electron Mechanical Systems) technology, and the like have been used.

In case the scanning device with sine-wave drive such as the galvanic mirror, the MEMS device, and the like is used, there has been generally known that a speed to optical-scan on the scanning surface becomes slow on the periphery.

Further, there has been generally known that when the optical scan is two-dimensionally performed by using such a scanning device, a scanning distortion is generated on the two-dimensional image formed on the scanning surface.

To display the two-dimensional image in high quality, it is necessary to suitably correct the scanning distortion.

A scanning optical system (image forming optical system) disclosed in Japanese Patent Application Laid-Open No. 2001-281583 includes an optical member having at least two reflecting surfaces including a rotational asymmetrical surface. The surface on the nearest side to the scanning surface from among the surfaces having optical power of the optical member has transmission action only.

By using this scanning optical system, an attempt is made to miniaturize the optical system by folding effect. Further, by having used the reflecting surface having optical power, though coma astigmatism due to decentering, and the like are generated, this decentration aberration is corrected by a rotational asymmetrical surface shape. Further, in case the polygon mirror is used as the scanning device, the scanning optical system is allowed to have an fθ characteristic, and in case the scanning device with sine-wave drive such as the galvanic mirror and the like is used, the scanning optical system is allowed to have an f arcsine θ characteristic. In this manner, the beam spot is constant-speed scanned on the surface to be scanned.

In the optical scanning device disclosed in Japanese Patent Application Laid-Open No. 2001-281583, when an attempt is made to secure both of a two-dimensional translatory scanning property and a constant speed scanning property by the optical characteristic of the scanning optical system, the optical system becomes complicated and large-sized. Hence, in Japanese Patent Application Laid-Open No. 2001-281583, the translatory scanning property is secured by the optical characteristic of the scanning optical system, and the constant speed scanning property is secured by electrical correction.

In this manner, in case the constant speed scanning property is secured by electrical correction, the intervals of pixels become unequal, and therefore, a control of newly prescribing pixel timing is required. Further, the number of clocks is required several times larger than ordinarily required or more, and a load applied on the electrical circuit is increased.

Further, since light quantity distribution on the scanning surface is in a relationship of inversely proportional to the optical scanning speed, unevenness in light quantity is generated so as to degrade the appearance quality of the image.

SUMMARY OF THE INVENTION

An object of the present invention is to provide an optical scanning device capable of highly accurately scanning on a scanning surface at constant speed when an optical scanning is two-dimensionally performed on the scanning surface by using a scanning device to sine-wave drive.

The illustrative optical scanning device of the present invention comprises a light source unit, a scanning unit scanning the scanning surface with the light from the light source unit in a first direction and a second direction orthogonal to the first direction, and an optical unit guiding the scanning light onto the scanning surface. The scanning unit has a deflection surface with sine-wave drive in the first direction. Further, the optical unit has an optical surface whose arbitrary cross section in the first direction has a shape where a second order derivative of the function representing a shape of the cross section changes so as to diverge a light stronger as toward the periphery from the center. And the optical surface is configured by arranging the shape of each cross section in the first direction in the second direction.

BRIEF DESCRIPTION OF THE DRAWINGS

FIGS. 2A and 2B are cross sectional views of the optical scanning device in the first embodiment;

FIG. 20 is a main part schematic diagram of a scanning type image display apparatus in the first embodiment;

FIG. 35 is a main part schematic diagram of a secondary dimensional deflector in a third embodiment;

DETAILED DESCRIPTION OF THE PREFERRED EMBODIMENTS

Embodiments of an optical scanning device of the present invention will be described below with reference to the drawings.

First Embodiment

Figure 1A:
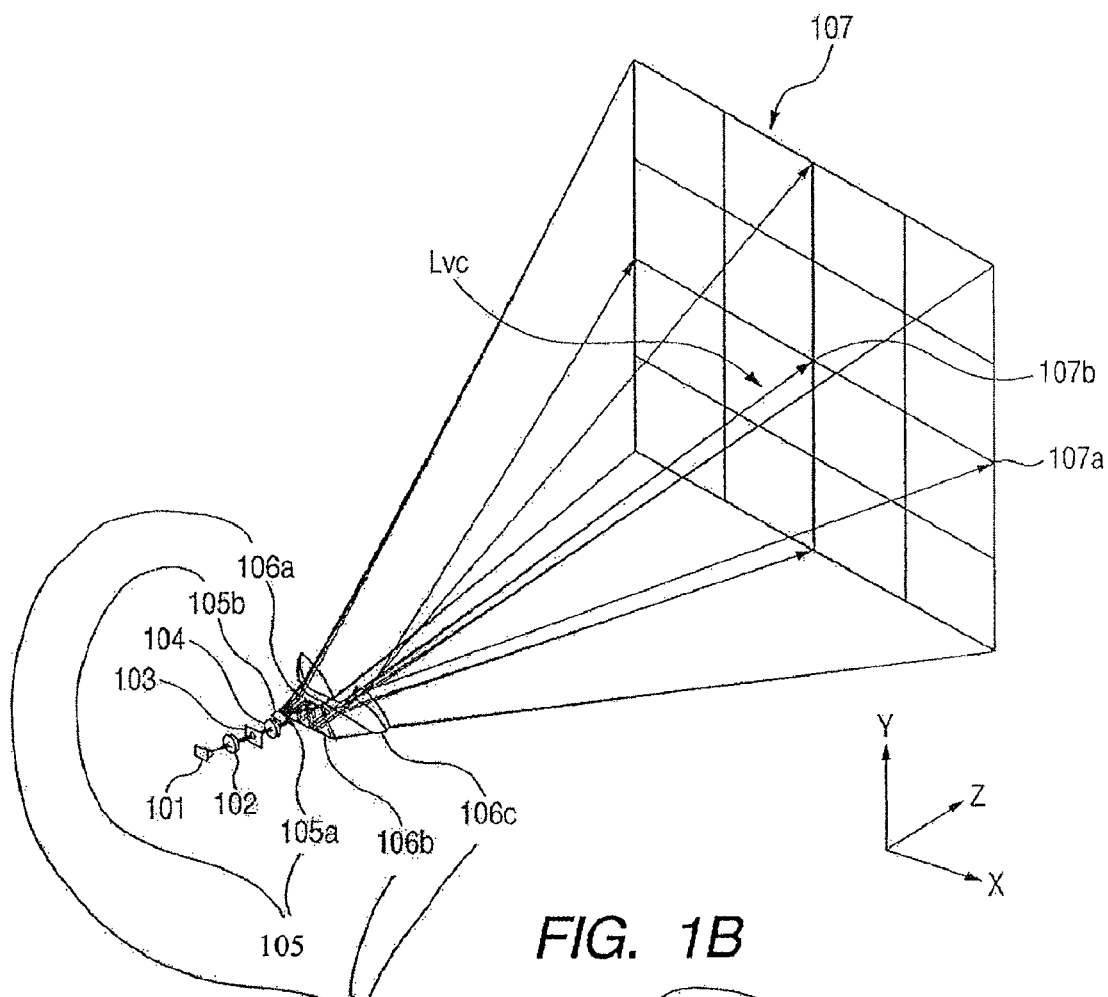
FIGS. 1A and 1B are perspective views of an optical scanning device in a first embodiment.
Figure 1B:
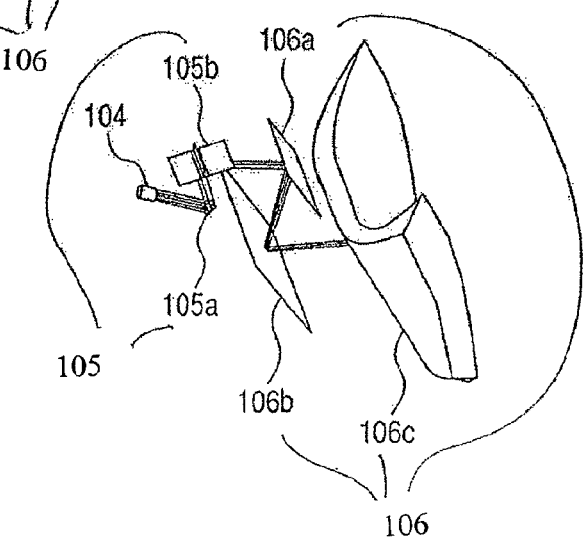

FIGS. 1A and 1B are main part perspective views respectively of an optical scanning device of a first embodiment, and an enlarged perspective view of a portion.

FIG. 2A is a main part cross sectional view (horizontal scanning cross sectional view, XZ cross sectional view) in a horizontal scanning direction (first scanning direction) of the optical scanning device of a first embodiment. FIG. 2B is a main part cross sectional view (vertical scanning cross sectional view, YZ cross sectional view) in a vertical scanning direction (second scanning direction) of the optical scanning device of the first embodiment.

In FIGS. 1A, 1B, 2A, and 2B, reference numeral 101 denotes a light source unit comprising a semiconductor laser, for example, radiating a red color light. The light source unit 101 emits an optically modulated light beam based on image information. A divergent light beam emitted from the light source unit 101 is converted into an approximately parallel light beam by a condenser lens 102, and is further limited in light beam width by an aperture-stop 103.

The light beam having passed through the aperture-stop 103 is converted into a convergent light beam having a desired convergence degree by a convergence optical system 104, and becomes an incident light beam to enter a scanning unit 105 to be described later.

Reference numeral 105 denotes a scanning unit, and for example, comprises a first deflector 105a resonatable in one dimensional direction and a second deflector 105b deflectable constant angular speed wise. The scanning unit 105 scans a scanning surface with the light beam emitted from the light source unit 101 in the horizontal scanning direction by the first deflector 105a, and by scanning the scanning surface with the light beam from the first deflector 105a further in a vertical scanning direction by the second deflector 105b, the scanning unit 105 scans the scanning surface with the light beam emitted from the light source unit 101 in a secondary dimensional direction.

Reference numeral 106 denotes a scanning optical system (two-dimensional scanning optical system in the case of the first embodiment) constituted by two mirrors 106a and 106b and a lens 106c. The scanning optical system 106 image-shapes the light beam to be scanned in the two-dimensional direction by the scanning unit 105 as a spot on a scanning surface 107 or in its vicinity. The light beam deflected by the scanning unit 105 is guided onto the scanning surface 107 through the two-dimensional scanning optical system 106, and optically scans on the scanning surface 107, which is a screen. In this manner, a scanning line is drawn by optically scanning at high speed in the horizontal scanning direction by the first deflector 105a, and a two-dimensional image is displayed on the screen 107 by optically scanning at low speed in the vertical scanning direction by the second deflector 105b.

As shown in FIG. 2B, the light beam deflected by the first deflector 105a and the second deflector 105b is optically scanned on the screen 107 through the two-dimensional scanning optical system 106. At this time, from among light beams scanned in the two-dimensional direction by the scanning unit 105, the light of the field angle center which is a center of the horizontal scanning direction (X axis direction) and of the vertical scanning direction (Y axis direction) is defined as a reference light beam Lvc.

The scanning line in the horizontal scanning direction by the reference light beam Lvc is equivalent to an X axis, and the scanning line in the vertical direction is equivalent to a Y axis.

The surface including the reference light beam Lvc and the horizontal direction (X axis direction) is taken as a horizontal scanning cross section (first scanning cross section, XZ cross section), and the surface including the reference light beam Lvc and the vertical direction (Y axis direction) is taken as a vertical scanning cross section (a second scanning cross section, YZ cross section).

Figure 3:
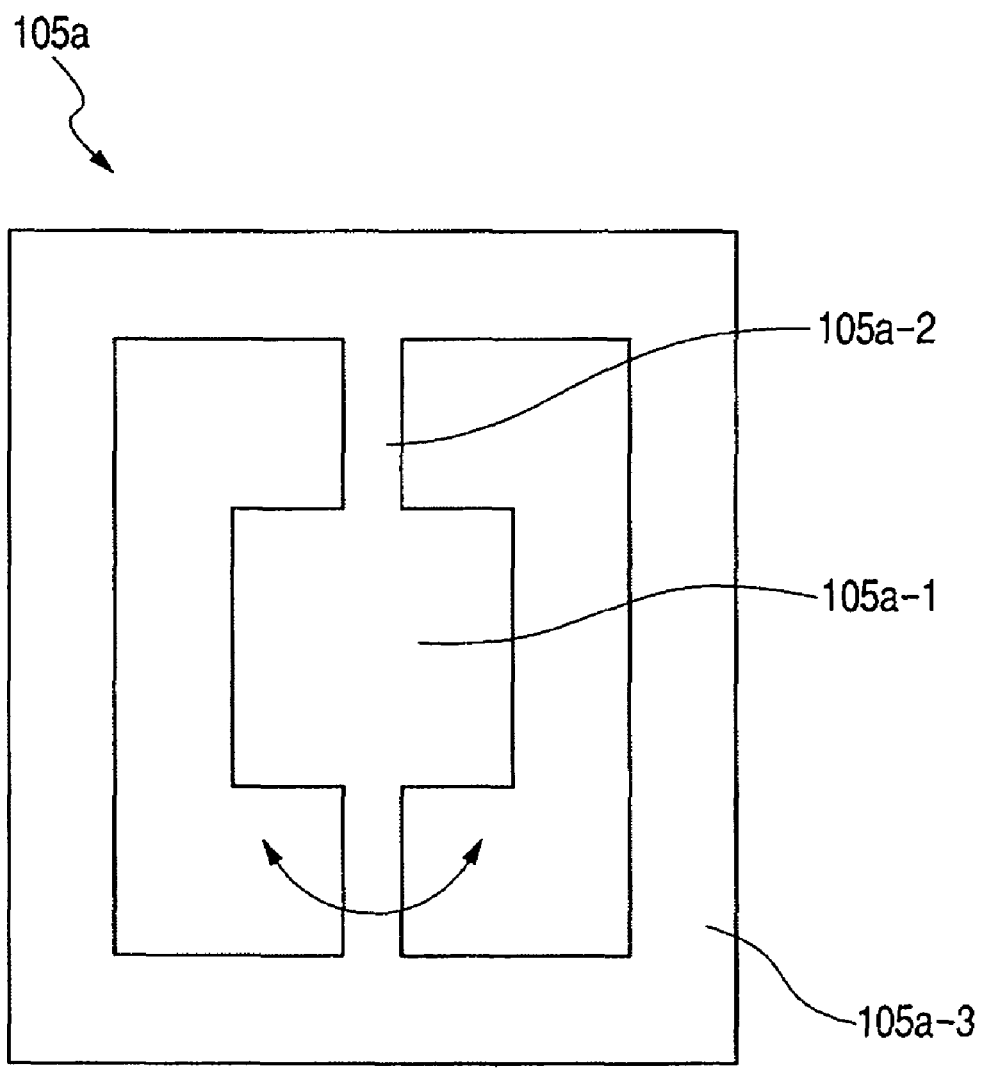
FIG. 3 is a main part schematic diagram of a MEMS device.

In the first embodiment, a MEMS device prepared by the MEMS (Micro Electron Mechanical Systems) technology is used for the first deflector 105a. FIG. 3 shows a main part schematic diagram of the MEMS device.

In FIG. 3, reference numeral 105a denotes the MEMS device which is the one-dimensional deflector. A reflecting surface (deflecting surface) 105a-1 is supported to a frame body 105a-3 by a torsion bar 105a-2, and is resonantly moved in the one-dimensional direction by reaction of a magnet provided in the rear face of the reflecting surface 105a-1 in accordance with a magnetic force generated from an unillustrated coil. The orientation of the MEMS device 105a is aligned so that the light beam is scanned in the horizontal scanning direction by this resonance movement.

Now, the deflector to make the resonance movement such as the MEMS device 105a has the orientation of the reflecting surface 105a-1 changed in the shape of sine-wave in the horizontal scanning direction. Hereinafter, this is referred to as a sine wave movement. In the sine wave movement, the angular speed of the reflecting surface 105a-1 changes like the cosine wave. Hence, the angular speed of the reflecting surface 105a-1 is most-fastest when the reflecting surface 105a-1 faces front, and when reaching the maximum amplitude at one end, the angular speed becomes 0, and begins to move toward the other end in a reverse direction. By repeating these movements, a reciprocating scanning is performed.

Each optical member in the optical scanning device of the first embodiment is disposed symmetrical in the horizontal scanning direction, and when the first deflector 105a faces front, the light beam reaches a center 107a in the horizontal scanning direction of the screen 107.

Here, an optical scanning speed is defined as the speed by which the light beam is optically scanned on the screen 107. The light scanning speed and the light quantity distribution on the screen 107 are in an inversely proportional relationship therebetween, and in the center 107a in the horizontal scanning direction of the screen 107 where the optical scanning speed is fastest, the light quantity becomes weak, and in the periphery 107b in the horizontal scanning direction of the screen 107 where the optical scanning speed is slowest, the light quantity becomes strong. In this manner, by the sine wave movement of the first deflector 105a, the optical scanning speed changes and the light quantity distribution on the screen 107 becomes non uniformity.

In the first embodiment, when an image is depicted on the screen 107, up to 90% of the maximum amplitude of the first deflector 105a is utilized. This means that the scanning efficiency is 90%. Hence, the optical scanning speed of the periphery on the screen 107 drops until 43.6% of the optical scanning speed of the center. Accompanied with this, the light quantity at the periphery becomes approximately 2.3 times that of the center, and unevenness in distribution of light quantity becomes remarkable, thereby degrading the appearance quality of the image.

Hence, in the first embodiment 1, by using the scanning optical system having an arcsine characteristic in the horizontal scanning direction, unevenness in distribution of light quantity is reduced.

The arcsine characteristic is referred to as a distortion of the scanning optical system, which converts the light beam deflected by the deflector with sine-wave drive to perform the optical scanning on the screen 107 at constant speed.

The scanning optical system having the arcsine characteristic is referred to as an optical system which satisfy the following Formula (1), $$x = 2 \times \varphi ox \times fx \times \sin^{-1}\left(\frac{\theta x}{2 \times \varphi ox}\right), \quad (1)$$

where X represents an image height in the horizontal scanning direction on the screen 107, fx represents a focal length in the horizontal scanning direction of the scanning optical system 106, θx represents a scanning angle (deflection angle) in the horizontal scanning direction of the first deflector 105a, φox represents the maximum deflection angle (amplitude) of the first deflector 105a.

In the first embodiment, fx=297 (mm) and φox=±10.5 (deg), and the field angle ωx of the scanning optical system 106 is ωx=±18.9 (deg).

A scanning efficiency Es (%) is the maximum value θxmax of the deflection angle actually used for the maximum deflection angle ωox of the first deflector 105a, and is represented by the following Formula (2).

$$Es = \left(\frac{\theta xmax}{\varphi ox}\right) \times 100$$

The invention according to in the first embodiment, the configuration is made so as to satisfy the following formula, $$0.7 \leq \frac{\theta xmax}{\varphi ox} \leq 0.95. \quad (2)$$

In the first embodiment, θxmax=±9.45 (deg) and φox=±10.5 (deg), and Es=90(%).

As evident from the Formula (1), the arcsine characteristic generates a negative distortion, and the higher the scanning efficiency Es is, the more difficult the correction of the distortion becomes. Particularly, when the scanning efficiency exceeds 70%, for the optical system (optical system satisfying the condition of x=f·tan θ) having an f·tan θ characteristic, it is necessary to expand the image height more than 10%, and the optical correction becomes extremely difficult.

Further, in the two-dimensional scanning optical system or the one-dimensional scanning optical system to simultaneously optically scan on plural scanning lines, it is necessary to secure the constant speed scanning property in the horizontal scanning direction in all the scanning lines on which the optical scanning is preformed on the screen. That is, the scanning optical system having a two-dimensional arcsine characteristic is required.

Next, the scanning optical system 106 will be described.

Figure 4A:
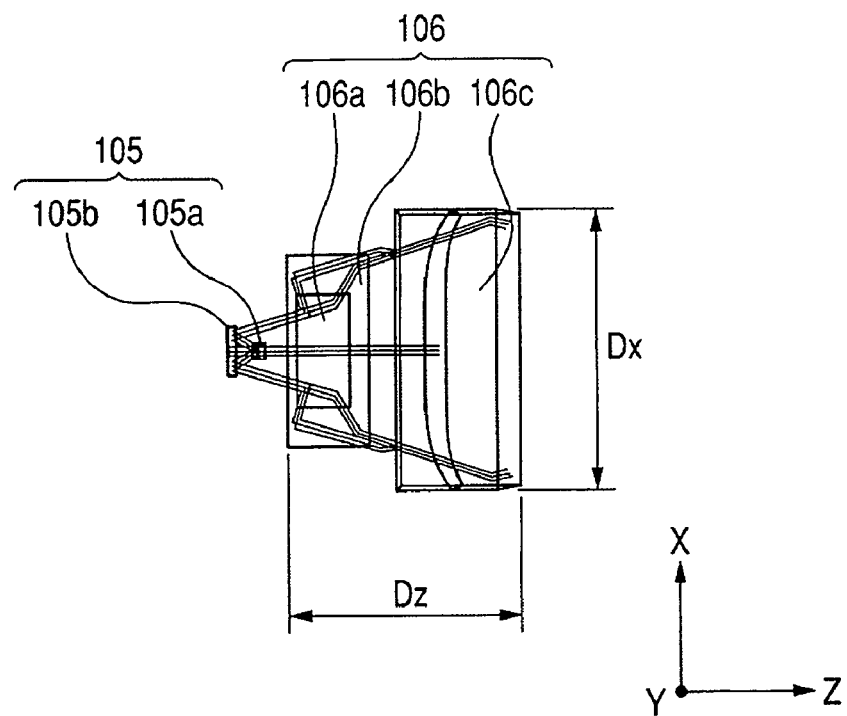
FIG. 4A and 4B are main part schematic diagrams of a two-dimensional scanning optical system in the first embodiment.
Figure 4B:
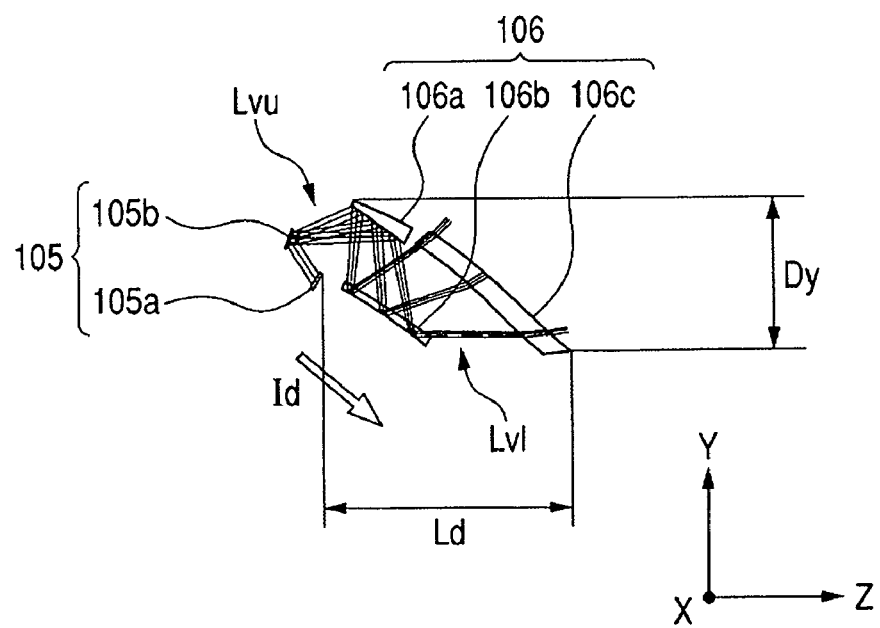

FIG. 4A shows a main part schematic diagram within the horizontal scanning cross section of the scanning optical system 106 in the optical scanning device of the first embodiment, and FIG. 4B shows a main part schematic diagram within the vertical scanning cross section.

The scanning optical system 106 is constituted by a first mirror 106a, a second mirror 106b, and a lens 106c. These lenses are disposed in order of the first 106a, the second mirror 106b, and the lens 106c according to the passage of the light beam from the scanning unit 105 side.

In FIGS. 1A and 1B, reference numeral 104 denotes a convergent optical system constituted by a condenser lens. This convergent optical system 104 has a positive optical power to converge the incident light beam at a position 121.6 (mm) away from the first deflector 105a. A distance L from the first deflector 105a to the scanning surface 107 is 278.0 (mm). A natural convergent point by the convergent optical system 104 is located between the first deflector 105a and the scanning surface 107. Further, the optical path length to the first deflector 105a and the final surface 106c of the scanning optical system 106 is 19.5 (mm) along the reference light beam Lvc. The natural convergent point as described above is located between the scanning optical system 106 and the scanning surface 107. The scanning optical system 106 has a negative optical power as a whole, and converts the light beam that ought to be converged short of the scanning surface 107 by the operation of the convergent optical system 104 into a weak convergent light beam so as to be condensed on the scanning surface 107 or in its vicinity.

A pupil of the scanning optical system 106 is located at the position of the scanning unit 105 or in its vicinity.

Table-1 shows various constituent numerical values of the constitution of the two-dimensional scanning optical system 106 in the first embodiment.

The light incident surface and light exit surface of the first and second mirrors 106a and 106b and the lens 106c of the first embodiment use an rotational asymmetrically shaped curved surface (so-called free curved surface) expressed by a XY polynomial equation as shown in the next Formula.

$$Z = \frac{\frac{Y^2}{R}}{1 + \sqrt{1 - (1+k) \times \left(\frac{Y}{R}\right)^2}} + \sum C_{mn} X^m Y^n \quad (a)$$

However,

R: paraxial curvature radius
K: Conic constant
Cmn: Coefficient of the term of $X^m Y^n$
m, n: Integer number Table 1 shows various numerical values of the first and second mirrors 106a and 106b. In Table 1, in case m and n are 10, they are expressed as t. For example, $C_{t0}$ is the coefficient of the term of $X^{10}$, and $C_{0t}$ is the coefficient of the term of $Y^{10}$.

In the free-formed curved surface of the first embodiment, though the terms of R and K are not used, there is no problem in particular. Naturally, even when the terms of R and K are used, there is no problem.

Figure 5:
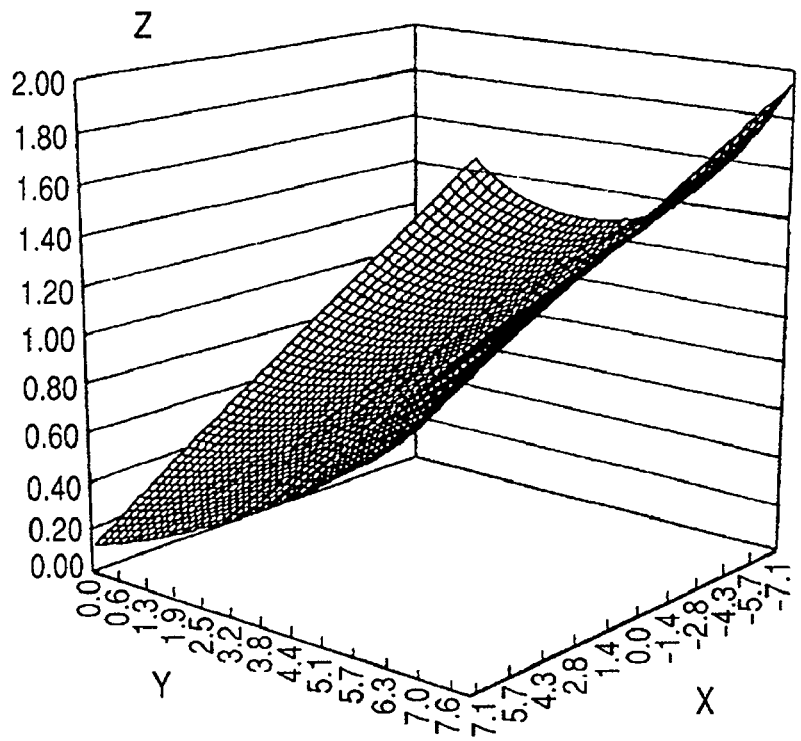
FIG. 5 is a main part schematic diagram of the shape of a first scanning mirror in the first embodiment.

FIG. 5 shows a surface shape of the first mirror 106a.

Figure 6:
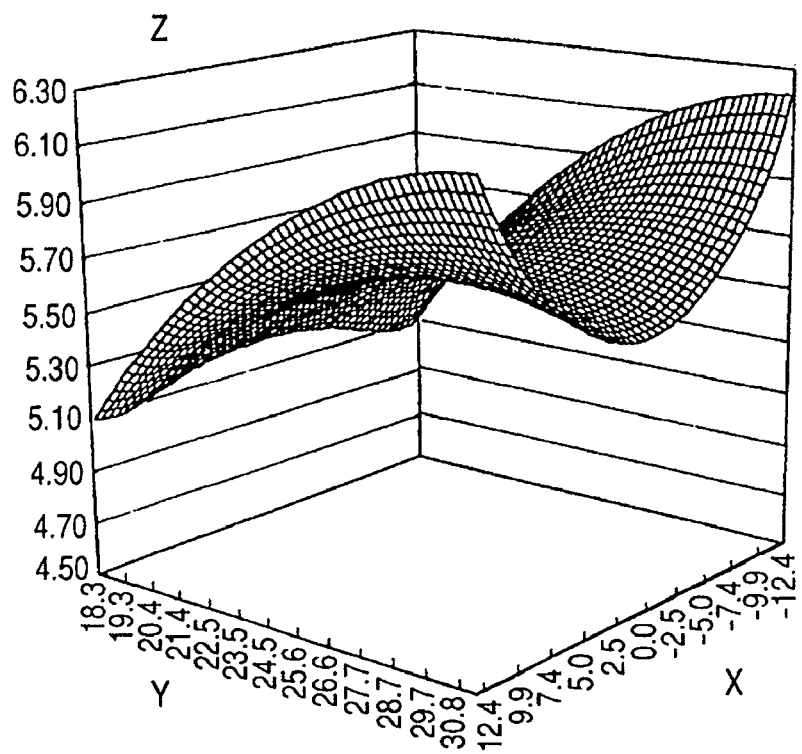
FIG. 6 is a main part schematic diagram of the shape of a second scanning mirror in the first embodiment.

FIG. 6 shows a surface shape of the second mirror 106b.

Figure 7A:
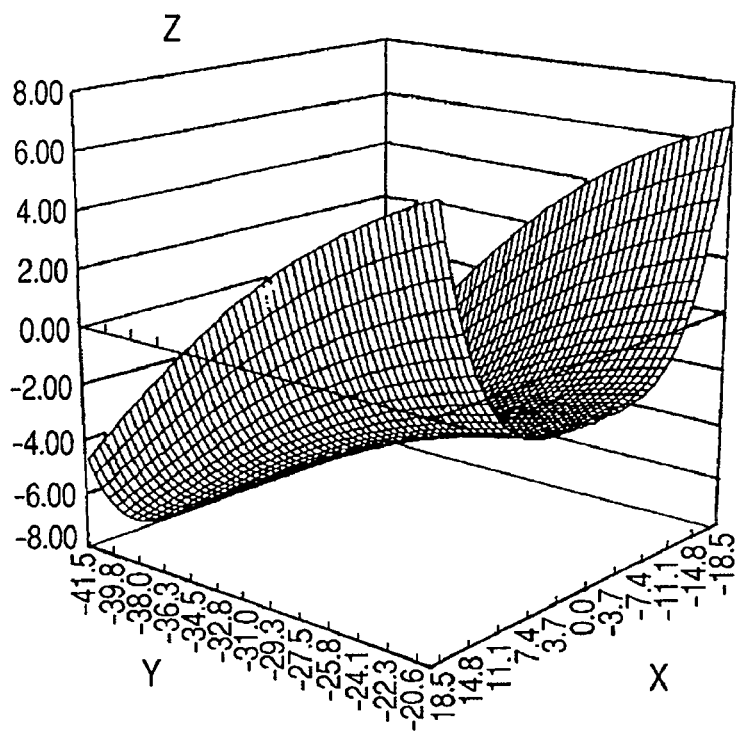
FIGS. 7A and 7B are main part schematic diagrams of the light incident surface and light exit surface of scanning lens in the first embodiment.
Figure 7B:
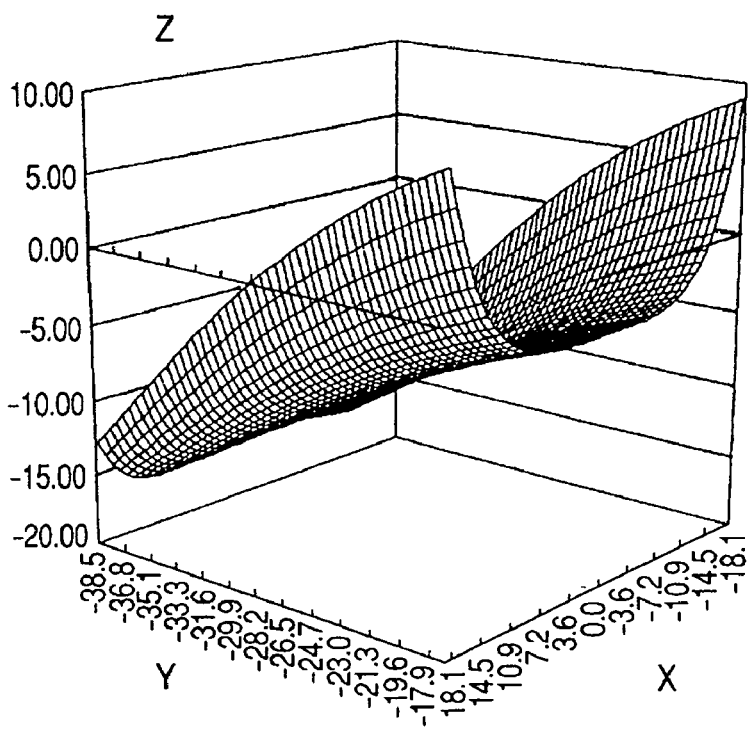

FIG. 7A shows a shape of the light incident surface 106ci of the lens 106c, and FIG. 7B shows a shape of the light exit surface 106co of the lens 106c.

The reflecting surfaces of the first and second mirrors 106a and 106b, the light incident surface 106ci, and the light exit surface 106co of the lens 106c are symmetrical with respect to a plane including the reference light beam Lvc in the horizontal scanning direction, and are rotational asymmetrical surfaces which are asymmetrical in the vertical scanning direction. Further, these surfaces are disposed shifted or tilted with respect to the reference light beam Lvc in the vertical scanning direction.

Figure 8A:
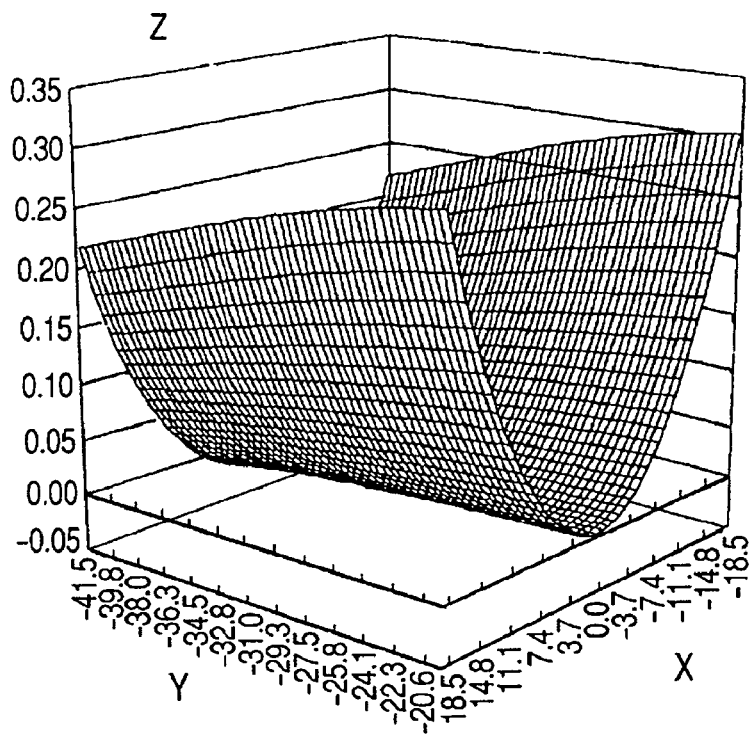
FIGS. 8A and 8B are main part schematic diagrams of the second order derivatives of the light incident surface and light exit surface of the scanning lens in the first embodiment.
Figure 8B:
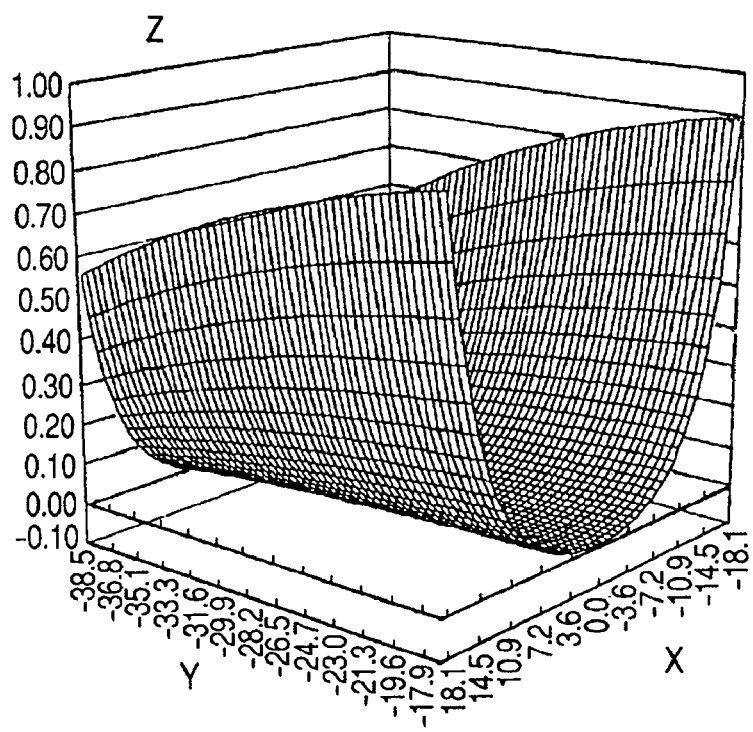

FIG. 8A shows the second order derivative of the light incident surface 106ci of the lens 106c, and FIG. 8B shows the second order derivative of the light exit surface 106co of the lens 106c.

As shown in FIG. 8B, the light exit surface 106co of the lens 106c is a surface shape in which the second order derivative of the surface shape in the horizontal scanning direction changes from the scanning center (center) in the horizontal scanning direction toward the scanning periphery (periphery) of the light exit surface 106co. To be specific, it is a cross sectional surface shape in which the second order derivative of the cross sectional surface shape in the horizontal scanning direction gradually increases from the center to the periphery.

The surface having such a shape can allow the light beam to be directed to the outside after the light exits (divergence operation). An effect to direct the traveling direction of the light beam toward outside is great as the position on the light exit surface 106co of the lens 106c of the light beam passing through is close to the periphery thereof. Therefore, it is possible to gradually increase the optical scanning speed on the screen 107.

In the deflection by the scanning unit 105 with sine-wave drive, the optical scanning speed on the screen 107 is faster on the center on the scanning surface, and is slow on the periphery. Hence, both of the optical scanning speeds are cancelled to realize the constant speed scanning on the screen 107.

Figure 9:
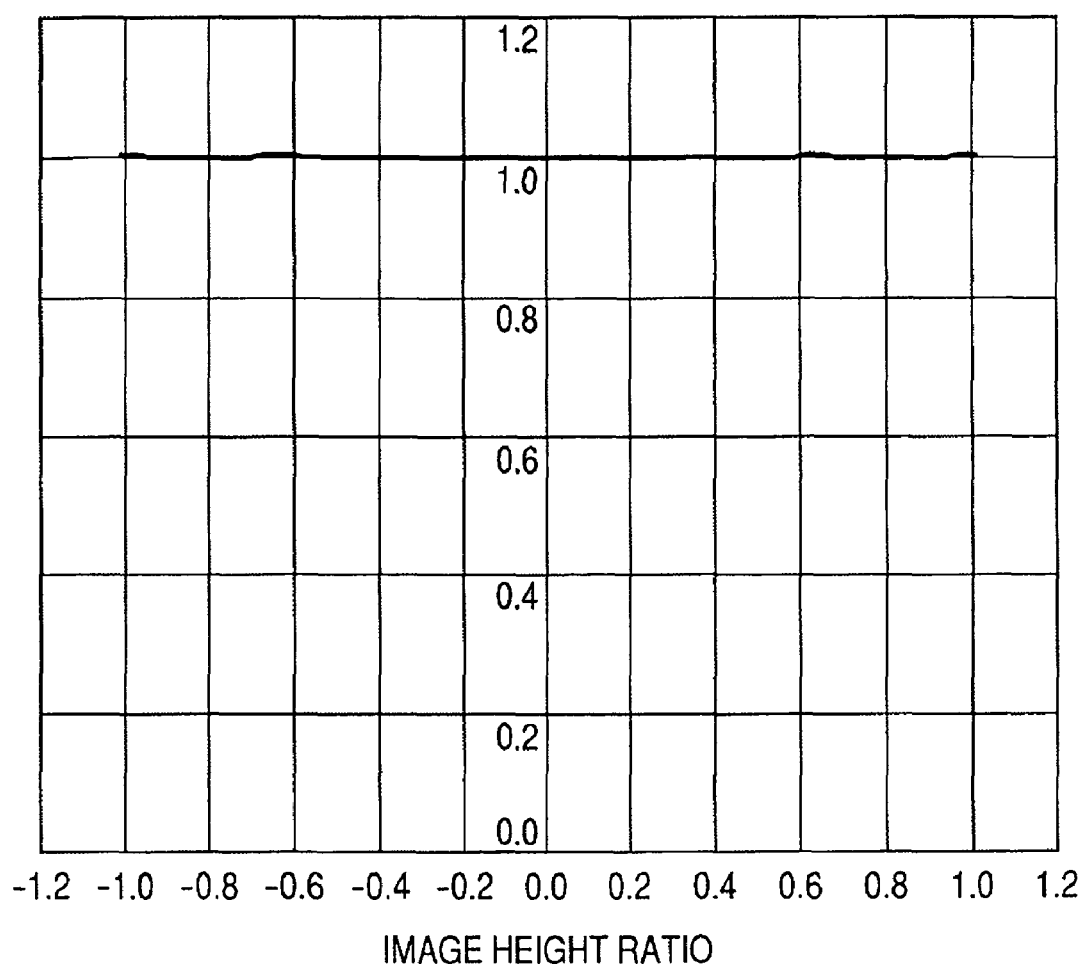
FIG. 9 is a main part schematic diagram of a scanning speed ratio in the first embodiment.

FIG. 9 shows a scanning speed ratio of the scanning light beam on the scanning surface 107 of the optical scanning device of the first embodiment.

FIG. 9 is a graph in which the time required to optically scan a line of the drawing region on the screen 107 is divided into 200 equal portions, and the optical scanning speed is found from the distance to be scanned between these portions, and the optical scanning speed of each scanning position is expressed by a ratio of the optical scanning speed of the scanning center to the optical scanning speed of each scanning position. This ratio is hereinafter referred to as a scanning speed ratio.

The scanning speed ratio on the screen 107 is indistinctive in unevenness in distribution light quantity if the ratio is controlled within the error of ±10% for the scanning center, so that the deterioration of the image can be controlled. It is preferable that the error is controlled within ±5%.

The scanning speed ratio of the first embodiment is 1.0016 at the maximum, and 0.9986 at the minimum. That is, the error is +0.16% even at the maximum, and it is the degree of precision to be sufficiently accommodated within the target of 10%. It will be appreciated that the scanning optical system of the present embodiment performs the arcsine correction at considerably higher accuracy.

The optical scanning device of the first embodiment is the two-dimensional scanning device, and its resolution is SVGA (800×600 pixels).

Up to now, though a description has been made on the constant speed scanning property with respect to a scanning line (scanning line passing through the center of the image surface center), as for the optical scanning device, the constant speed scanning property in the horizontal scanning direction is preferably secured in all the scanning lines of 600 pieces lined up in the vertical scanning direction.

Hence, in the two-dimensional scanning optical system 106 in the first embodiment, the light exit surface 106co of the scanning lens 106c is taken as a specific three dimensional curved surface shape. That is, an arbitrary cross section in the horizontal scanning direction is taken as a shape to change in a direction where the second order derivative of the coefficient representing its shape gradually increases according as moving from the center to the periphery, and at the same time, is taken as the surface of a three dimensional shape ranging the shape in the vertical scanning direction by each cross section in the horizontal scanning direction. This surface shape is the "two-dimensional arcsine correction surface". The "two-dimensional arcsine correction surface" can exert the arcsine characteristic in all the scanning lines lined up in the vertical scanning direction. Hence, in all the scanning lines, the light beam passing through the periphery in the horizontal scanning direction of the "two-dimensional arcsine correction surface" is directed to the outside, and can gradually increase the optical scanning speed according as moving from the scanning center on the screen 107 to the scanning periphery.

In this manner, the arcsine characteristic in the horizontal scanning direction across the whole surface of the two-dimensional image depicted on the screen can be exerted.

The optical scanning speed by the sine wave driving of the first deflector 105a and the optical scanning speed by the arcsine characteristic of the scanning optical system 106 are cancelled, and the constant speed scanning is performed in the horizontal scanning direction across the whole image surface depicted on the screen 107.

Figure 10:
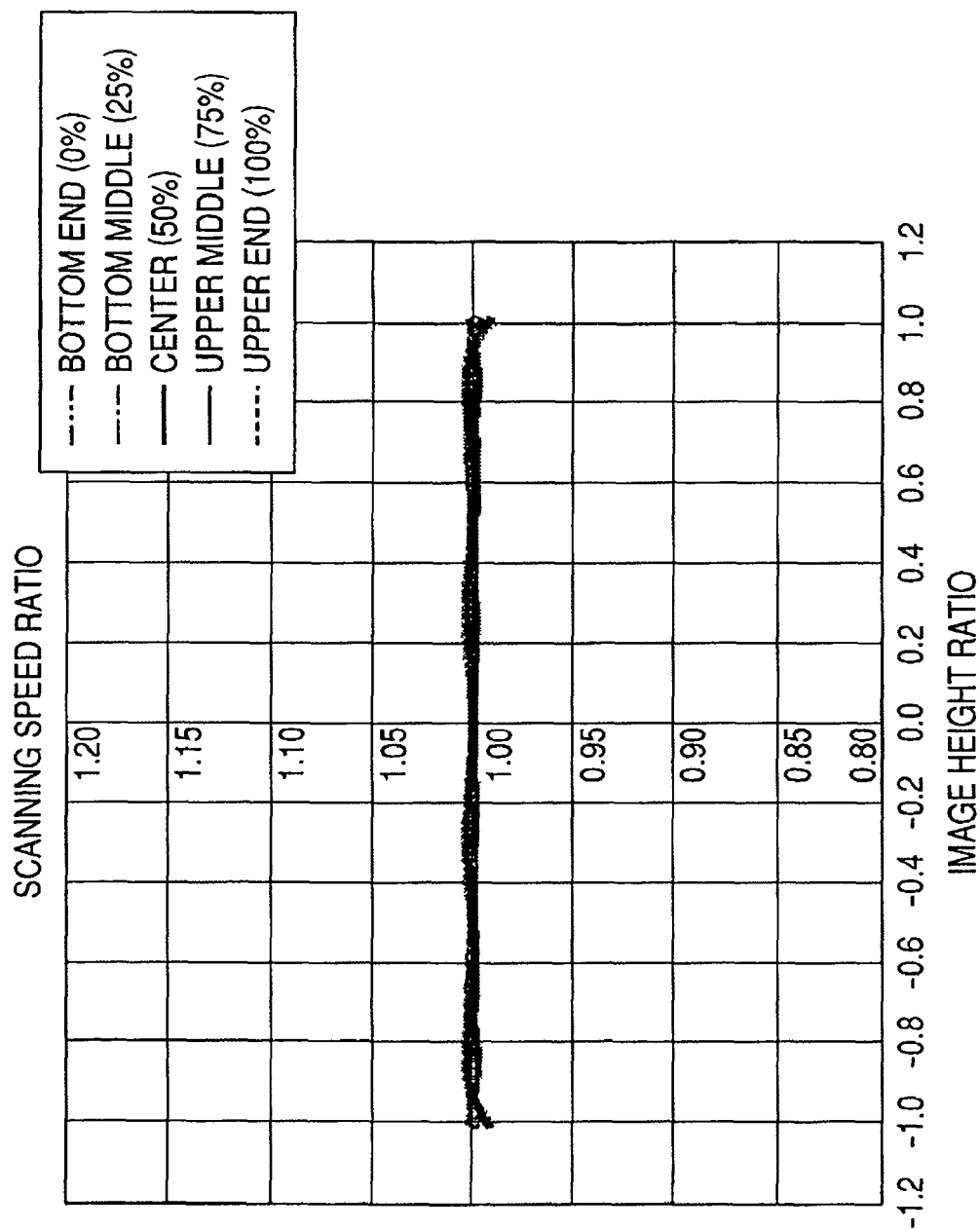
FIG. 10 is a main part schematic diagram of a scanning speed ratio in the first embodiment.

FIG. 10 shows the scanning speed ratio in the horizontal scanning direction with respect to five scanning lines located at the image height of 0% (scanning center), 25%, 50%, 75%, and 100% when the maximum image height of one side of the vertical scanning direction is taken as 100%.

Even in these scanning lines, the error of the scanning speed ratio is 1.0034 at the maximum, and 0.9913 at the minimum, and the error is not greater than 0.87%.

That is, in the two-dimensional optical scanning device of the first embodiment, it is possible to make the scanning speed in the horizontal scanning direction constant in the whole scanning image surface displayed on the screen 107.

Figure 11:
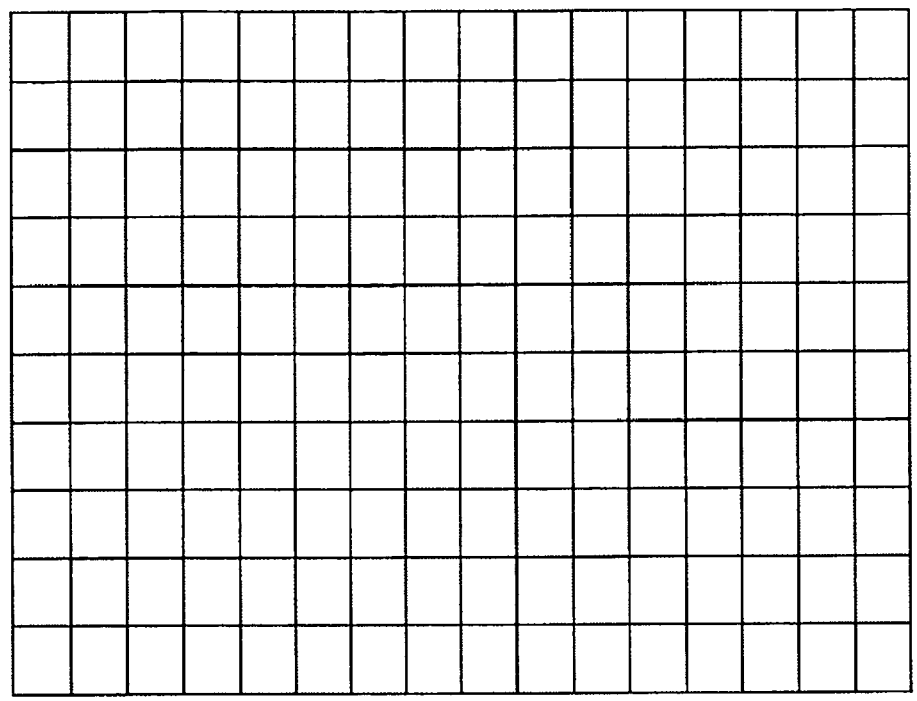
FIG. 11 is a main part schematic diagram of a scanning image (grid) in the first embodiment.

FIG. 11 shows a scanning image formed on the screen 107 of the optical scanning device of the first embodiment.

FIG. 11 is a grid image depicted by 17 vertical lines and 11 horizontal lines. The line is drawn after obtaining all the intersection point coordinates with the vertical lines and the horizontal lines. In a horizontal line, the time from an intersection point with the vertical line to the intersection point to the adjacent vertical line is displayed so as to be equal. Since the grid interval is constant in interval in the horizontal scanning direction, it is recognized that the constant speed scanning property is secured for the whole image surface. In the present embodiment, it is recognized that the depiction is performed with the scanning efficiency at 90%, and the arcsine correction is highly accurately performed up to the region where the scanning efficiency is high.

Figure 12:
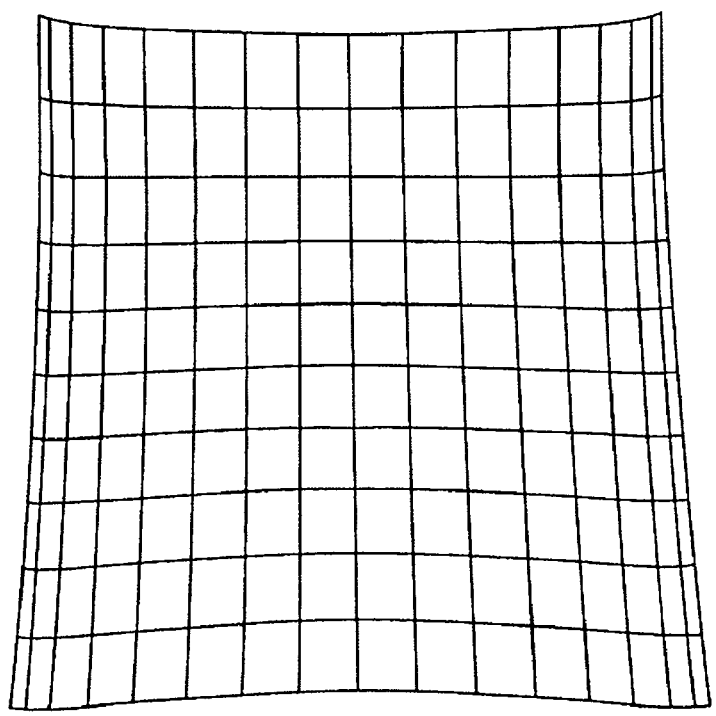
FIG. 12 is a main part schematic diagram of a scanning image (grid) in a comparison example 1.

FIG. 12 shows a scanning image formed on the screen 107 in case the lens 106c constituting the optical scanning device of the first embodiment is removed.

In FIG. 12, it is recognized that, in case there exists no lens 106c, a change is great mainly in the periphery in the horizontal scanning direction. According as moving from the scanning center in the horizontal scanning direction toward the scanning periphery, the intervals with the adjacent vertical lines become gradually narrower, and become below half the intervals in the vicinity of the center at the periphery.

Figure 13:
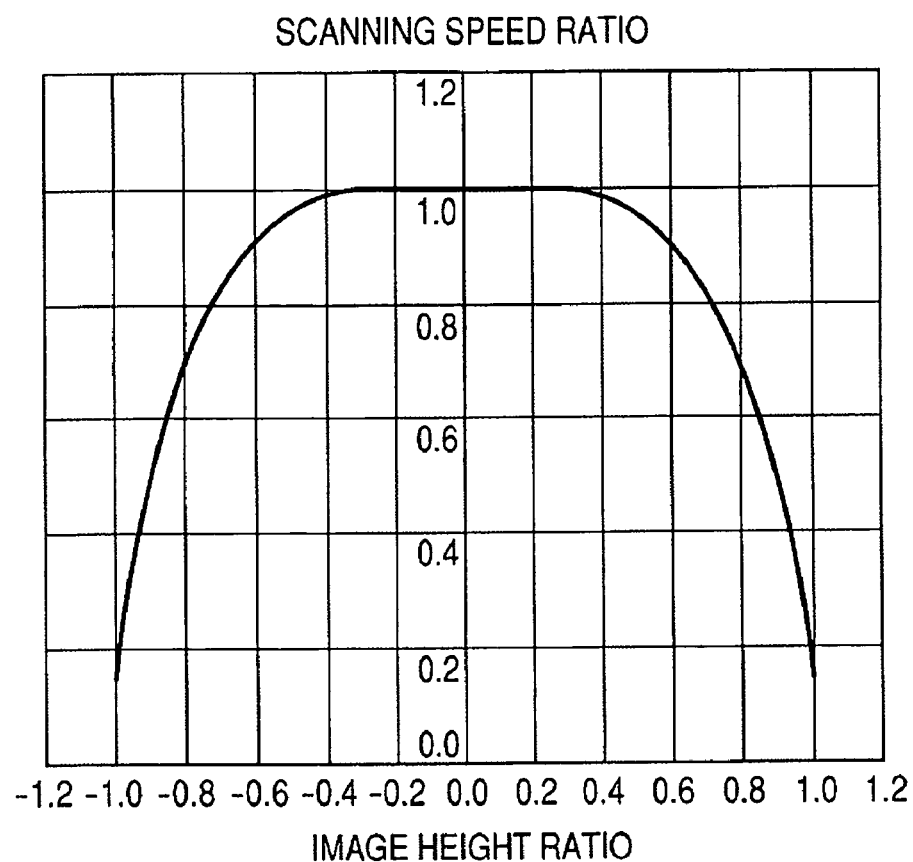
FIG. 13 is a main part schematic diagram of a scanning speed ratio in the comparison example 1.

Further, FIG. 13 shows a scanning speed ratio in case the lens 106c constituting the optical scanning device of the first embodiment is removed.

In FIG. 13, it is recognized that the scanning speed ratio decreases according as moving from the scanning center to the scanning periphery. This shows that the constant speed scanning property is in a considerably deteriorate state. From this, it is recognized that the arcsine characteristic of the scanning optical system 106 is generated by the lens 106c.

That is, in the present embodiment, by setting the light exit surface 106co of the lens 106c to the "two-dimensional arcsine correction surface", the constant speed scanning property in the horizontal scanning direction can be secured in the all regions of the two-dimensional scanning image.

In this manner, the image display apparatus capable of always displaying a good scanning image having no unevenness in brightness is provided.

Further, in the first embodiment, from among the surfaces having optical power in the scanning optical system 106, the light exit surface 106co of the lens 106c closest to the side of the scanning surface is taken as the "two-dimensional arcsine correction surface". In the scanning optical system 106, the overlapping of the light beam is reduced according as separating from the scanning unit 105. Hence, the final surface (surface nearest to the side of the surface to be scanned) where the overlapping of the light beam is least is taken as the "two-dimensional arcsine correction surface", so that the optimum shape according to each scanning position can be constituted, thereby enhancing accuracy of the arcsine characteristic.

Further, the lens 106c having the "two-dimensional arcsine correction surface" is taken as a meniscus shape with the side of the surface to be scanned concave in the horizontal scanning direction. The light incident surface 106ci of the lens 106c takes a shape in which the shapes, where the second order derivative of the shape in the horizontal scanning direction of the light incident surface 106ci gradually increases from the scanning center in the horizontal scanning direction of the light incident surface 106ci to the scanning periphery, are arranged in the vertical scanning direction, similarly to the light exit surface 106co. By constituting the lens 106c by such a shape, while the optical power is cancelled out by the light incident surface and the light exit surface, the traveling direction of the light beam alone can be independently changed. In this manner, a degree of freedom to obtain the shape necessary for the arcsine characteristic is enhanced.

Further, the light exit surface 106co taken as the "two-dimensional arcsine correction surface" has an anamorphic shape having a shape including different shapes between in the horizontal scanning direction which is the first scanning direction and in the vertical scanning direction which is the second scanning direction. Further, it is a surface of the rotational asymmetrical shape having no rotation symmetrical axis inside and outside of the light exit surface 106co. In this manner, a degree of freedom to obtain the shape necessary for the arcsine characteristic is enhanced.

At this time, when the absolute value of the second order derivative in the first scanning direction is made larger than the absolute value of the second order derivative of the second scanning direction, the relevant shape is made on the surface contributing to the first scanning direction only to perform the arcsine correction, thereby further enhancing a degree of freedom of the design.

Further, the "two-dimensional arcsine correction surface" is set in such a manner that variation of the second order derivative in the first scanning direction becomes large in case of moving from the scanning center in the first scanning direction to the scanning periphery rather than moving from the scanning center in the second scanning direction to the scanning periphery. In this manner, the arcsine characteristic only can be independently corrected, so that the arcsine correction is suitably performed even for the scanning line of whichever position in the vertical scanning direction.

Further, the light exit surface $106co$ taken as the "two-dimensional arcsine correction surface" has a shape having a symmetric property at the cross section in the horizontal direction which is the first scanning direction, and has a shape having an asymmetric property in the vertical scanning direction which is the second scanning direction. In this manner, the shape is made into a shape having the symmetric property in either one direction of the two dimensional scanning directions, thereby inviting merits to make the aberration correction easy. Particularly, the scanning unit is preferably set to a shape having the symmetric property in the direction in which the scanning unit drives in a sine-wave manner.

Further, when the "two-dimensional arcsine correction surface" is used, regardless of the projection distance to the screen 107, whatever projection distance it is, a good arcsine correction can be always performed. In the image display apparatus where the projection distance is not specified such as a front projector, when the "two-dimensional arcsine correction surface" is used, the tremendous effect of the present invention can be obtained.

In the first embodiment, though the two-dimensional optical scanning device has been cited as an example, it is not limited to this system, but in the one dimensional scanning device depicting one scanning line, in a multi beam scanning device disposing plural emission points in an array shape such as LED array, LD array, and the like, and even in the scanning optical system scanning with the light beam from a spatial modulator such as DMD, GLV, and the like by the deflector, the same effect can be obtained.

Hereinafter, the scanning distortion in the two-dimensional optical scanning image and the correction method thereof will be described.

FIGS. 1A and 1B show optical paths optically scanning on the surface 107 to be scanned in the two-dimensional direction in the first embodiment.

The first deflector $105a$ of the scanning unit 105, as described above, is constituted by the MEMS device.

On the other hand, the second deflector $105b$ of the scanning unit 105 is constituted by a flat surface mirror mounted on a stepping motor which drives at an equiangular speed.

The MEMS device $105a$ which is the first deflector and the flat surface mirror $105b$ which is the second deflector are disposed close each other, and the interval thereof is taken as 7.0 (mm).

The scanning unit 105 of the first embodiment scans the light beam from the light source unit 101 in the horizontal scanning direction by the first deflector $105a$, and performs two-dimensional scanning by scanning in the vertical scanning direction by the second deflector $105b$. In general, the scanning image depicted on the screen 107 by the optical scanning device is desirable to be displayed in accordance with the inputted video signal.

However, there are cases where due to various causes such as a TV distortion generated by the two-dimensional scanning, a distortion of the scanning optical system 106, a distortion of the constant speed scanning property due to the driving characteristic of the scanning unit 105, and a trapezoidal distortion generated in case of performing an oblique projection, and further a distortion due to the translational scanning property caused by allowing the incident light beam to obliquely enter the scanning unit 105, and the like, the scanning distortion is generated in the scanning image, thereby remarkably degrading the appearance quality of the image.

Figure 14:
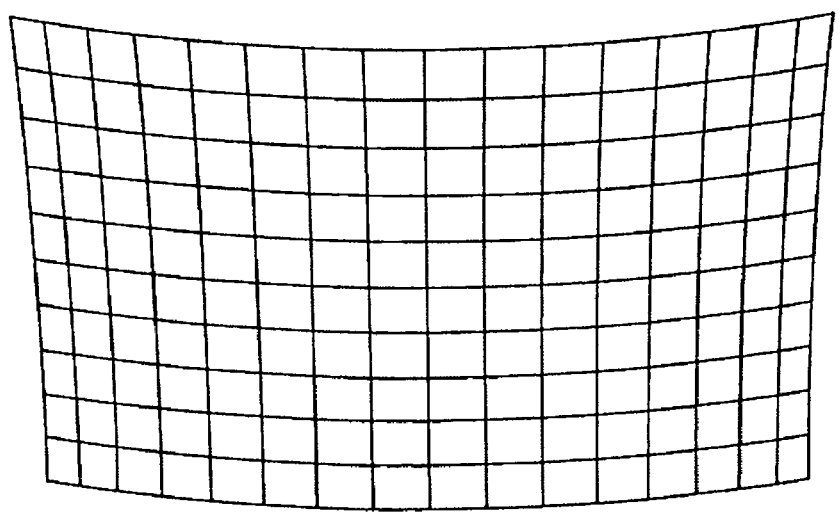
FIG. 14 is a main part schematic diagram of a scanning image (grid) in a comparison example 2.

FIG. 14 shows a scanning image formed on the screen 107 in a case there exits no scanning optical system 106 of the first embodiment. In the scanning image, a distortion (constant speed scanning property), a TV distortion, a trapezoidal distortion with extension in the upper side, and a translational distortion (bending of the scanning line) of a convexity shape at the bottom are generated, thereby degrading the appearance quality of the scanning image.

Hence, in the first embodiment, to correct the scanning distortion, the following constitutions are used.

First, in the horizontal scanning direction, by giving the scanning optical system 106 an arcsine characteristic to correct the shift of the scanning position by the sine wave driving of the scanning unit 105, the constant speed scanning in the horizontal direction is realized. In this manner, the distortion of the scanning optical system 106 and the distortion of the constant speed scanning property due to driving characteristic of the scanning unit 105 are eliminated. Further, by satisfying the arcsine characteristic in any of the scanning lines arranged in the vertical scanning direction, the correction is made so as to make the scanning position in the horizontal scanning direction always constant. In this manner, the vertical lines are depicted by the straight line. In this manner, the scanning distortion in the vertical scanning direction is corrected by giving the scanning optical system the two-dimensional arcsine characteristic in the horizontal direction. Thus, from among TV distortions, with respect to the component in the vertical scanning direction, the problem is solved.

Further, by giving the scanning optical system a tangent θ characteristic (f-tan θ characteristic) in the vertical scanning direction, the scanning position in the vertical scanning direction is always allowed to be maintained at the same position, so that horizontal lines are linearly depicted. In this manner, by giving the scanning optical system the tangent θ characteristic in the two-dimensional vertical scanning direction, the scanning property in the horizontal scanning direction is corrected. Thus, from among the TV distortions, with respect to the component in the horizontal scanning direction, the problem is solved.

That is, by using the two-dimensional scanning optical system having the arcsine characteristic in the horizontal scanning direction and having the tangent θ characteristic in the vertical scanning direction, the scanning distortion is corrected, thereby obtaining the image display apparatus capable of always displaying a high quality of the image.

At this time, even in order to suitably correct the TV distortions by giving the two-dimensional scanning optical system 106 the arcsine characteristic in the horizontal scanning direction, it becomes an important problem to study to correct various scanning distortions.

Hence, in the first embodiment, the constitution of the two-dimensional scanning optical system 106 is adequately set. Particularly, an incidence method and the constitutions of the first mirror $106a$ and the second mirror $106b$ are adequately set, thereby correcting each scanning distortion.

As shown in FIGS. 2A and 2B, the two-dimensional scanning optical device of the first embodiment allows the scanning image to display on the screen 107 by the oblique projection system.

The screen 107 is two-dimensionally and optically scanned with the light beam deflected by the first deflector 105a and the second deflector 105b through the two-dimensional scanning optical system 106.

In the two-dimensional optical scanning device of the first embodiment, as shown in FIG. 2B, the reference light beam Lvc is allowed to enter the screen 107 in the vertical scanning direction at a finite angle θvc (≠0 deg). With respect to all the light beams, the light incidence angle in the vertical scanning direction is made above θvi≧0 (deg).

In this manner, by the oblique projection system, the scanning image displayed on the screen 107 is shifted upward, and the scanning image is displayed at a position easily seen by an observer. Further, in case a scanning type image display apparatus mounted with this optical scanning device is placed on a desk, the scanning image can be displayed on all the screens 107 without being displayed on the desk.

Further, in the first embodiment, the oblique projection is performed from the vertical scanning direction, and at this time, in the vertical scanning direction, the angle θvcat which the reference light beam Lvc enters the screen 107 is 18.0 (deg). Here, assuming that the angle by which the light beam enters the screen 107 is large is taken as the upper part, and the angle by which the light beams enters the screen is small is taken as the lower part, the principal ray of the light beam incident on the uppermost part on the screen 107 enters the screen 107 at an incidence angle θvu=32.9 (deg), and the principal ray of the light beam incident on the lowest part enters the screen 107 vertically, that is, at an incidence angle θvi=0.00 (deg).

Hence, in the present embodiment, with respect to all the light beams, the angle of incidence in the vertical scanning direction is taken as θvi≧0.00 (deg).

Particularly, the light beam is allowed to enter the scanning unit 105 from the side where the light beam having a small incidence angle toward the surface 107 to be scanned passes through.

On the other hand, in the horizontal scanning direction, as shown in FIG. 2A, the reference light beam Lvc vertically enters the scanning surface 107, and is disposed so as to be symmetrical for the scanning center.

In this manner, when the image is displayed on the screen 107 by the oblique projection system, there are the cases where a large trapezoidal distortion as shown in FIG. 14 is generated, thereby degrading the appearance quality of the display image.

The trapezoidal distortion, as generally known, is a distortion generated by the optical path difference to the screen 107, and in case the optical path is short, the width of the image becomes narrow, and in case the optical path is long, the width of the image becomes wide. In the case where the image is obliquely projected, the optical path length of the portion where the image vertically enters the screen 107 is short, and the larger the incident angle is, the longer the optical path length becomes. Hence, in case the projection is made obliquely upward, a trapezoidal distortion is generated in which the upper side of the image is wide and the lower side is narrow.

Further, as another scanning distortion, there is a translational distortion.

Figure 15:
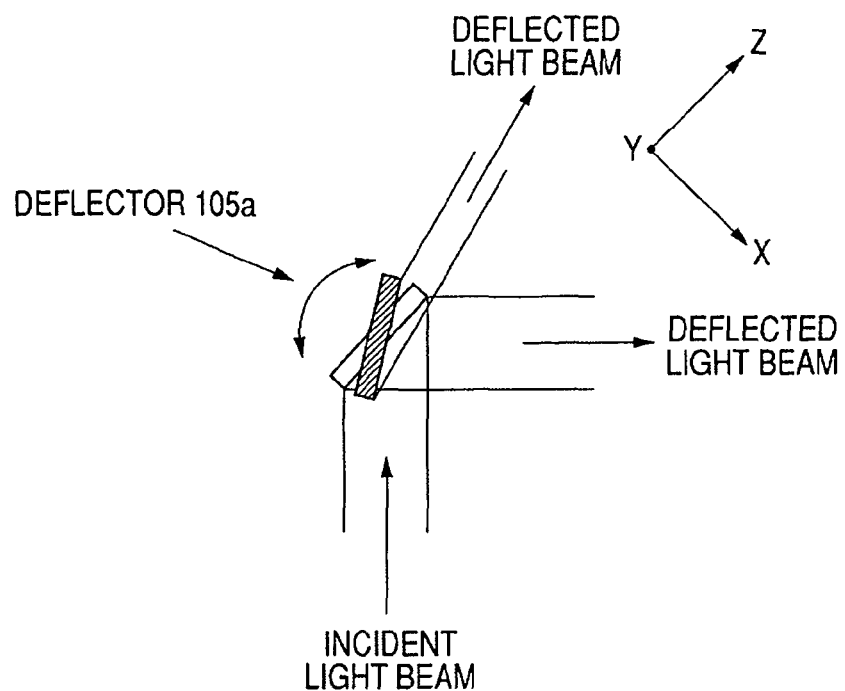
FIG. 15 is a view explaining the incident system of incidence within a deflection surface.

FIG. 15 is a view to explain a state of the light beam deflected by the deflector 105a within a horizontal scanning cross section.

As shown in FIG. 15, in the case of the incidence within the deflection surface where the incident light beam from the horizontal scanning direction which is the deflecting direction of the first deflector 105a is allowed to enter the first deflector 105a, the light beam width capable of incident deflection becomes different depending on the orientation of the reflecting surface of the first deflector 105a. Particularly, in case the light beam width is deflected toward a direction to move away from the incident direction, a loss of light quantity becomes a problem.

Hence, in the first embodiment, the light beam from the light source unit 101 is allowed to enter the first deflector 105a, which deflects in the horizontal scanning direction, at an angle within the vertical scanning cross section (second scanning cross section) orthogonal to the deflecting direction. This is an incidence method, which is a so-called oblique incidence.

The incidence angle when the light beam is allowed to enter the scanning unit 105 from the light source unit 101 is defined by the angle formed between the principal ray of the incident light beam and the reference light beam Lvc.

Here, the case of the incidence within the deflection surface will be described.

Assuming the same field angle as the first embodiment, when a horizontal field angle of the scanning optical system 106 is taken as 37.80 (deg), a vertical field angel as 21.17 (deg), and the incidence angle within the deflection surface as 30 (deg), depending on the orientation of the first deflector 105a, the light beam width capable of deflection changes between 98 and 66% of the width of the reflecting surface of the first deflector 105a. When the light beam width capable of deflection is reduced, a loss of intensity of the deflected light beam is also generated, thereby causing a loss of the light quantity. On the other hand, similarly to the first embodiment, in case the light beam width is allowed to enter obliquely from the vertical scanning direction, the light beam width capable of deflection is hardly affected by the orientation of the reflecting surface of the first deflector 105a. In the present embodiment, the incidence angle in the oblique incidence is taken as 28 (deg), and the light beam width capable of deflection is between 94 and 93% of the width of the reflecting surface of the first deflector 105a. In this manner, the reflecting surface of the first reflector 105a can be effectively used, and the decrease in the light beam width capable of reflection becomes extremely small, thereby improving the problem of the loss of light quantity.

Figure 16:
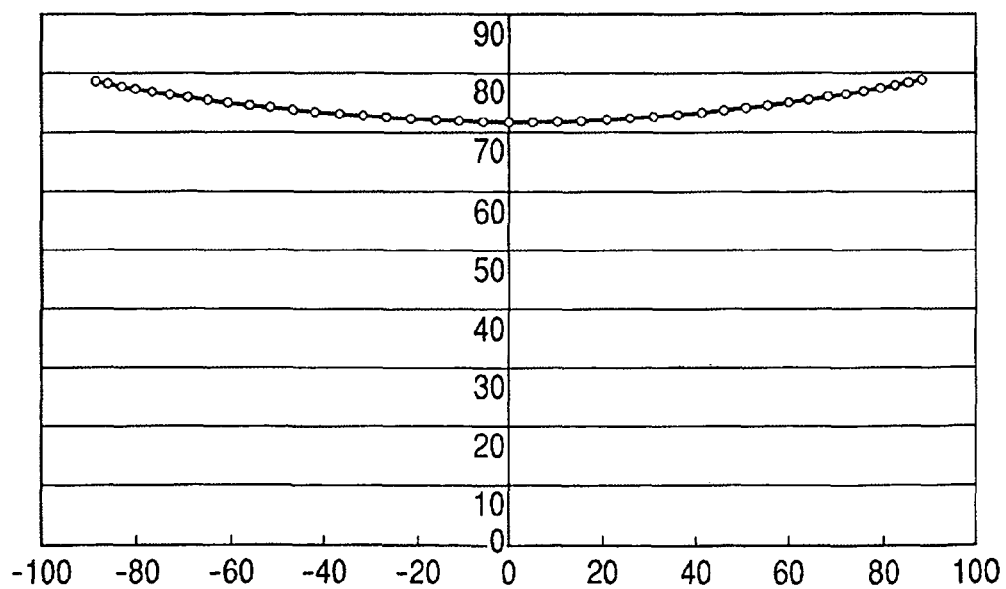
FIG. 16 is a view explaining the bending of a scanning line by oblique incidence.

However, in the case of the scanning optical system of the oblique incident system, the image depicted on the screen 107 has the horizontal line bent. This is a so-called bending of the scanning line. FIG. 16 is an explanatory drawing of the bending of the scanning line in the oblique incidence according to the first embodiment.

In the case of the oblique incident system, the scanning line shifts above the screen 107 as close to the periphery from the center in the horizontal scanning direction. That is, a scanning line convex downward is generated. When the light beam is reflected by the first deflector 105a, since the vertical scanning direction component in the reflecting direction of the light beam becomes gradually large as the orientation of the reflecting surface of the first deflector 105a inclines to the horizontal scanning direction, the scanning line convex downward is generated. When reflected by the reflecting surfaces such as the second deflector 105b, two scanning mirrors 106a and 106b, and the like, the light beam reaches the screen 107 while changing the direction of the bending of the scanning line.

In case the upper side oblique projection is performed, when the convex bending of the scanning line convex downward is generated downward, it is easy to correct the translational distortion by the scanning optical system. Hence, the direction of the oblique incident of the light beam on the first deflection 106a is made in reverse to the region deflected by the second deflector 105b.

In the optical scanning device of the first embodiment, this problem is solved by using two mirrors 106a and 106b included in the scanning optical system 106.

The two mirrors 106a and 106b of the scanning optical system 106 are disposed in such a manner as to fold the optical path of the deflected light beam in the vertical scanning direction. This is the same scanning direction as the oblique projection.

Figure 17:
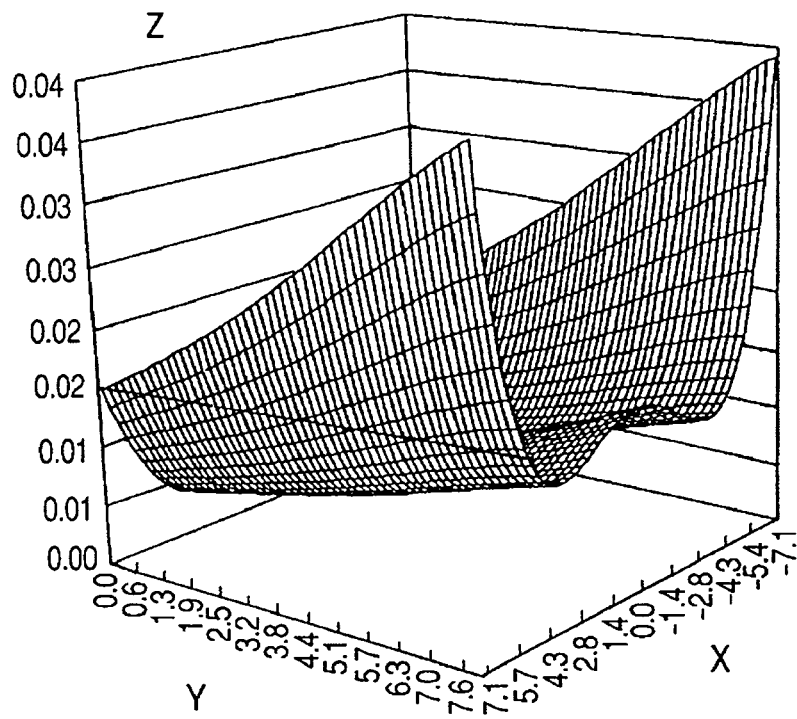
FIG. 17 is a main part schematic diagram of the second order derivative of a first scanning mirror in the first embodiment.
Figure 18:
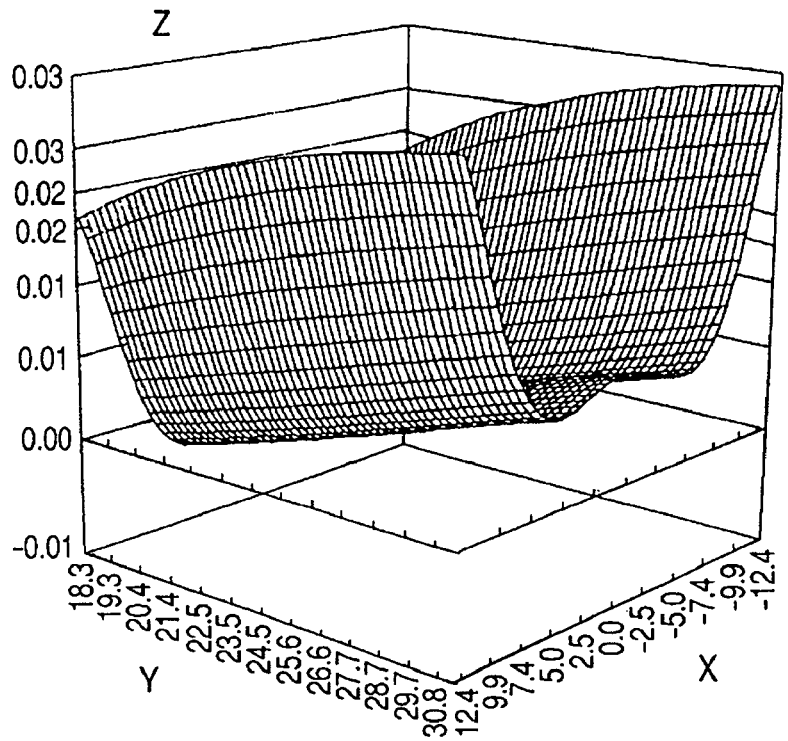
FIG. 18 is a main part schematic diagram of the second order derivative of a second scanning mirror in the first embodiment.

FIG. 17 shows a second order derivative in the horizontal scanning direction in the first mirror 106a of the first embodiment. FIG. 18 shows a second order derivative in the horizontal scanning direction in the first mirror 106b of the first embodiment.

As shown in FIG. 17, the second order derivative in the horizontal scanning direction of the first mirror 106a becomes small once as close to the scanning periphery from the scanning center in the horizontal scanning direction, and after that, becomes gradually large so as the second order derivative at the periphery to become a value larger than that at the scanning center. The first mirror 106a is a surface where the light beam enters from a minus side and exits to the minus side, and has a function to direct the light beam toward the outside. Particularly, it has a dramatic effect in the periphery. The first mirror 106a has a surface shape arranging such shapes in the vertical scanning direction.

On the other hand, as shown in FIG. 18, the second order derivative in the horizontal direction of the second mirror 106b becomes small once as close to the scanning periphery from the scanning center in the horizontal scanning direction, and after that, becomes gradually large so as the second order derivative at the periphery to become a value larger than that at the scanning center. The second mirror 106b is a surface where the light beam enters from a plus side and exits to the plus side, and has the effect to direct the light beam directed to the outside toward the inside. Particularly, it has a significant effect in the periphery. The second mirror 106b has a surface shape ranging such shapes in the vertical scanning direction.

In this manner, the light beam is directed to the outside by the first mirror 106a, and the light beam is again directed to the inside by the second mirror 106b, thereby guiding the light beam to the screen 107 serving as the scanning surface. Position of the reflecting point on the second scanning mirror 106b is defined so that the light beams in every deflection angles of the second deflector 105b travels to the screen 107 along the same optical path when seen in the cross section in the horizontal scanning direction when the first deflector 105a is deflected at a certain angle. In the first mirror 106a, the light beams are reflected toward the reflecting positions on the second mirror 106b. Since the positions of the reflecting points on the second mirror 106b become wider in interval at the periphery in the horizontal scanning direction, the second order derivative in the horizontal scanning direction of the first mirror 106a is also required to be made large in the periphery. Further, when the second order derivative of the first mirror 106a becomes large, since the light beam largely expands to the outside, the second order derivative in the periphery of the second mirror 106b is also made large, and the effect of directing the light beam to the inner side is also required to be made large, and the shapes of the first mirror 106a and the second mirror 106b are decided so that the light beams are guided from the reflecting points of the second mirror 106b to the predetermined positions on the screen 107.

When constituted in this manner, the light beam deflected by a certain angle by the first deflector 105a always reaches the same position in the horizontal scanning direction regardless of the deflection angel of the second deflector 105b.

As a result, the trapezoidal distortion generated by the oblique projection system can be corrected, and at the same time, the TV distortion in the vertical scanning direction can be corrected.

Further, since the first mirror 106a has a minus optical power, and the second mirror 106b has a plus optical power, this is effective also for correction of the field curvature. Further, the configuration is made so that the reflecting point on the second mirror 106b of the light beam reflected by the first deflector 105a is away from the screen 107 as away from the scanning center in the horizontal direction toward the scanning periphery. In this manner, the bending shape of the scanning line generated by the oblique incidence and a locus of the reflecting point on the second mirror 106b of the light beam deflected in the horizontal scanning direction by the first deflector 105a are assimilated, and the light beam after reflected by the second scanning mirror 106b is disposed within a same flat plane.

Hence, the scanning line on the screen 107 can be made into a straight line, and therefore, the bending of the scanning line due to the oblique incidence and the TV distortion in the horizontal direction can be suitably corrected.

In this manner, the light beam from the light source is allowed to obliquely enter the deflector scanning in the first scanning direction, and from among the reflecting surfaces included in the scanning optical system, the reflecting surface nearest to the surface to be scanned is taken as the final reflecting surface, and this final reflecting surface is disposed with an inclination in the second scanning direction orthogonal to the first scanning direction, and the locus of the reflecting point on the final reflecting surface in the first scanning direction is disposed so as the reflecting point to be away from the scanning surface as away from the center of the final reflecting surface, so that the bending of the scanning line can be suitably corrected.

Thus, as described above, the two-dimensional scanning optical system 106 uses two reflecting surfaces of the rotational asymmetrical shape.

The first embodiment comprises the first mirror 106a and the second mirror 106b.

With referring to FIGS. 19A and 19B, the calculation method of the TV distortion and the trapezoidal distortion will be described.

Figure 19A:
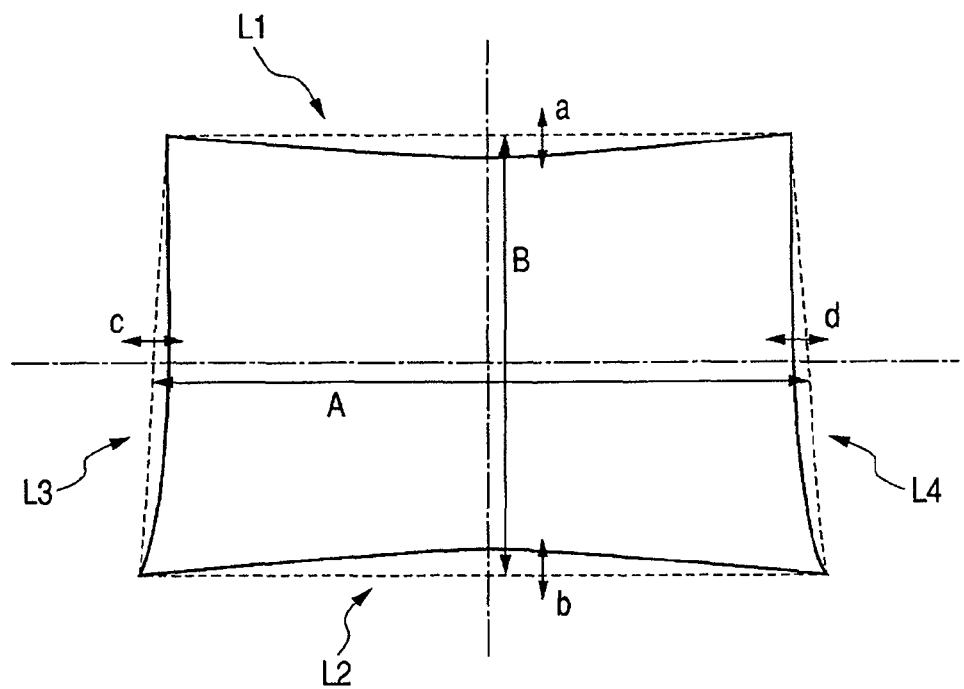
FIGS. 19A and 19B are explanatory drawings of the calculation method of a TV distortion and a trapezoidal distortion.

FIG. 19A is a view to explain the calculation method of the TV distortion. The TV distortion is an aberration amount showing the amount of the bending of a frame of the displayed image surface, and an amount where the displacement amount along an axis passing through the image surface center is divided by the width of the image surface. Hence, the TV distortion in each side of the image surface frame is represented by the following Formulas.

Upper side L1: $a/B \times 100(\%)$

Lower side L2: $b/B \times 100(\%)$

Left side L3: $c/A \times 100(\%)$

Right side L4: $d/A \times 100(\%)$

Figure 19B:
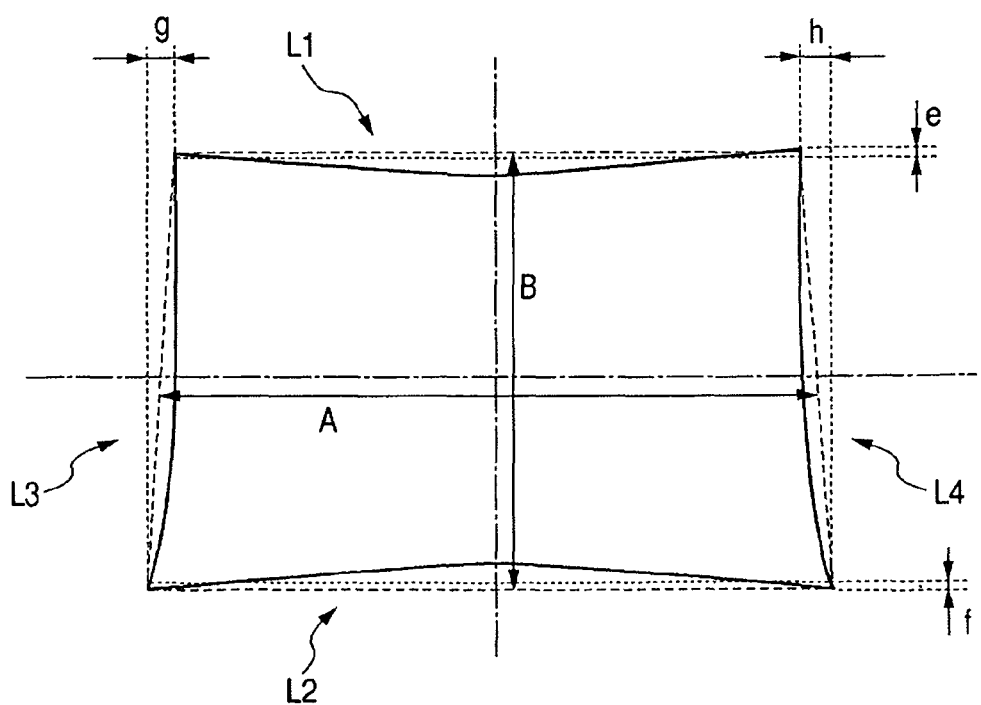

Further, FIG. 19B is a view to explain the calculation method of the trapezoidal distortion. The trapezoidal distortion is an aberration amount showing the amount of the inclination of the frame of the displayed image surface, and an amount where the variation of the angle of the image surface is divided by the width of the image surface. Hence, the trapezoidal distortion in the frame of the image is represented by the following Formulas.

Upper side L1: e/2/B×100(%)

Lower side L2: f/2/B×100(%)

Left side L3: g/2/A×100(%)

Right side L4: h/2/A×100(%)

FIG. 11 shows the scanning image in the optical scanning device of the first embodiment. Further, Table 2 shows the amount of the TV distortion and the trapezoidal distortion.

In the optical scanning device of the first embodiment, the TV distortion is −0.01(%) at the upper side, −0.01(%) at the lower side, 0.00(%) at the left side, and 0.00(%) at the right side, and the trapezoidal distortion is 0.00(%) at the upper side, 0.00(%) at the lower side, 0.00(%) at the left side, and 0.00(%) at the right side, and nearly completely corrects the scanning distortion.

FIG. 14 shows the scanning image in a comparison example where the two-dimensional scanning optical system is removed from the optical scanning device of the first embodiment. Further, Table 3 shows the amount of the TV distortion and the trapezoidal distortion.

In the comparison example where the two-dimensional scanning optical system is removed from the optical scanning device of the first embodiment, the TV distortion is 7.55(%) at the upper side, 6.49(%) at the lower side, −0.84(%) at the left side, and 0.84(%) at the right side, and the trapezoidal distortion is 0.00(%) at the upper side, 0.00(%) at the lower side, −2.01(%) at the left side, and 2.01(%) at the right side. In this manner, even if it is the optical scanning device to project the light beam onto the screen 107 by the oblique projection system or the optical scanning device allowing the light beam to enter the scanning unit 105 by the oblique incidence system, by using the two-dimensional scanning optical system 106 of the first embodiment, the optical scanning device capable of displaying a two-dimensional scanning image being extremely rare in scanning distortion and always good is obtained.

In the first embodiment, the scanning is performed with the light beam from the light source unit 101 by the scanning unit 105 at the field angle θx=±18.9 (mm) in the horizontal scanning direction and the angle of view θx=±10.0 (deg) in the vertical scanning direction. Further, the width in the horizontal scanning direction of the image of the deflected light beam at each field angle displayed on the screen 107 by the two-dimensional scanning optical system 106 is 243.5 (mm), and the width in the vertical direction is 182.6 (mm), thereby displaying the scanning image of an opposite angel 12.0 (inch). The width of the scanning image is defined by a position passing through the image center. That is, the full field angle in the first scanning direction of the two-dimensional scanning optical system is θd1=37.8 (deg), the full angle of view in the second scanning direction is θd2=20.0 (deg), and the width in the first scanning direction of the display image is Wi1=243.5 (mm), the width in the second scanning direction is Wi2=182.6 (mm), and which becomes $$\frac{\theta d2}{\theta d1} = 0.707 \times \frac{Wi2}{Wi1}$$

and satisfies a conditional expression such as $$0.3 \times \frac{Wi2}{Wi1} < \frac{\theta d2}{\theta d1} < 0.9 \times \frac{Wi2}{Wi1} \tag{3}$$

If θd2/θd1 is not greater than the lower limit value in the Formula (3), it becomes difficult to correct the field curvature in the second scanning direction, and corpulence of spots are invited, thereby deteriorating the resolution. If θd2/θd1 is not smaller than the upper limit value in the Formula (3), it becomes difficult to correct the trapezoidal distortion. Hence, by satisfying the condition shown in the Formula (3), the trapezoidal distortion can be suitably corrected, and moreover, the field curvature in the second scanning direction can be suitably corrected, thereby making the spots into the desired size.

Further, by setting the field angle in the vertical scanning direction which is the second scanning direction small, the miniaturization of the two-dimensional scanning optical system 106 is attempted.

In case the scanning unit 105 is constituted by two deflectors 105a and 105b as in the case of the first embodiment, from among the images displayed on the screen 107, the image having a larger width is preferably disposed at a position away from the screen 107. With the disposition, the performance of the two-dimensional scanning optical system 106 can be easily corrected.

Assuming that Dx be the width in the horizontal scanning direction of the two-dimensional scanning optical system 106, Dy be the width in the vertical scanning direction, and Dz be the width in the Z axial direction orthogonal to the horizontal scanning direction and the vertical scanning direction, the following conditions are satisfied.

Dx=36.0 (mm)

Dy=19.4 (mm)

Dz=24.4 (mm)

and

Dx≦50 (mm) (4)

Dy≦30 (mm) (5)

Dz≦50 (mm) (6)

Further, assuming Ld be the distance in the Z axial direction from the first deflector 105a to the position nearest to the surface to be scanned from the two-dimensional scanning optical system 106, Ld=36.5 (mm), and the following condition of Ld≦50 (mm) (7)

is satisfied.

As a result, the two-dimensional scanning optical device becomes extremely compact, and there is a merit of being able to miniaturize the image display apparatus mounting this two-dimensional optical scanning device. Further, the constitution of the mechanical members holding optical parts and the occupation capacity of a storage area can be reduced, so that cost reduction can be realized.

In this manner, while the quality of the scanning image has been remarkably deteriorated due to generation of various scanning distortions such as a problem of collapse in the constant speed scanning property in case of displaying the scanning image on the screen 107 by using the deflector with sine-wave drive in the scanning unit 105, the TV distortion generated by the deflection toward the two-dimensional direction by the scanning unit 105 in addition to the trapezoidal distortion generated by the oblique projecting system, the bending of the scanning line due to the oblique incidence, and the like, by the first embodiment, the constant speed scanning property can be secured across the whole scanning image region, and at the same time, the scanning distortion such as the TV distortion and the trapezoidal distortion can be suitably corrected.

In this manner, the optical scanning device capable of always displaying a high quality scanning image can be achieved.

Further, since the constant speed scanning property and the scanning distortion can be corrected simultaneously regardless of the projection distance, in case the optical scanning device of the first embodiment is used for a projection device such as a front projector and the like, further effects can be exerted.

In the first embodiment, for the mirrors 106a, 106b, and lens 106c constituting the two-dimensional scanning optical system 106, the free-form curved surface on the basis of the flat surface has been used, but it is not limited to this, and for example, even if the free-form curved surface of a spherical base and the free-form curved surface on the basis of a parabola are used, the same effect can be sufficiently obtained.

FIG. 20 shows a schematic diagram of a scanning type image display apparatus of the present invention.

In FIG. 20, the light beam emitted from the light source unit 101 enters the scanning unit 105 through the condenser lens 102 and the convergent optical system 104. The scanning unit 105, in which the horizontal scanning mirror 105a and the vertical scanning mirror 105b are disposed, is configured so as to be able to scan the incident light beam in the two-dimensional direction. The light beam deflected by the scanning unit 105 is directed to the scanning surface 107 such as a screen, a wall, and the like through the two-dimensional scanning optical system 106 constituted by two mirror lenses 106a and 106b and a lens 106c. The configuration is made so that the light beam emitted from the light source unit 101 is substantially condensed on the scanning surface 107 by the condenser lens 102, the convergent optical system 104, and the two-dimensional scanning optical system 106, and form a light source image (spot) on the scanning surface 107. The light source image on the scanning surface 107 is optically scanned by the scanning unit 105, thereby forming a two-dimensional image.

The horizontal scanning mirror 105a in the scanning unit 105 is a micro mechanical mirror formed by a semiconductor process, and is constituted in such a manner as to swing a mirror surface by mechanical resonance operation.

The vertical scanning mirror 105b is a mirror to be driven by a motor such as a stepping motor having an axis of rotation. The horizontal scanning mirror 105a and the vertical scanning mirror 105b are connected to a horizontal driving unit 114, a horizontal driving circuit 119, a vertical driving unit 115, and a vertical driving circuit 120, respectively. Further, the light source unit 101 is connected to a light source driving circuit 113, and the light source driving circuit 113, the horizontal driving circuit 119, and the vertical driving circuit 120 are connected to a control circuit 121, and while synchronized with the control circuit 121, the light emitting time of the light source unit 101 and the deflecting operations of the scanning mirrors 105a and 105b are controlled. The control circuit 121 is inputted with an image signal from an unillustrated signal inputting unit, and based on that input signal, the control circuit 121 performs a control.

In FIG. 20, an arrow mark 117 indicates a swinging direction of the horizontal scanning mirror 105a. The surface 107 to be scanned is optically scanned with the light beam deflected by the horizontal scanning mirror 105a, and the light beam forms the scanning lines such as outward scanning lines 108 and homeward scanning lines 109 shown in FIG. 20.

An arrow mark 118 indicates a swinging direction of the vertical scanning mirror 105b. The vertical scanning mirror 105b is rotated in the direction of the arrow mark 118, so that the optical scanning is performed on the surface 107 to be scanned in the direction of an arrow mark 112. Consequently, on the surface 107 to be scanned, the scanning lines reciprocating such as the scanning lines 108 and 109 are formed from the top to bottom. When the beam spot comes to the bottom of the surface 107 to be scanned, the vertical scanning mirror 105b returns the beam spot up to the upper end of the scanning surface 107, and after that, performs repeat scanning. The light beam is scanned up to the outside of an effective part 110 of the scanning surface 107, and by the part thereof, is optically detected so as to take a synchronized timing.

For example, presume that the image formed within the effective part 110 of the scanning surface 107 is an image of a SVGA having 800 pixels in the horizontal direction and 600 pixels in the vertical direction. When the operation in the vertical direction is driven at 60 Hz, the number of the horizontal scanning lines becomes 300 each for the outward direction and the homeward direction, and therefore, the resonance frequency of 18 KHz is required. That is, the driving frequency is low in the second scanning direction rather than the first scanning direction.

In FIG. 20, for the sake of simplicity, the outline is indicated by way of thinning out the scanning lines.

Figure 21:
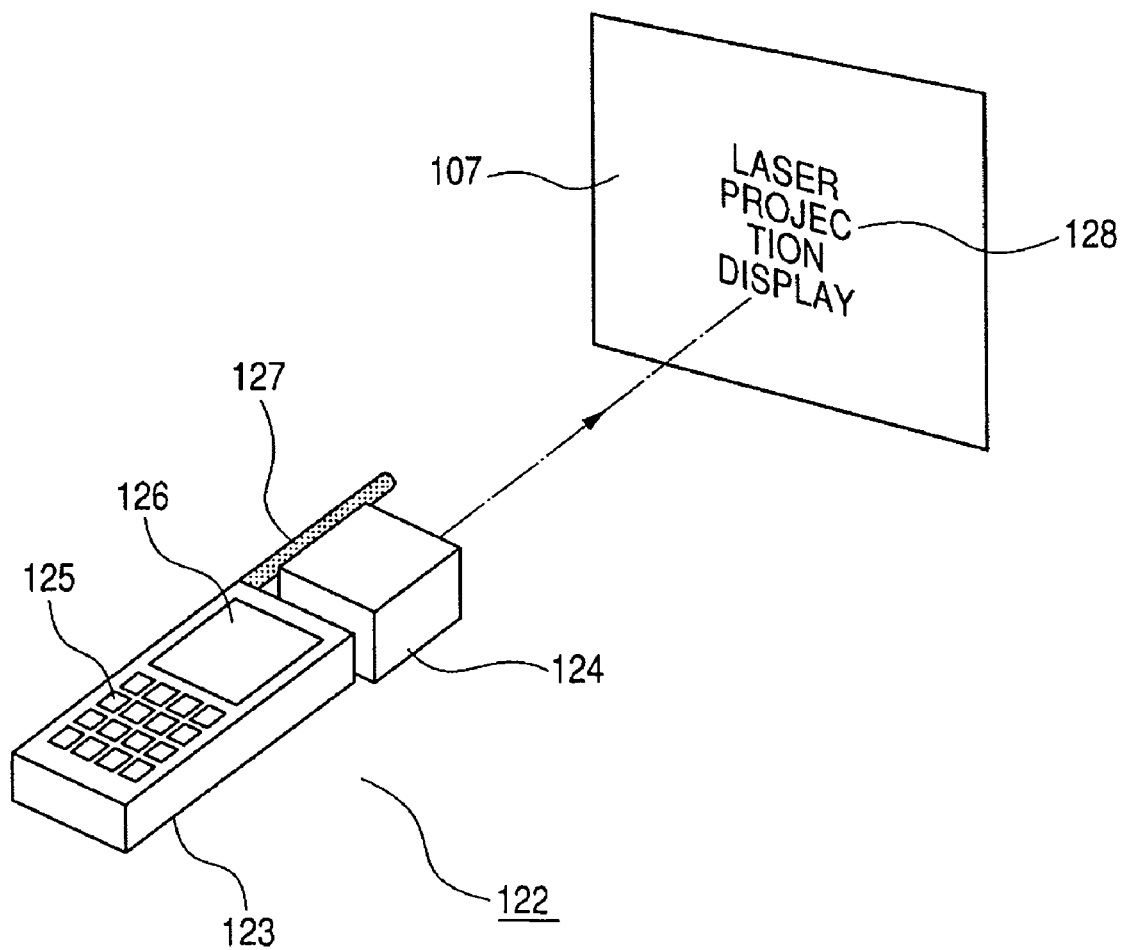
FIG. 21 is a main part schematic diagram of a scanning type image display apparatus in the first embodiment.

FIG. 21 is a main part schematic diagram of other embodiments of the scanning type image display apparatus of the present invention.

In FIG. 21, a portable device 122 has a projection display unit 124 connected to a main body unit 123. The projection display unit 124 is mounted with the two-dimensional optical scanning device of the first embodiment 1. The portable device 122 has an input unit 125, and is constituted such that all the operations are performed by the input unit 125. The portable device 122 is provided with an antenna 127, and can transmit and receive data. The main body unit 123 comprises the display unit 126 such as a liquid crystal panel, an organic EL, and the like. With respect to character information, simple images, and the like, an unillustrated user can directly watch the display unit 126, while hand-carrying the portable device 122. However, in case he wants to observe through a much larger screen or it is not possible to watch by the area of the display unit 126, the image can be projected from the projection display unit 124 by the operation of the user. For example, the image is projected toward the scanning surface 107 such as a wall, thereby displaying the scanning image 128.

Figure 22:
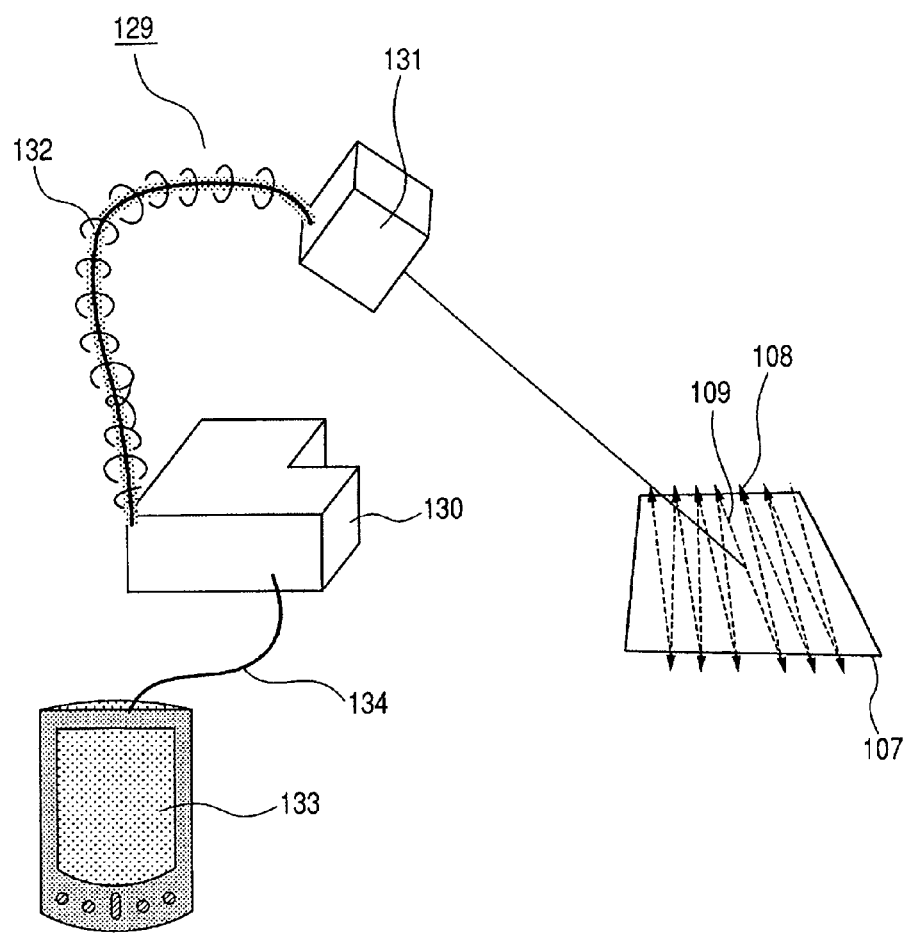
FIG. 22 is a main part schematic diagram of a scanning type image display apparatus in the first embodiment.

FIG. 22 is a main part schematic diagram of other embodiments of the scanning type image display apparatus of the present invention.

The scanning type image display apparatus 129 is constituted by three constituent elements of a main body unit 130, a head unit 131, and a connecting unit 132. A light source unit and a condenser lens system are stored in the main body unit 130, and a convergent optical system, a scanning unit and a two-dimensional scanning optical system are stored in the head unit 131.

The connecting unit 132 connecting the main body unit 130 and the head unit 131, for example, is constituted by an optical fiber, and supplies the light beam emitted from the light source unit to the head unit 131. In this manner, for example, a depiction is made on the scanning surface 107 such as on a desk by the scanning lines 108 and 109, thereby displaying the image. At this time, for example, if a portable information terminal 133 and the scanning type image display apparatus 129 such as PDA are connected by a cable 134, a small screen of the portable information terminal 133 can be watched in a large screen projected by the scanning type image display apparatus 129.

Second Embodiment

Figure 23A:
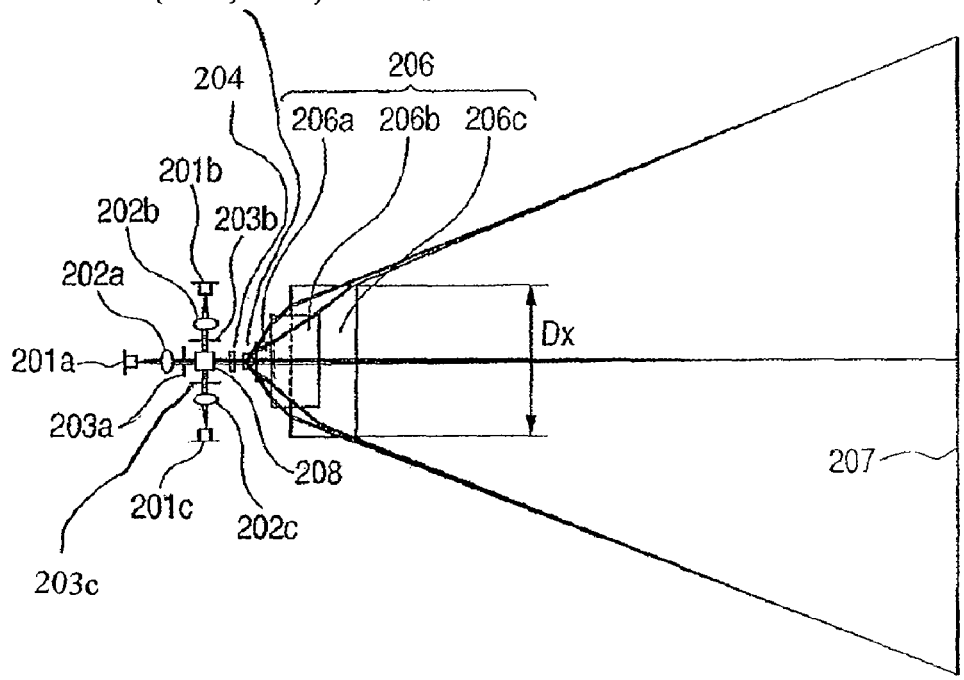
FIGS. 23A and 23B are cross sectional views of a secondary dimensional scanning device in a second embodiment.
Figure 23B:
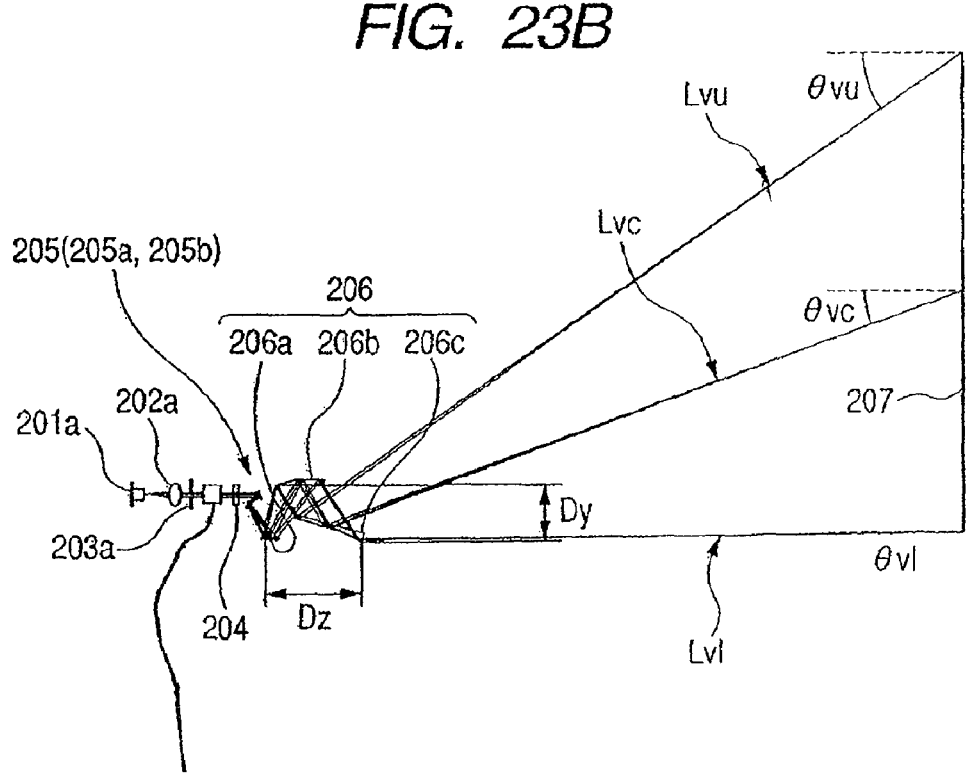

FIG. 23A is a horizontal scanning cross sectional view in an optical scanning device of a second embodiment, and FIG. 23B is its vertical scanning cross sectional view.

In FIGS. 23A and 23B, reference numeral 201 denotes a light source unit comprising three color lasers of a green color semiconductor laser 201a radiating a green color light, a red color semiconductor laser 201b radiating a red color light, and a blue color semiconductor laser 201c radiating a blue color light. The three color divergent light beams emitted from the light source unit 201 are converted into parallel light beams by the corresponding condenser lenses 202a, 202b, and 202c, respectively, and are limited in each light beam width by aperture-stops 203a, 203b, and 203c, respectively. After that, the laser beams of the red color, the green color, and the blue color are synthesized into a while color light beam by a dichroic prism 208, which is beam synthesizing means.

The synthesized white color light beam is converted into a convergent light beam having a desired convergent degree by the convergent optical system 204, and becomes an incident light beam to enter a scanning unit 205 to be described later. Reference numeral 205 denotes a two-dimensional scanning unit, and similarly to the first embodiment, is constituted by a MEMS mirror (first deflector) 205a with sine-wave drive in a horizontal scanning direction and a deflection mirror (second deflector) 205b with pyramidal-wave drive at the equiangular speed in a vertical scanning direction.

The two-dimensional scanning unit 205, for example, may be constituted by a deflector having a reflecting surface and capable of resonating in the two-dimensional direction.

The scanning is performed with the light beam emitted from the light source unit 201 in the horizontal scanning direction and the vertical scanning direction by the scanning unit 205. Here, the frequency in the horizontal scanning direction is set high and the frequency in the vertical scanning direction is set low, thereby depicting the scanning line in the horizontal scanning direction.

Reference numeral 206 denotes a two-dimensional scanning optical system constituted by three mirrors 206a, 206b, and 206c, and forms the image of the light beam scanned in the two-dimensional direction by the scanning unit 205 as a spot on the scanning surface 207 or in its vicinity.

The light beam deflected for scanning by the scanning unit 205 is guided onto the scanning surface 207 through the two-dimensional scanning optical system 206, and optically scans on the scanning surface 207 which is a screen. In this manner, the optical scanning is performed by the scanning unit 205 in the two-dimensional direction, thereby displaying a two-dimensional image on the screen (the scanning surface) 207.

The second embodiment, similarly to the first embodiment, allows the first mirror 206a and the second mirror 206b to be tilted in the vertical scanning direction where a reference light beam Lvc obliquely enters the screen 207, thereby folding an optical path of the light beam.

Figure 24:
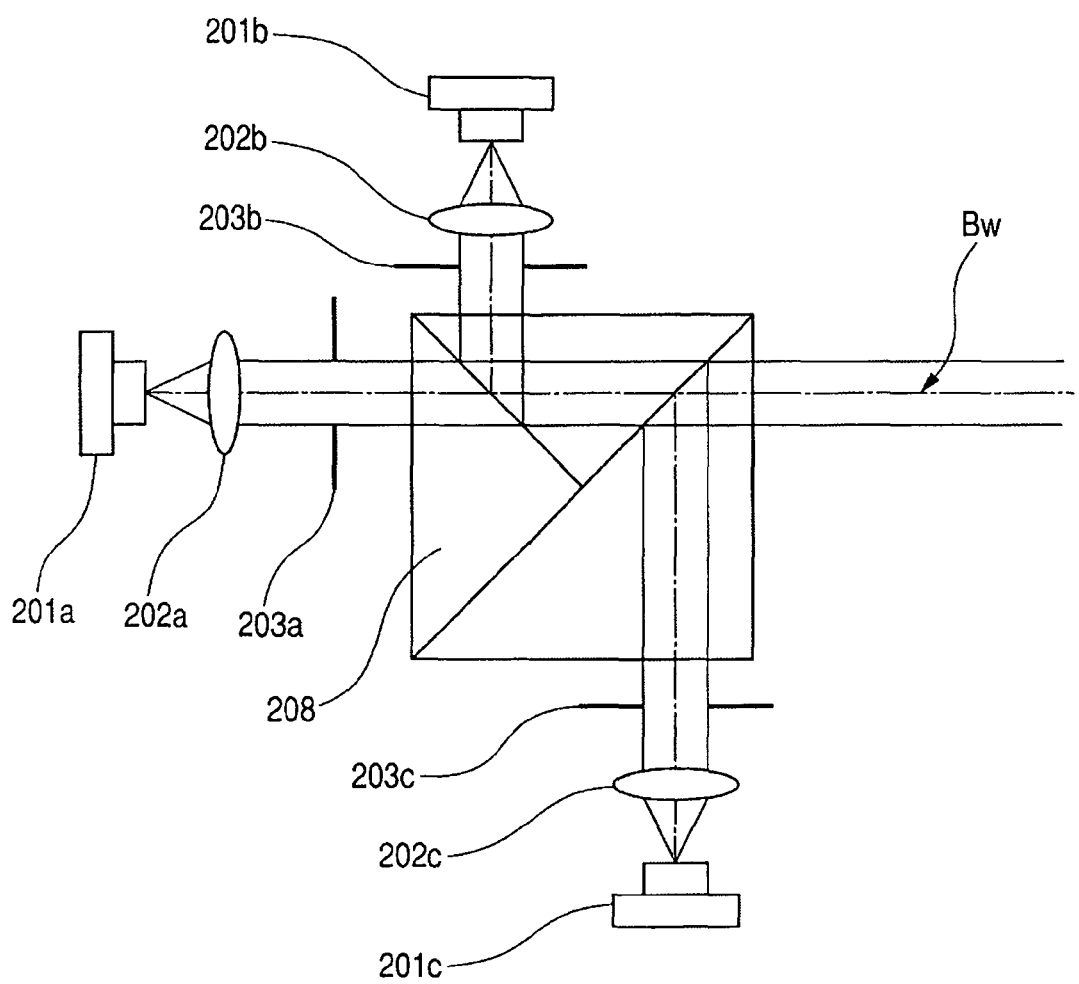
FIG. 24 is a main part schematic diagram of a light source unit in the second embodiment.

FIG. 24 is a main part schematic diagram of the light source unit of the second embodiment.

The divergent light beam emitted from the green color semiconductor laser 201a is converted into an approximately parallel light beam by a collimator lens 202a, and is further limited in light beam width by an aperture-stop 203a, and enters a dichroic prism 208. The divergent light beam emitted from the red color semiconductor laser 201b is similarly converted into a parallel light beams by a collimator lens 202b, and is limited in light beam width by an aperture-stop 203b, and enters the dichroic prism 208. At this time, by the dichroic prism 208, the green color light beam and the red color light beam are synchronized, and a yellow color light beam is formed. The blue color semiconductor laser 201c is also similarly converted into a parallel light beam by a collimator lens 202c, and is limited in light beam width by an aperture-stop 203c, and enters the dichroic prism 208. The yellow color light beam and the blue color light beam are synthesized, and a white color light beam is formed. The white color light beam is guided to the scanning unit 205.

The second embodiment, similarly to the first embodiment, displays the scanning image on the screen 207 by an oblique projection. At this time, the reference light beam Lvc enters the screen 207 at 19.7 (deg) in the vertical scanning direction. The angle θvu by which the light beam Lvu reaching on the upper part of the screen 207 enters the screen 207 is 34.7 (deg), and the angle θvi by which the light beam Lvi reaching on the bottom of the screen 207 enters the screen 207 is 0.47 (deg).

Further, the incidence light beam from the light source unit 201 is allowed to obliquely enter the reflecting surface of a first deflector 205a at an incidence angle 20 (deg) in the vertical scanning direction, and broadens a deflectable light beam width, in comparison with the first embodiment.

In this manner, the scanning direction in which the reference light beam Lvc obliquely enters the screen 207 and the scanning direction in which the reference light beam Lvc is allowed to obliquely enter the scanning unit 205 are made into the same scanning direction, so that the TV distortion and the trapezoidal distortion can be easily corrected by the two-dimensional optical system 206.

In the second embodiment, the laser light beams of the three colors of the red color, the green color, and the blue color are oscillated in the light source unit 201, and based on each image signal, optical modulation is performed, and a color image is displayed on the screen 207.

When the color image is displayed, there is a problem that a color misregistration is generated, and an image quality is deteriorated. Particularly, in case the two-dimensional scanning optical system 206 is constituted only by plastic lenses, since the dispersion range of plastic is narrow, the correction of the chromatic aberration is difficult, and a problem of the color misregistration arises significantly. However, since the two-dimensional scanning optical system 206 of the present embodiment is constituted by three mirrors 206a, 206b, and 206c, the chromatic aberration is not generated, and therefore, there is a merit in that the color misregistration of the color image is not generated.

In this manner, in case the light source unit 201 generating plural wavelengths is used, plural scanning mirrors are preferably used for the two-dimensional scanning optical system 206, so that the image of high quality which always generates no color misregistration can be displayed. Naturally, it is also possible to substantially control the chromatic aberration even when the lens is provided in the two-dimensional scanning optical system 206. In this case, similarly to the lens 106c of the first embodiment, if the scanning lens is configured to have a concave meniscus shape on the side of the surface to be scanned and is constituted to have almost no power, the chromatic aberration can be controlled to be small, and it is effective.

Table 4 shows numerical value examples of the constitution of the two-dimensional scanning optical system 206 in the second embodiment.

In the two-dimensional scanning optical system 206 of the second embodiment also, three mirrors 206a, 206b, and 206c are disposed shifted and tilted in the vertical scanning direction. The shape of the reflecting surface is symmetrical with respect to the center in the horizontal scanning direction, and is a rotational asymmetrical surface which is asymmetrical in the vertical scanning direction.

In this manner, the TV distortion generated by the two-dimensional scanning, the trapezoidal distortion generated by the oblique projection, and the scanning distortion such as the bending of the scanning line and the like generated by the oblique incidence are suitably corrected.

Figure 25:
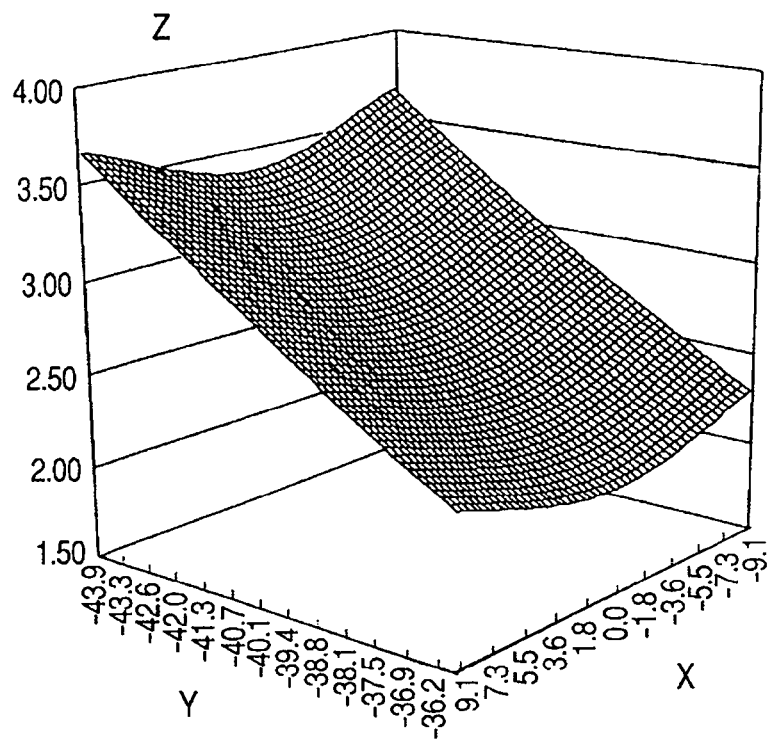
FIG. 25 is a main part schematic diagram of the shape of the first scanning mirror in the second embodiment.
Figure 26:
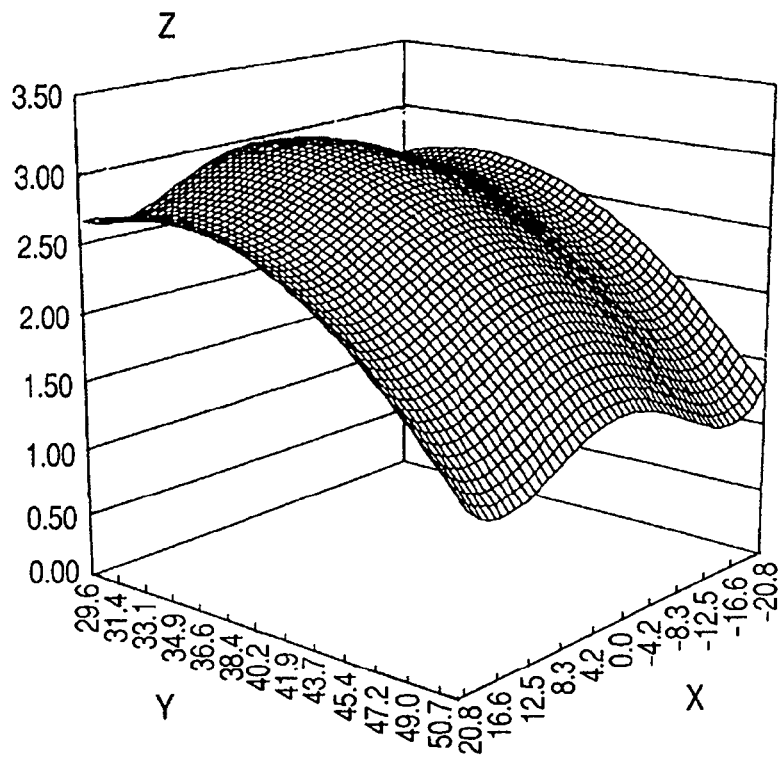
FIG. 26 is a main part schematic diagram of the shape of the second scanning mirror in the second embodiment.
Figure 27:
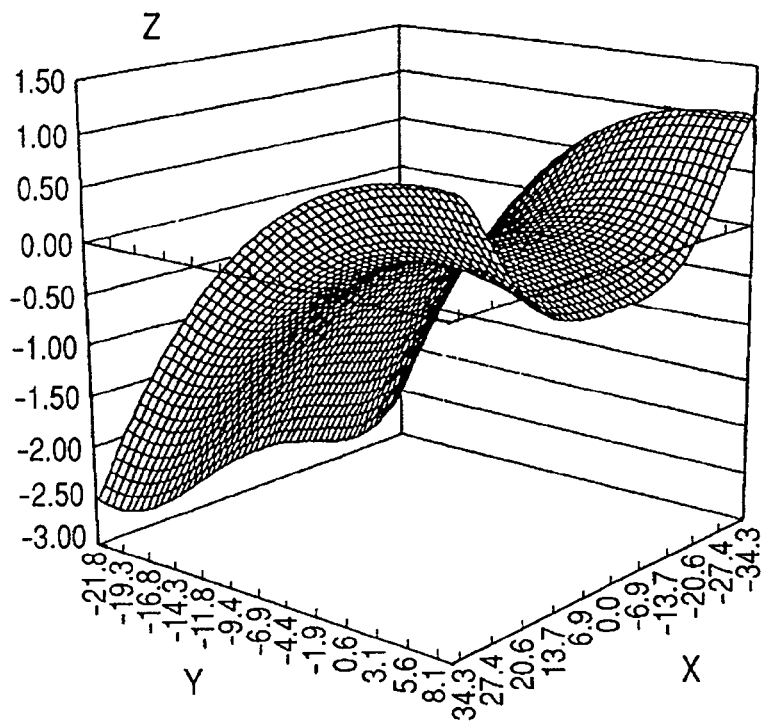
FIG. 27 is a main part schematic diagram of the shape of a third scanning mirror in the second embodiment.

FIG. 25 is a view schematically showing a shape of the reflecting surface of the first mirror 206a, FIG. 26 is a view schematically showing a shape of the reflecting surface of the second mirror 206b, and FIG. 27 is a view schematically showing a shape of the reflecting surface of the third mirror 206c.

Figure 28:
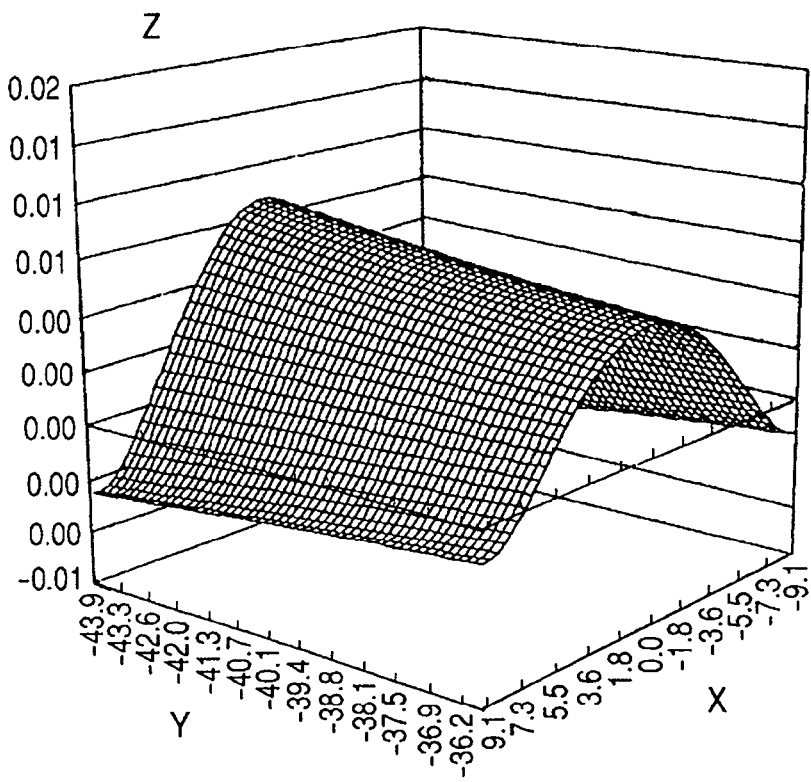
FIG. 28 is a main part schematic diagram of the second order derivative of the first scanning mirror in the second embodiment.
Figure 29:
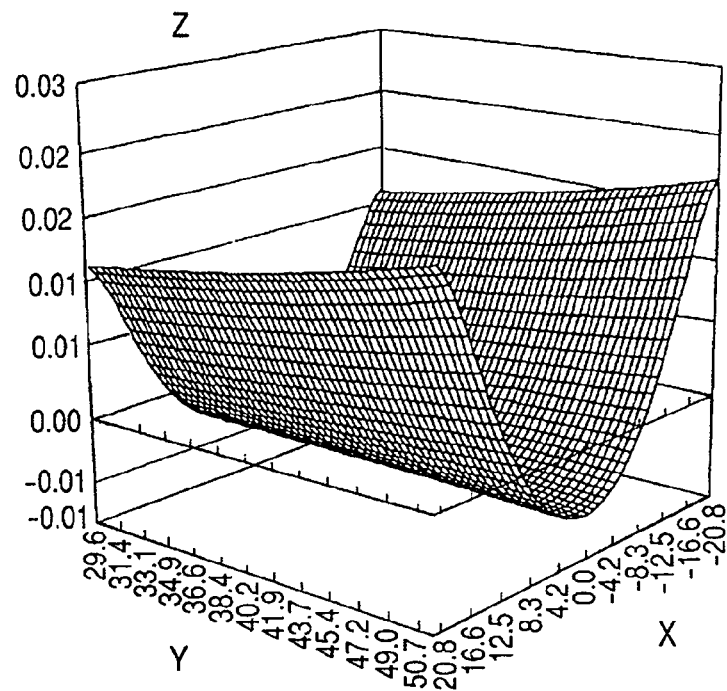
FIG. 29 is a main part schematic diagram of the second order derivative of the second scanning mirror in the second embodiment.
Figure 30:
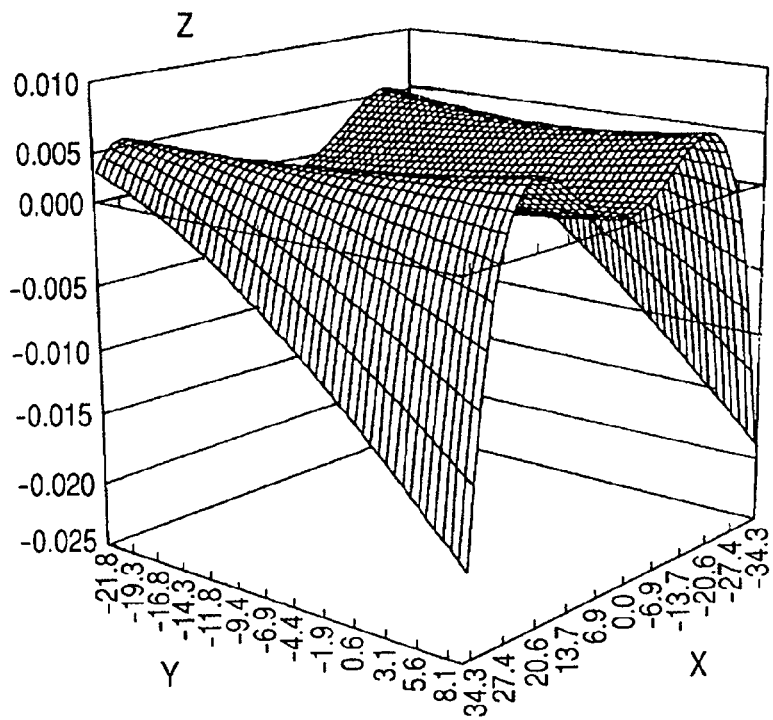
FIG. 30 is a main part schematic diagram of the second order derivative of the third scanning mirror in the second embodiment.

FIG. 28 shows a second order derivative in the horizontal scanning direction in the first mirror 206a, FIG. 29 shows a second order derivative in the horizontal scanning direction in the second mirror 206b, and FIG. 30 shows a second order derivative in the horizontal scanning direction in the third mirror 206c.

The surface shape of the first mirror 206a will be described.

The first mirror 206a is a reflecting surface where the light beam enters from the minus side of the z coordinate within the surface and is exited to the minus side.

As shown in FIG. 25, in the horizontal scanning direction, the center is shaped like a convex shape, and gradually becomes a flat surface from the convex shape toward the periphery, and further changes to a concave surface. Further, as shown in FIG. 28, the second order derivative is positive in the center in the horizontal scanning direction, and is gradually reduced toward the periphery, and becomes negative after passing through zero. This surface is a flat surface in which the shape thereof changes from convex to flat, and then concave.

The second mirror 206b is also a reflecting surface where the light beam enters from the minus side of the z coordinate within the surface and is exited to the minus side.

The second mirror 206b, as shown in FIG. 26, is concave in the center in the horizontal scanning direction, and gradually becomes flat toward the periphery, and further changes into convex. As shown in FIG. 29, the second order derivative is negative in the center in the horizontal scanning direction, and is gradually increased toward the periphery, and becomes positive after passing through zero. In such a surface, the more peripheral side from the center in the horizontal operation, the stronger the operation to direct the light beam toward outside. Further, this shape is a surface shape continuously arranged in the vertical scanning direction. That is, the reflecting surface of the second mirror 206b is a "two-dimensional arcsine correction surface", and has an effect of correcting the optical scanning speed of all the scanning lines on the screen 207 at a constant speed.

The third mirror 206c is a reflecting surface where the light beam enters from the plus side of the z coordinate within the surface and is exited to the plus side. As shown in FIG. 27, the reflecting surface has a convex surface mainly in the vertical scanning direction, and diffuses the light beam in the vertical scanning direction. Further, the direction of the light beams entering the third mirror 206c is aligned so that the light beams reaching the periphery in the horizontal scanning direction and arranged in the vertical scanning direction, which are made concave in the horizontal scanning direction at the periphery in the horizontal scanning direction, pass through the same optical path, when seen within a horizontal scanning cross section. In this manner, the TV distortion and the trapezoidal distortion of the vertical lines on the screen 207 can be corrected.

Figure 31:
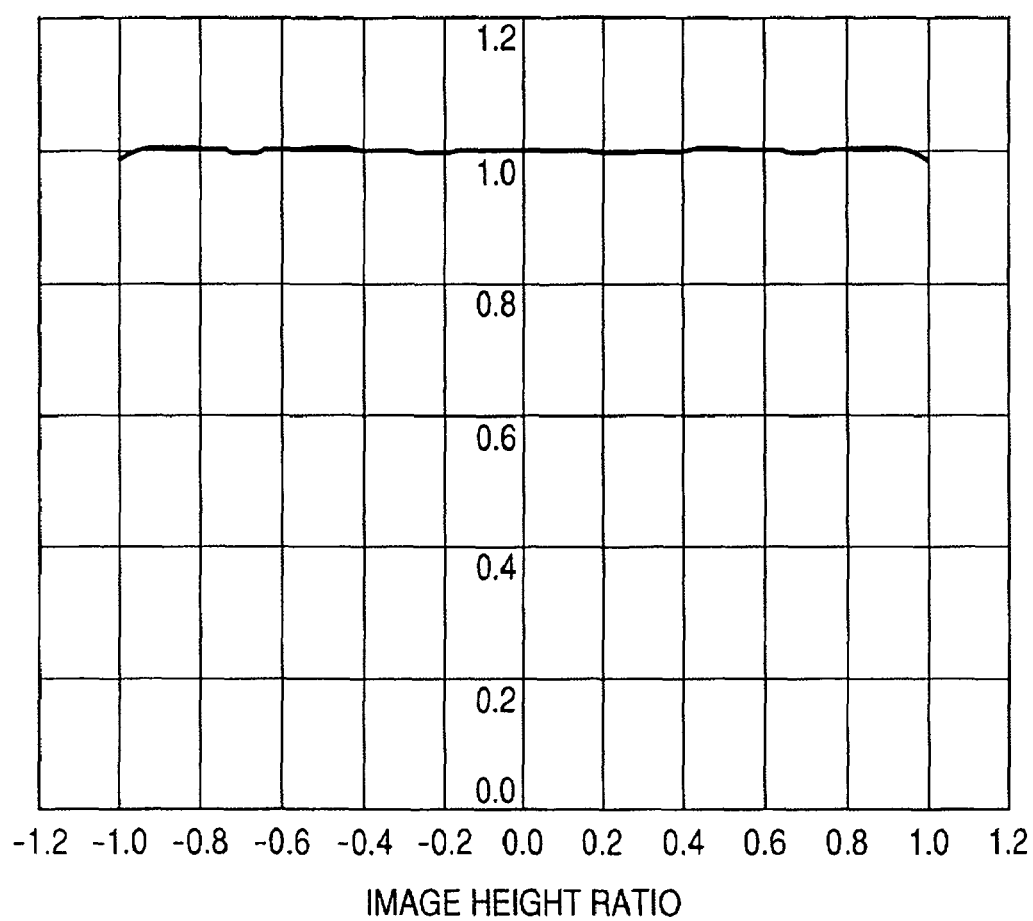
FIG. 31 is a main part schematic diagram of a scanning speed ratio in the second embodiment.

FIG. 31 shows a scanning speed ratio on the surface to be scanned in the optical scanning device of the second embodiment.

FIG. 31 shows the scanning speed ratio with respect to the scanning line passing through the center vicinity of the scanning image, where the optical scanning speed is approximately constant across the whole scanning lines, and its error is 1.56(%) at the maximum.

Figure 32:
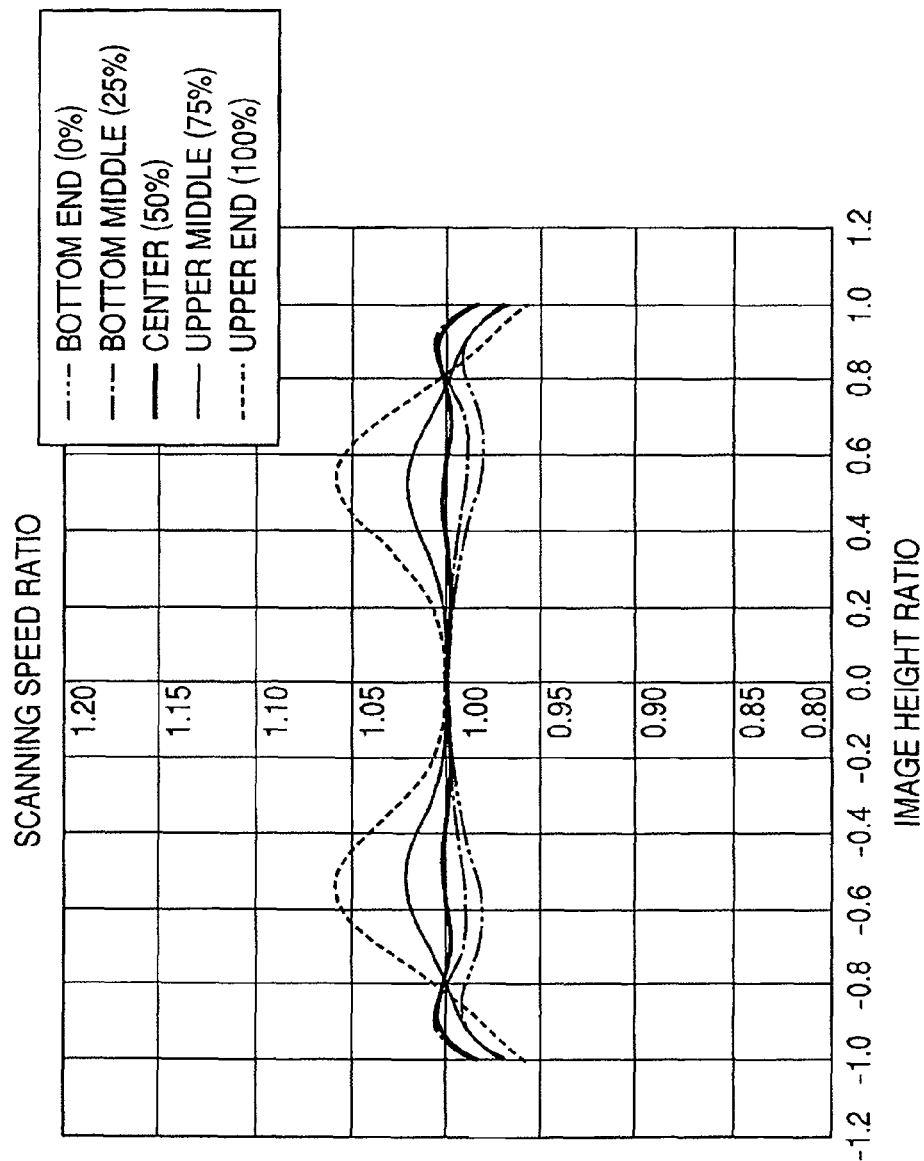
FIG. 32 is a main part schematic diagram of a scanning speed ratio in the second embodiment.

FIG. 32 shows a scanning speed ratio on the scanning surface to be scanned in the optical scanning device of the second embodiment.

FIG. 32 shows a scanning speed ratio with respect to five scanning lines passing through the scanning image of the bottom end (vertical 0% image height), the bottom middle (vertical 25% image height), the center (vertical 50% image height), the upper middle (vertical 75% image height), and the upper end (vertical 100% image height). At this time, the error of the scanning speed ratio is 5.78(%) at the maximum, and can be sufficiently corrected in homogenization of the light quantity distribution in the horizontal scanning direction.

In this manner, in the optical scanning device in the second embodiment, by using the arcsine correction surface, the arcsine correction is suitably performed across the whole image depicting region in the horizontal scanning direction.

Figure 33:
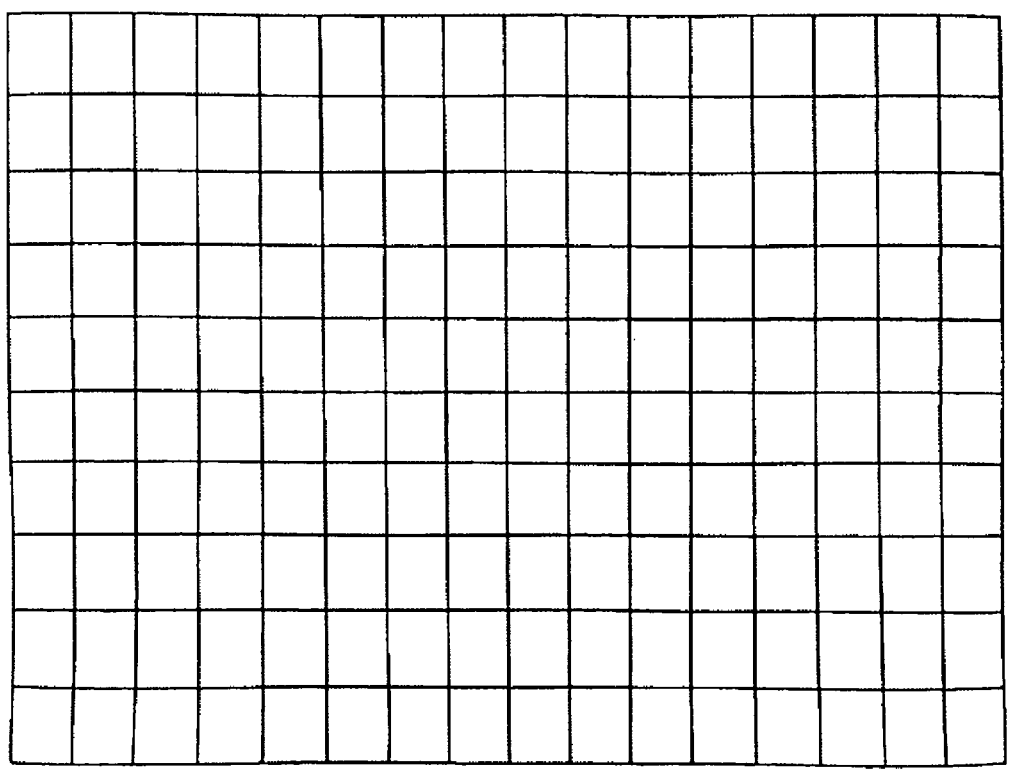
FIG. 33 is a main part schematic diagram of a scanning image (grid) in the second embodiment.

FIG. 33 shows a scanning image (a grating) in the optical scanning device of the second embodiment, and Table 5 shows the values of TV distortion and the trapezoidal distortion.

As shown in FIG. 33, in the optical scanning device of the second embodiment, by using the two-dimensional scanning optical system 206, the TV distortion and the trapezoidal distortion are suitably corrected. The TV distortion is corrected to an extremely small bending such as −0.07(%) in the upper side, 0.02(%) in the lower side, −0.02(%) in the left side, and 0.02(%) in the right side. Further, the trapezoidal distortion is corrected to an extremely small distortion such as 0.00(%) in the upper and lower sides, −0.08(%) in the left side, and 0.08(%) in the right side. In this manner, by using the two-dimensional scanning optical system 206, the TV distortion and the trapezoidal distortion of the scanning image can be suitable corrected, and a high appearance quality image can be always displayed on the scanning surface 207.

Similarly to the second embodiment, by using an arcsine correction surfaces for the two-dimensional scanning optical system 206, the constant speed scanning property in one of the scanning directions can be secured. Further, by eccentrically disposing two sheets of rotational asymmetrical reflecting surfaces so as to fold the optical path in the scanning direction allowing the oblique projection to be performed, the scanning distortion such as the TV distortion and the trapezoidal distortion can be suitably corrected. At this time, if two rotational asymmetrical reflecting surfaces are provided separately from the arcsine correction surface, arcsine correction function and scanning distortion correction function can be independently performed, and therefore, the correction can be suitably performed.

Further, if the oblique projection is performed from the scanning direction other than the scanning direction performing the arcsine correction, since the arcsine correction and the scanning distortion correction can be independently performed, a good scanning image can be obtained.

Further, similarly to the second embodiment, in case the two-dimensional scanning unit 205 is constituted by combining two deflectors scanning in one dimensional direction, if the deflector performing a sine wave driving is disposed at the light source unit 201 side, the arcsine correction can be easily performed, which is good.

Further, when the light beam from the light source unit 201 is allowed to enter the reflecting surface of the scanning unit 205, by allowing the light beam to obliquely enter from the same scanning direction as the scanning direction where the light beam is allowed to obliquely enter the screen 207, the TV distortion and the trapezoidal distortion of the scanning image can be suitably corrected by the secondary scanning optical system 206.

In the second embodiment also, the direction of the oblique incidence is a vertical scanning direction, and the incidence light beam is allowed to obliquely enter the defecting means 205 from the side (upper side in the Figure) where the light beam of a small incidence angle toward the screen 207 as against the reference light beam Lvc passes through when seen by the optical path from the scanning unit 205 to the secondary scanning optical system 206. In this manner, the TV distortion is further suitably corrected.

In the second embodiment, the oblique projection is performed, where the reference light beam Lvc enters the screen 207 obliquely in the vertical scanning direction. The field angle in the horizontal scanning direction which is the first scanning direction is θd1=±18.9 (deg), the field angle in the vertical scanning direction which is the second scanning direction is θd2=±9.00 (deg), the width in the horizontal scanning direction of the scanning image is Wi1=286.67 (mm), and the width in the second scanning direction is Wi2=215.04 (mm), and therefore θd1/θd2 can be expressed as the following equation, $$\frac{\theta d2}{\theta d1} = 0.63 \times \frac{Wi2}{Wi1},$$

which means that θd1/θd2 satisfies the conditional expression (3). In this manner, by setting the field angle in the vertical scanning direction which is the second scanning direction small, the miniaturization of the secondary scanning optical system 206 is attempted. By setting the field angle in the vertical scanning direction against the horizontal scanning direction to a small ratio, a substantial focal length in the vertical scanning direction is set short, so that the correction of the scanning distortion such as the TV distortion and trapezoidal distortion of the scanning image is made easy. Assuming Dx be the width in the horizontal scanning direction of the secondary scanning optical system 206, Dy be the width in the vertical scanning direction, and Dz be the width in the Z axial direction which is vertical to the horizontal scanning direction and the vertical scanning direction, Dx=34.21 (mm), Dy=26.26 (mm), and Dz=45.32 (mm), and these values satisfy the conditional expressions (4) to (6).

By these equations, the optical scanning device becomes compact, and there is a merit in that the image display apparatus mounting this optical scanning device can be miniaturized.

In this manner, in the secondary scanning system in the second embodiment, since the secondary scanning optical system 206 is constituted only by the mirrors, no chromatic aberration is generated, and even in case the light source unit 201 emitting plural wavelengths is used, a color image having always no color misregistration can be displayed.

The semiconductor laser used in the light source unit 201 can sufficiently obtain the effect of the present invention similarly to the second embodiment even when a wavelength conversion laser is used, which, for example, allows the laser beam emitted from the infrared semiconductor laser to enter an optical crystal provided with a polarization reversal structure and convert the wavelength into half and generate a green color or blue color laser beam.

Third Embodiment

Figure 34A:
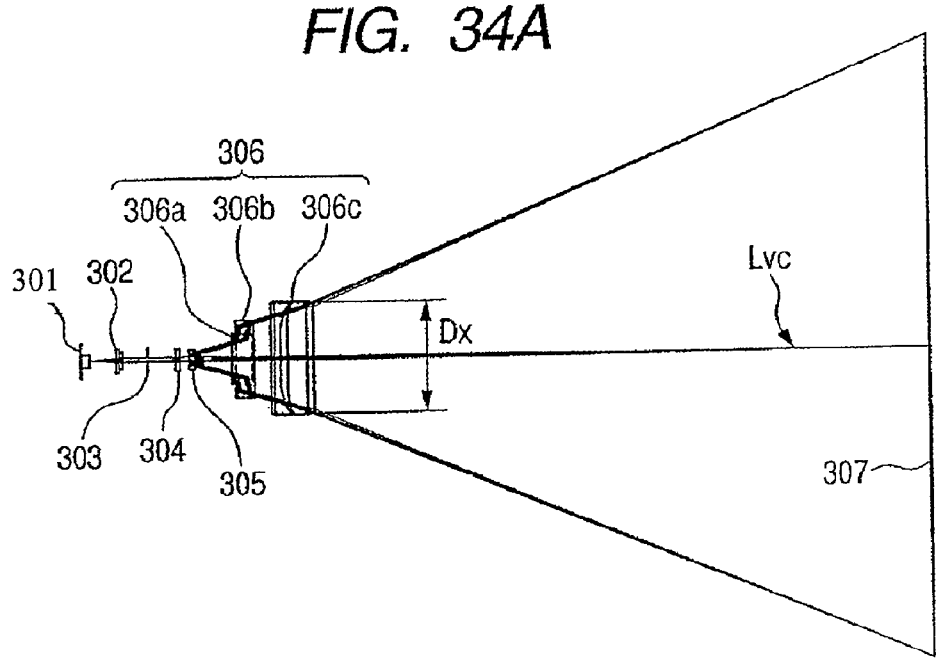
FIGS. 34A and 34B are cross sectional views of a secondary dimensional scanning device in a third embodiment.
Figure 34B:
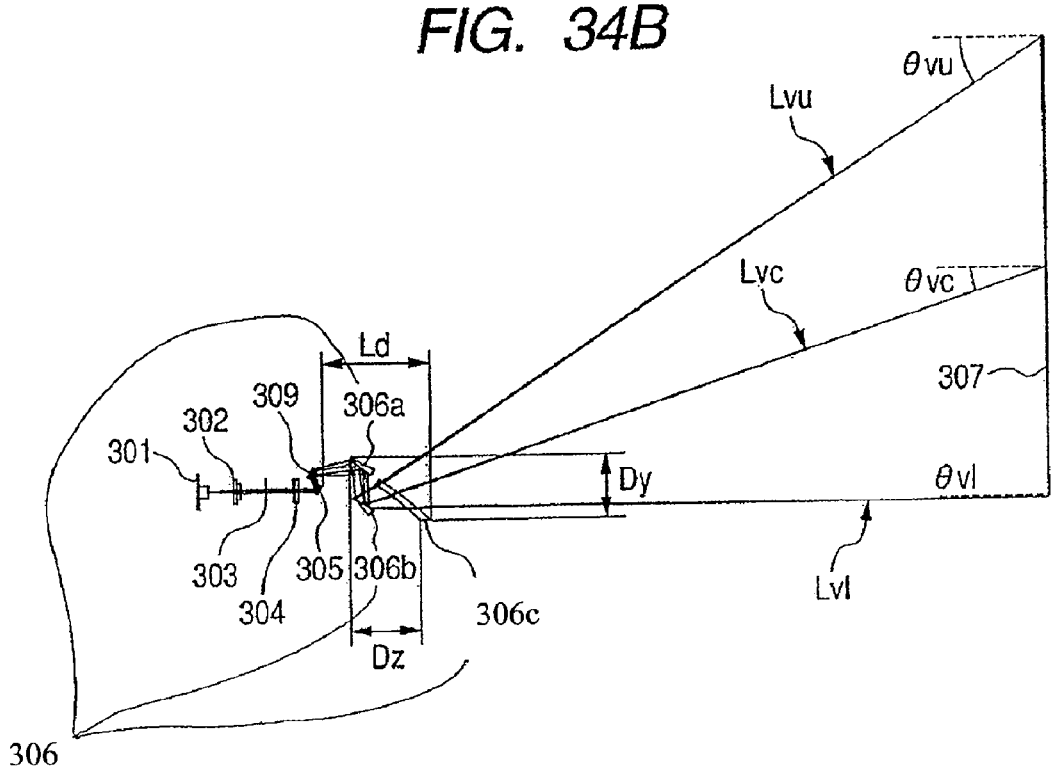

FIG. 34A shows a horizontal scanning cross sectional view of an optical scanning device of a third embodiment, and FIG. 34B shows its vertical scanning cross sectional view.

In FIGS. 34A and 34B, a divergent light beam emitted from a light source unit 301 is converted into a parallel light beam or an approximately parallel light beam by a condenser lens 302, and is further limited in light beam width by an aperture stop 303. The light beam having passed through the aperture stop 303 is converted into a convergent light beam having a desired convergence degree by a convergence optical system 304, and becomes an incident light beam to enter a scanning unit 305 to be described later. The scanning unit 305 is constituted by a deflector capable of scanning in a secondary dimensional direction. This secondary dimensional scanning unit 305 scans the light beam from the light source unit 301 in a horizontal scanning direction and a vertical scanning direction. The scanning unit 305 is driven by a sine wave in the horizontal scanning direction performing a high speed scanning, and is driven at an approximately equiangular speed in the vertical scanning direction performing a low speed scanning, thereby performing a two-dimensional raster scan.

FIG. 35 is a main part schematic diagram of the deflector resonatable in the two-dimensional direction which is the scanning unit 305 of the third embodiment.

In the Figure, a reflecting surface 305-1 is supported by torsion bars 305-2, and is connected to a middle frame 305-3. Further, the middle frame 305-3 is supported by torsion bars 305-4, and is connected to a frame 305-5. Here, when the torsion bars 305-2 are twisted, the reflecting surface 305-1 is deflected in the horizontal scanning direction, and when torsion bas 305-4 are twisted, the reflecting surface 305-1 supported by the middle frame 305-3 is deflected in the vertical scanning direction. In this manner, the deflector 305 can deflect the reflecting surface 305-1 in the two-dimensional direction.

In FIGS. 34A and 34B, reference numeral 306 denotes a two-dimensional optical system, which is constituted by two mirrors 306a and 306b and a lens 306c. The two-dimensional scanning optical system 306 forms an image of the light beam reflected by the two-dimensional scanning unit 305 as a spot on a scanning surface (screen) 307 or in its vicinity. The light beam deflected for scanning by the scanning unit 305 is guided onto the scanning surface 307 through the two-dimensional scanning optical system 306, and optically scans the scanning surface 307 which is a screen.

In the third embodiment also, a reference light beam Lvc enters the screen 307 obliquely in the vertical scanning direction, and an incidence angle is 18.1 (deg). Further, the incidence angle θvu of the light beam Lvu reaching above the screen 307 is 33.0 (deg), and the incidence angle θvl of the light beam Lvl reaching the bottom of the screen 307 is 0.11 (deg).

Figure 36A:
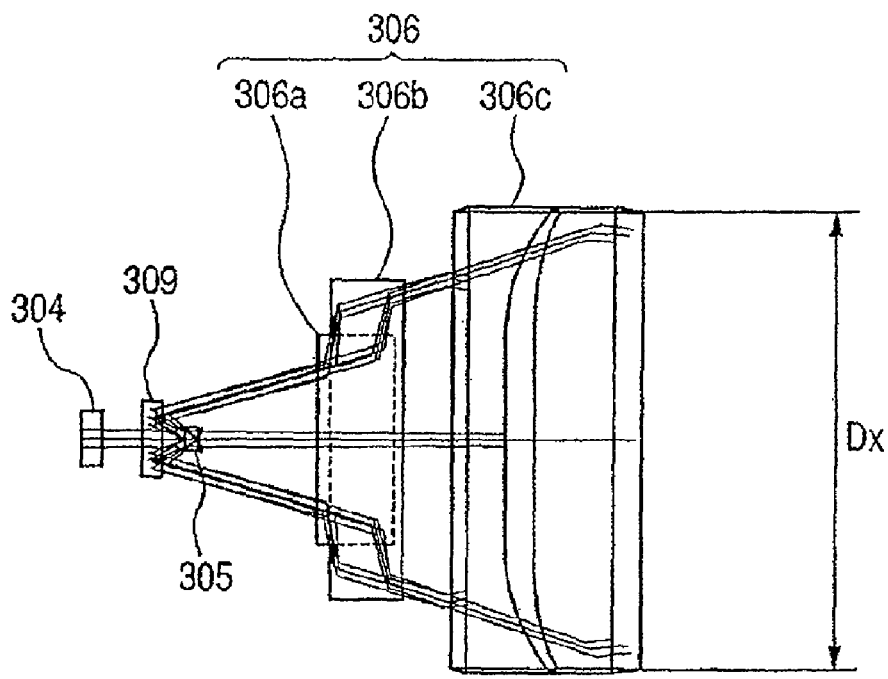
FIGS. 36A and 36B are main part schematic diagrams of the two-dimensional scanning optical system in the third embodiment.
Figure 36B:
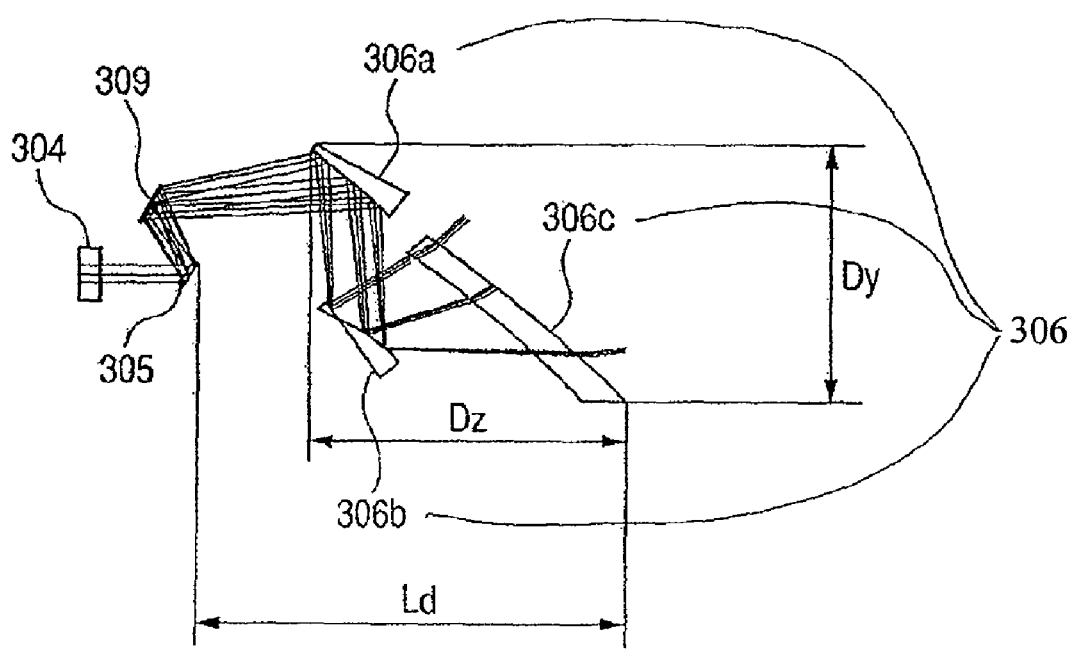

FIGS. 36A and 36B shows main part schematic diagrams of a portion of the third embodiment.

In the third embodiment, the two-dimensional scanning optical system 306 is constituted by two mirrors 306a and 306b and a lens 306c. The light beam from the light source unit is a parallel light beam, and is converted into a convergent light beam by a condenser lens 304 which is a convergent optical system. The convergent light beam is reflected by the two-dimensional scanning unit 305, and is turned back by a flat surface mirror 309 so as to reach the scanning surface 307 through the two-dimensional scanning optical system 306.

This light beam has a natural convergent point approximately 125 (mm) ahead of the condenser lens 304. The optical path length from the condenser lens 304 to a lens 306c which is an optical element located nearest to the side of the scanning surface 307 from among the two-dimensional scanning optical systems 306 is 55.1 (mm) in the center light beam, and is 68.5 (mm) even in the case of the longest deflected light beam, and the natural convergent point of the convergent light beam is located between the two-dimensional scanning optical system 306 and the scanning surface 307.

Table 6 shows various numerical values of the constitution of the two-dimensional optical system 306 of the third embodiment.

Each surface of the first mirror 306a, the second mirror 306b, light incident surfaces 306ci of the lens 306c, and a light exit surface 306co of the scanning lens is a free-form curved surface shape expressed by the Formula (a). Further, these surfaces are symmetrical with respect to the center in the horizontal scanning direction, and are rotational asymmetrical surfaces which are asymmetrical in the vertical scanning direction. Further, each surface is shifted and tilted in the vertical scanning direction, and is disposed so as to fold the optical path of the light beam in the vertical scanning direction.

The third embodiment also, similarly to the first and second embodiments, adopts an oblique projection system. The two rotational asymmetrical reflecting surfaces 306a and 306b are disposed so as to fold the optical path of the light beam in the scanning direction in which the oblique projection is performed, so that the TV distortion and the trapezoidal distortion of the scanning image can be suitably corrected.

Further, when the incidence light beam from the light source unit 301 is allowed to enter the reflecting surface of the scanning unit 305, it is allowed to enter from the same scanning direction as the scanning direction obliquely projecting, so that the TV distortion and the trapezoidal distortion of the scanning image can be suitably corrected by the two-dimensional optical system 306. The oblique incident angle in the third embodiment is 28 (deg).

In the third embodiment also, the direction of the oblique incidence is a vertical scanning direction, and the incidence light beam is allowed to obliquely enter the scanning unit 305 from the side (bottom in FIG. 36B) where the deflection light beam Lvl of a small incidence angle toward the screen 307 against the reference light beam Lvc passes through when seen by the optical path from the scanning unit 305 to the secondary scanning optical system 306. In this manner, the TV distortion is further suitably corrected.

Figure 37:
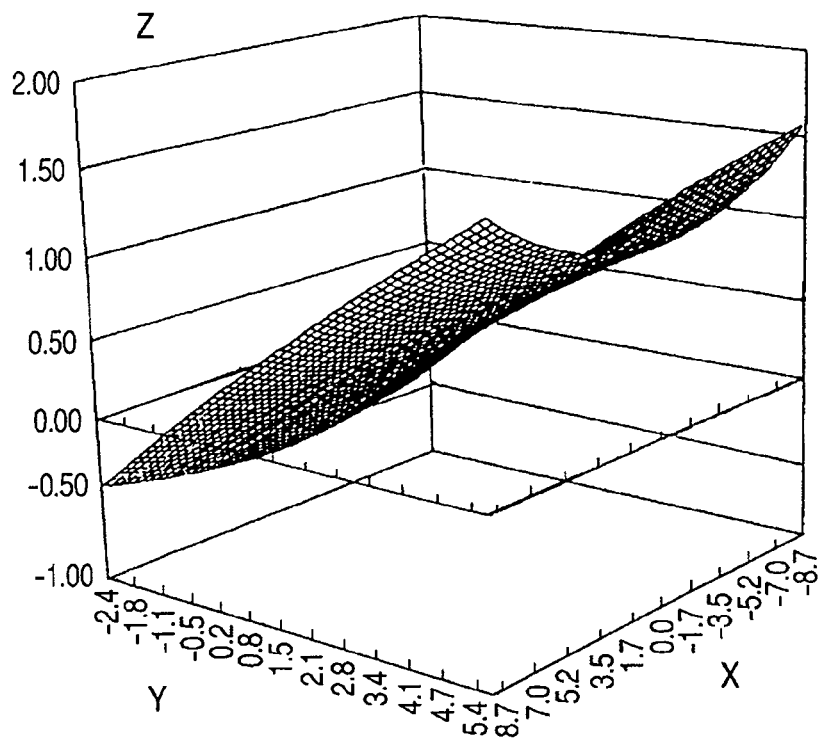
FIG. 37 is a main part schematic diagram of the shape of the first scanning mirror in the third embodiment.
Figure 38:
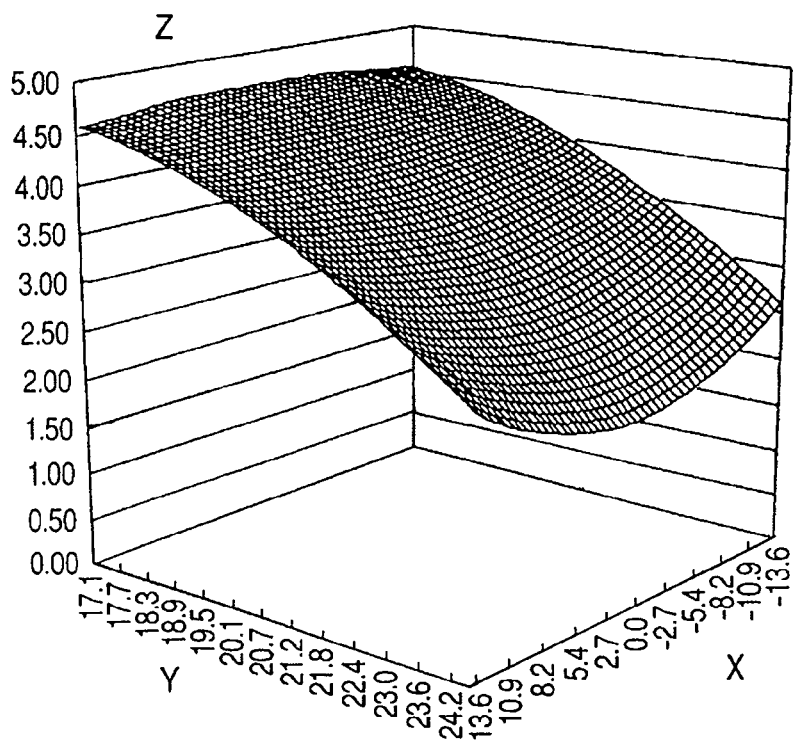
FIG. 38 is a main part schematic diagram of the shape of the second scanning mirror in the third embodiment.
Figure 39A:
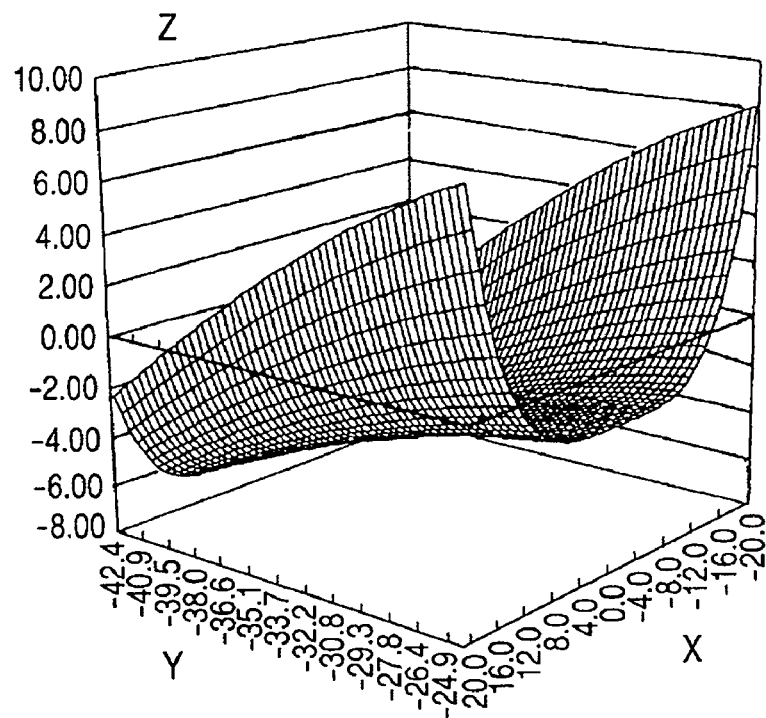
FIGS. 39A and 39B are a main part schematic diagram of the shape of a scanning lens in the third embodiment.
Figure 39B:
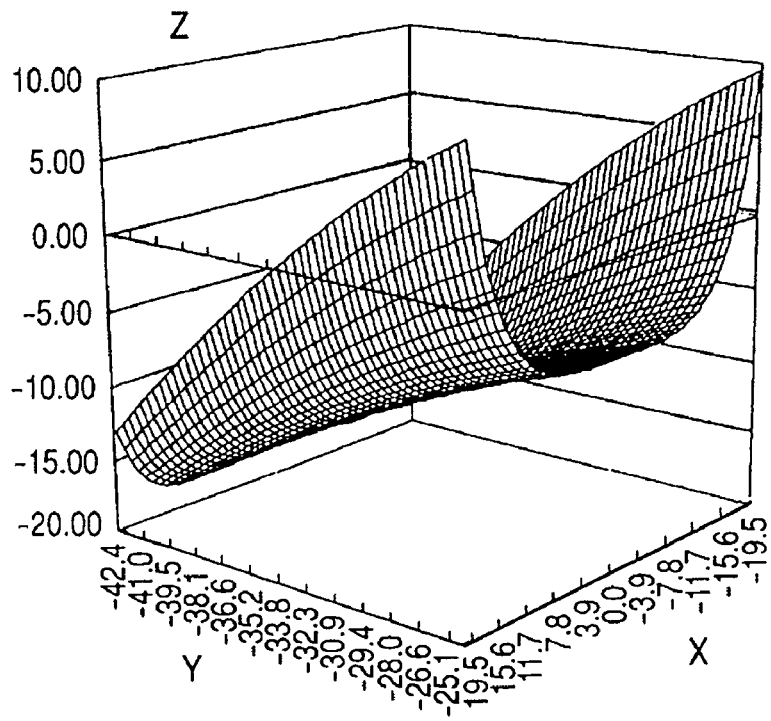

FIG. 37 shows the shape of the first mirror 306c, and FIG. 38 shows the shape of the second mirror 306b. FIG. 39A shows the shape of the incident surface 306ci of lens 306c, and FIG. 39B shows the shape of the light exit surface 306co of the lens 306c.

Figure 40:
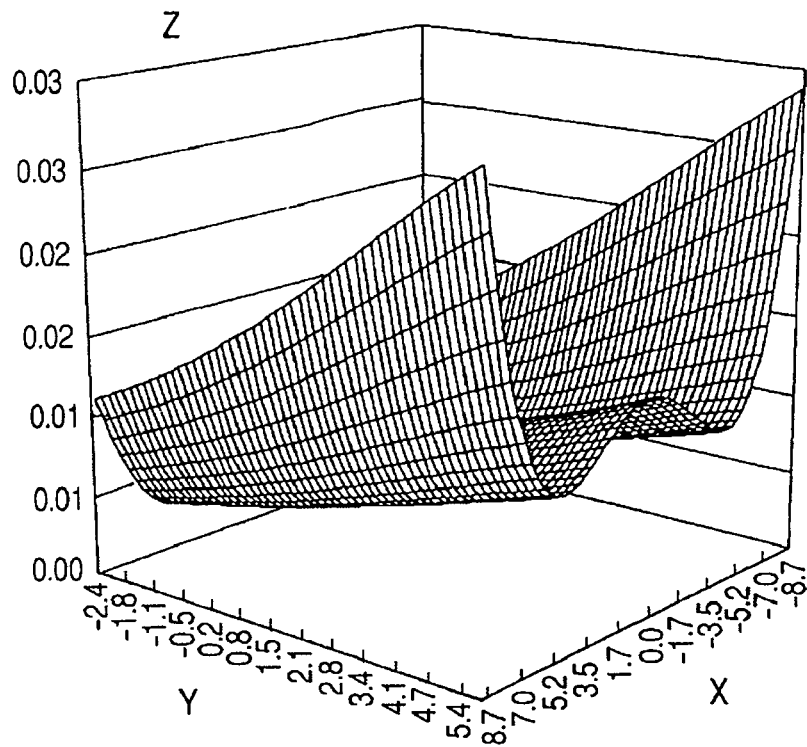
FIG. 40 is a main part schematic diagram of the second order derivative of the first scanning mirror in the third embodiment.
Figure 41:
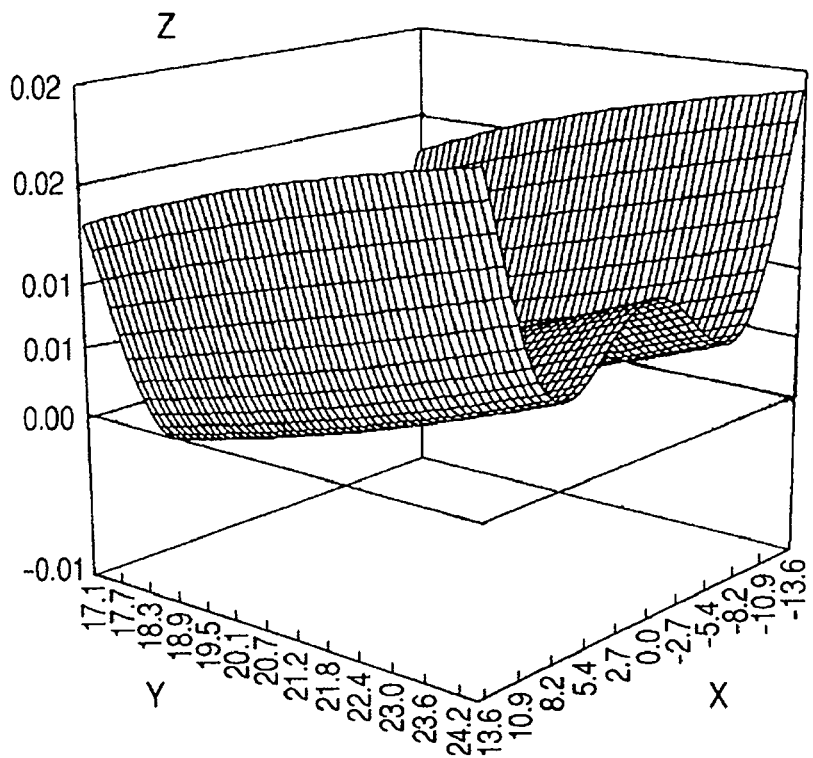
FIG. 41 is a main part schematic diagram of the second order derivative of the second scanning mirror in the third embodiment.
Figure 42A:
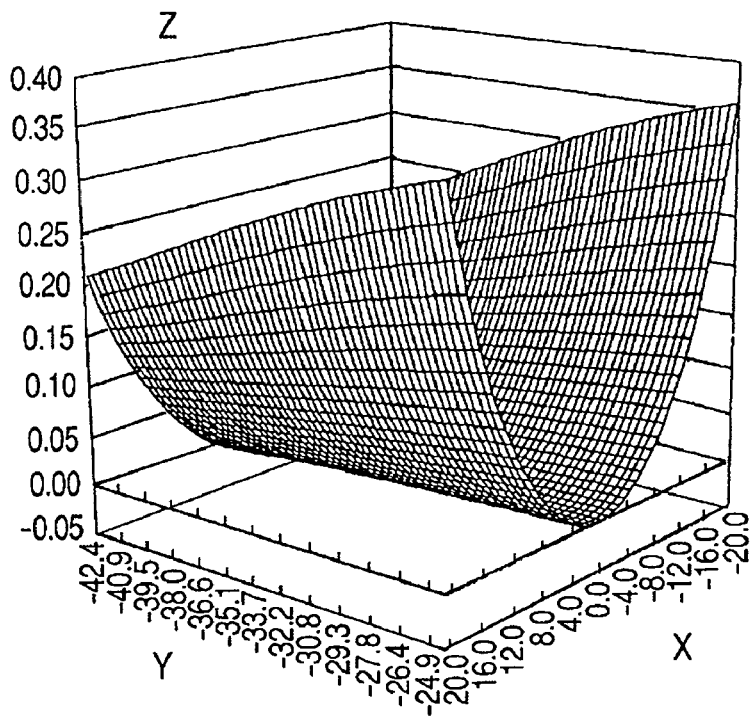
FIGS. 42A and 42B are is main part schematic diagrams of the second order derivative of the scanning mirror in the third embodiment.
Figure 42B:
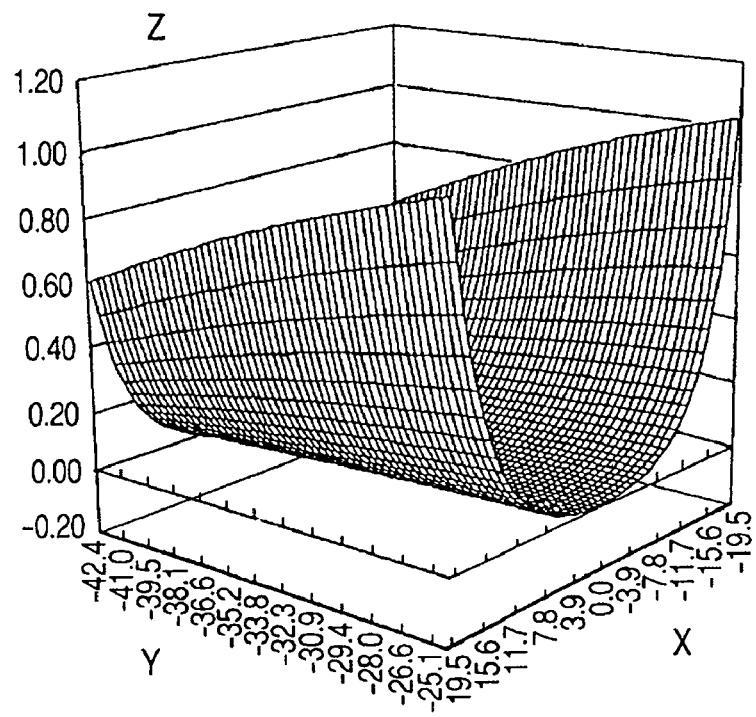

FIG. 40 shows a second order derivative in the horizontal scanning direction of the first mirror 306a, FIG. 41 shows a second order derivative in the horizontal scanning direction of the second mirror 306b, FIG. 42A shows a second order derivative in the horizontal scanning direction of the light incident surface 306ci of the lens 3036c, and FIG. 42B shows a second order derivative in the horizontal scanning direction of the light exit surface 306co of the lens 306c.

As shown in FIG. 42B, the second order derivative in the horizontal scanning direction of the light exit surface 306co of the scanning lens 306c gradually increases toward the periphery from the center of the horizontal scanning direction. This is a direction to diverge the light beam. And such a shape forms a "two-dimensional arcsine correction surface" where such a shape is arranged in the vertical scanning direction.

The two-dimensional scanning unit 305 sine-drives in the horizontal scanning direction, and the optical scanning speed decreases at the periphery in the horizontal scanning direction.

The third embodiment constitutes the light exit surface 306co of the lens 306c into the "two-dimensional arcsine correction surface", so that, the more peripheral portion of the lens where the light beam transmit in the horizontal scanning direction, the more the traveling direction is directed toward the outside, and as approaching to the periphery from the center of the scanning image, the optical scanning speed is gradually increased.

Figure 43:
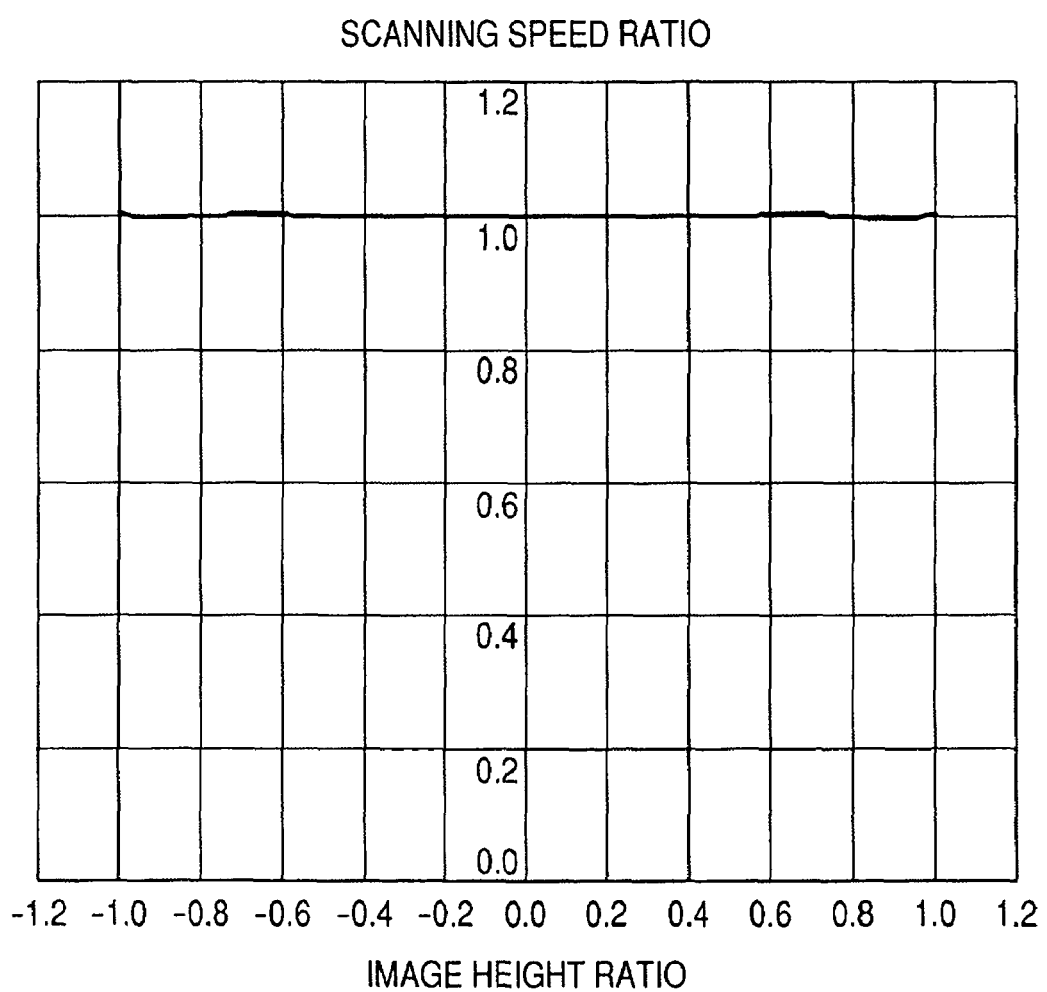
FIG. 43 is a main part schematic diagram of the scanning speed ratio in the third embodiment.

FIG. 43 shows a scanning speed ratio of the scanning light on the surface 307 to be scanned of the optical scanning device of the third embodiment. This shows the scanning speed ratio of each image height for the optical scanning speed in the center vicinity with respect to the scanning lines passing through the center of the image displayed on the screen 307. The error of the constant speed scanning property is 0.25% at the maximum, and it is recognized that the arcsine correction is suitably realized across the whole region of the scanning lines.

Figure 44:
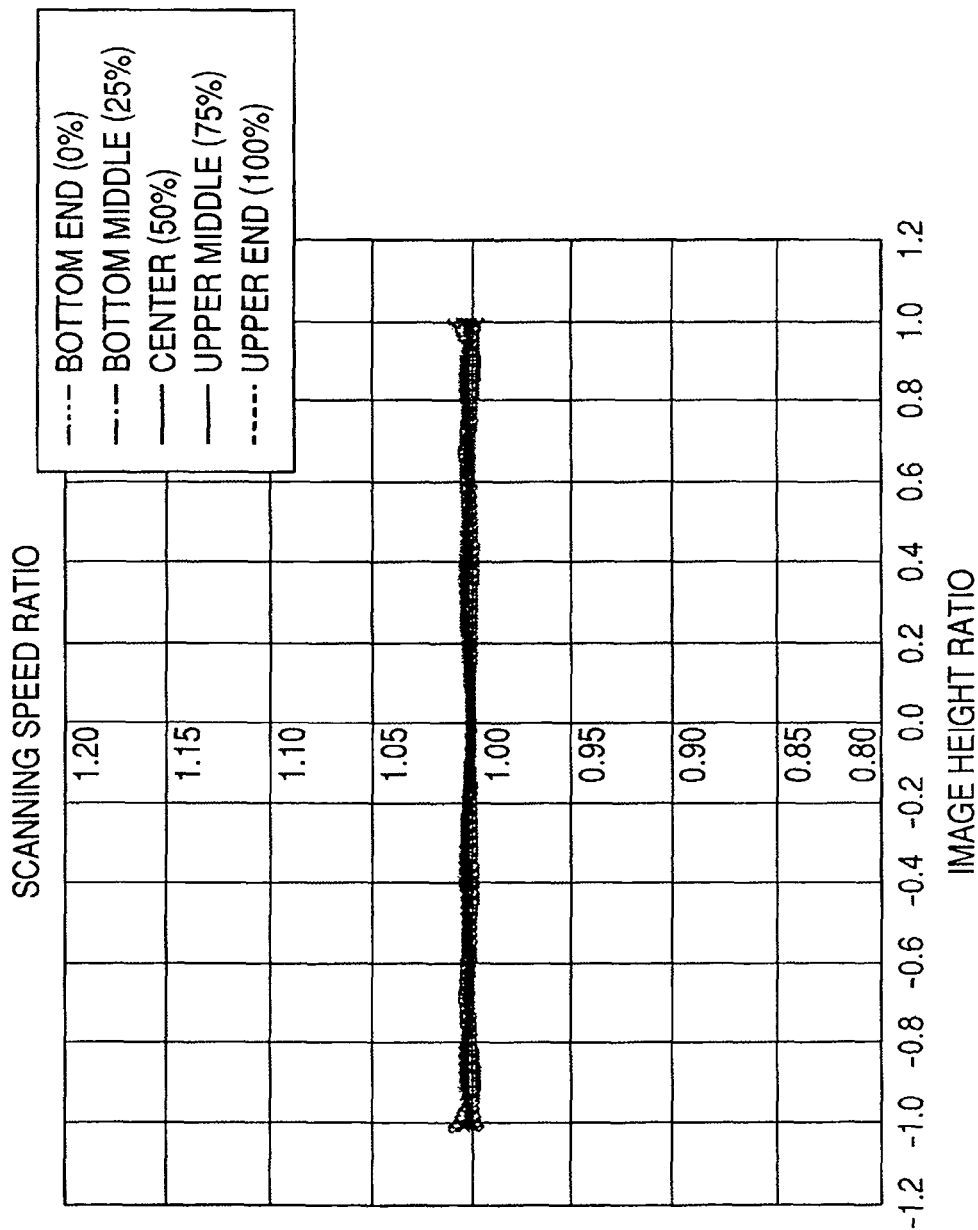
FIG. 44 is a main part schematic diagram of the scanning speed ratio in the third embodiment.

Further, FIG. 44 shows the scanning speed ratio of the scanning light on the surface 307 to be scanned of the optical scanning device of the third embodiment.

This shows the scanning speed ratio in five scanning lines of the bottom end (image height 0%), the bottom middle (image height 25%), the center (image height 50%), the upper middle (image height 75%), and the upper end (image height 100%) from among the scanning lines arranged in the vertical scanning direction.

The error of the constant speed scanning property is 0.84% at the maximum, and the constant speed scanning is realized at any of the scanning lines.

In this manner, by using the "two-dimensional arcsine correction surface" for the light exit surface 306co of the lens 306, the optical scanning speed by the sine wave driving of the scanning unit and the optical scanning speed by the "two-dimensional arcsine correction surface" are cancelled out, so that the optical scanning speed on the scanning surface 307 is uniformly corrected. By arranging this shape in the vertical scanning direction, the constant speed scanning is realized for the whole scanning lines depicting the scanning image.

In this manner, the two-dimensional scanning image having no unevenness in light quantity and a high quality is obtained.

In the third embodiment, while the image signal is supplied by the electrical circuit capable of the high speed modulation of 100 (MHz), a load applied on the electrical circuit has been great even by the high speed modulation. In addition to this, conventionally, it has been necessary to give the image signal at unequal intervals in conformity with non-uniformity of the scanning speed generated by the sine wave driving, and moreover, it has been necessary to control the image signal with a precision of one fourth pixel, and therefore, a frequency four times as much has been necessary, and the load applied on the electrical circuit has been enormous.

In the third embodiment, by the effect of the two-dimensional arcsine correction surface, a highly accurate constant speed scanning correction can be made across the whole region of the scanning image, and it is, therefore, possible to give the image signal at constant intervals, so that the load on the electrical circuit can be reduced.

Figure 45:
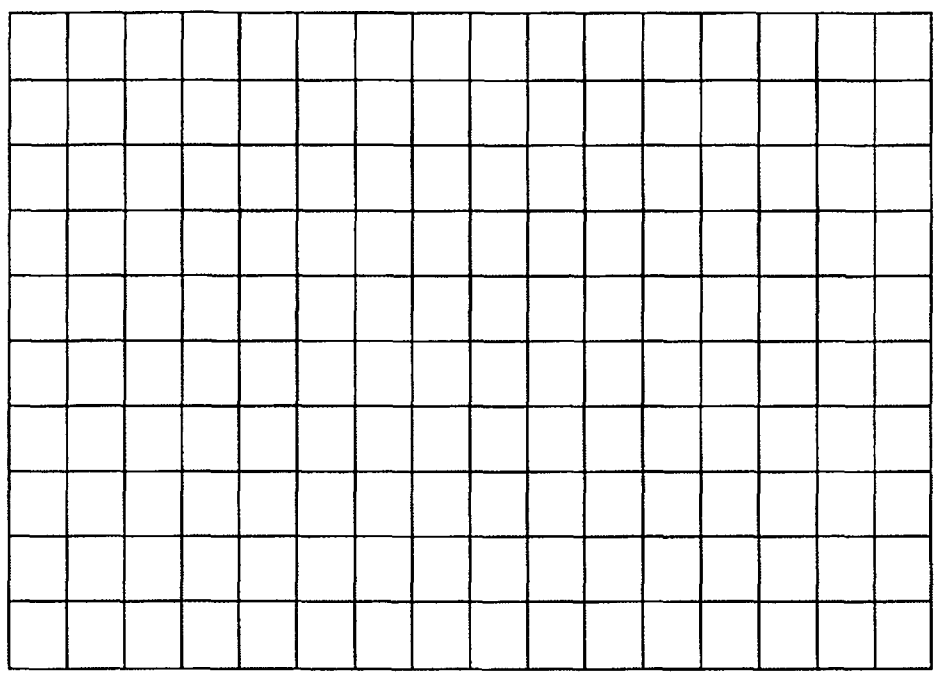
FIG. 45 is a main part schematic diagram of the scanning image (grid) in the third embodiment.

FIG. 45 shows the scanning image in the optical scanning device of the third embodiment.

It is recognized that the gratings depicted as the scanning image are lined up at equal intervals. Particularly, the vertical lines are arranged in equal intervals.

These are the vertical lines depicted by turning on the light source at equal time intervals during the horizontal scanning of the first time, and since the vertical lines are arranged spatially at equal intervals, the effect of the constant speed scanning property is exerted.

Further, in Table 7 is shown the values of the TV distortion and the trapezoidal distortion.

The TV distortion is 0.03% at the upper side, 0.00% at the bottom side, 0.01% at the left side, and −0.01% at the right side, while the trapezoidal distortion is 0.00% at the upper end, 0.00% at the bottom side, −0.01% at the left side, and 0.01% at the right side, and the TV distortion and the trapezoidal distortion are suitably corrected.

Further, in the optical scanning device of the third embodiment also, assuming θd1 be the view of angle in the horizontal scanning direction which is the first scanning direction, θd2 be the view of angle in the vertical scanning direction which is the second scanning direction, Wi1 be the width in the first scanning direction of the image displayed on the scanning surface, Wi2 be the width in the second scanning direction, θd2/θd1 can be expressed as follows, $$\frac{\theta d2}{\theta d1} = 0.35 \times \frac{Wi2}{Wi1}$$

this shows that θd2/θd1 satisfies the conditional expression (3).

In this manner, when the field angle in the vertical scanning direction which is the second scanning direction is set small, the trapezoidal distortion by the oblique projection can be easily corrected. Further, in case the optical path is folded in the vertical scanning direction by the mirrors 306a and 306b of the two-dimensional scanning optical system 306, the miniaturization of the two-dimensional scanning optical system 306 can be attempted. Assuming Dx be the width in the horizontal direction of the two-dimensional scanning optical system 306, Dy be the width in the vertical scanning direction, and Dz be the width in the z axial direction which is vertical to the horizontal scanning direction and the vertical scanning direction, Dx=39.84 (mm)

Dy=14.39 (mm)

Dz=22.49 (mm)

which satisfy the Formulas (4) to (6). Further, the distance Ld in the z axis direction from the position nearest to the scanning surface 307 to the position nearest to the scanning surface of the two-dimensional scanning optical system 306 from among the scanning units 305 is, Ld=40.87 (mm)

which satisfies the condition of the Formula (7).

By these Formulas, the two-dimensional scanning system becomes extremely compact, and there is a merit that the image display apparatus mounting this two-dimensional system can be miniaturized.

In this manner, by using two free-form curved surface mirrors 306a and 306b and the lens 306c having the two-dimensional arcsine correction surface as the two-dimensional scanning optical system 306, the two-dimensional constant speed scanning and the scanning distortion correction are made compatible.

Further, the nearer to the scanning surface 307, the larger the effective portion of the optical surface becomes with the deflected light beam of each field angle broadened. At this time, in case the reflecting surface is used, in order to avoid interference of the optical path and due to necessity of decentering the disposition of the optical path, the size of the effective portion sharply affects the size in the optical axis direction (z axis direction) of the scanning optical system 306. The third embodiment is hardly affected by the size of the effective portion, and constitutes the scanning optical system compactly.

Further, by making the lens 306c into a meniscus shape, the optical power is canceled so that a light exit direction only can be freely set. Hence, the final surface of the scanning optical system 306 is configured as a refracting surface, and its surface is taken as the "two-dimensional arcsine correction surface", thereby effectively performing the arcsine correction.

In the third embodiment, the lens 306c is disposed at the nearest side to the scanning surface 307 of the scanning optical system 306. The light exit surface of the lens 306c is configured as the "two-dimensional arcsine correction surface", and is configured as a meniscus shape with the concave surface directed to the side of the scanning surface 307 in the horizontal scanning direction.

In this manner, in all the scanning lines which are arranged in plurality, the constant speed scanning property is accurately realized, and the two-dimensional scanning image without unevenness in light quantity, positional shifts of pixels, and scanning distortion and having always a high appearance quality are obtained.

In the optical scanning device in the third embodiment, in the scanning direction in which the reference light beam obliquely enters the screen, while the angle by which all the light beams are incident on the screen has been taken as not less than 0.00(deg), it is not limited to this, and even with a deflected light beam incident at a minus angle, the effect of the present invention can be sufficiently obtained.

Figure 46:
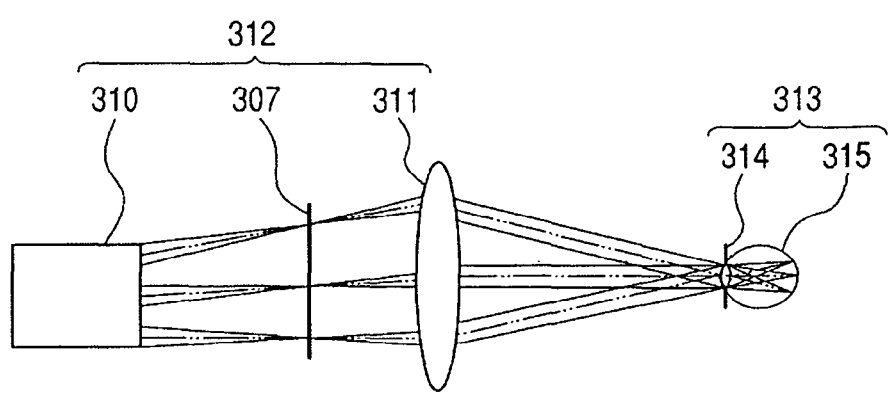
FIG. 46 is a main part schematic diagram of the scanning type image display apparatus in the third embodiment.

FIG. 46 shows a schematic illustration of a retinal scanning type display apparatus optically scanning on the retina of an eyeball and displaying an image thereof.

In the first to third embodiments, while the optical scanning device having the two-dimensional scanning optical system using a projector has been cited as an example, it is not limited to this, and for example, the finder shown in FIG. 46 and the retina scanning type display apparatus for HMD (Head Mounted Display) may be used. In the Figure, reference numeral 310 denotes an optical scanning device of the present invention, and a transmission diffusion plate 307 serving as a scanning surface is optically scanned with the light beam from an unillustrated light source unit, thereby forming a scanning image. The diffusion light beam from the transmission diffusion plate 307 is guided to an eye 313 of the observer by using an ocular optical system 311, and is image-formed on the retina 315 through a pupil 314.

In this manner, the retina 315 on the eye 313 of the observer is optically scanned, thereby displaying the scanning image. Even when the optical scanning device of the present invention is used for this retina scanning display apparatus, the effect of the invention can be sufficiently obtained.

TABLE 1

Constitution of Scanning optical system

| Optical element | Surface | Surface shape | Ry | Rx | Thickness | Nd | vd | Coordinates (mm) x | y | z | Inclination (deg) A | b | c |
|---|---|---|---|---|---|---|---|---|---|---|---|---|---|
| Convergent light beam converting optical system 104 | Light incident surface | Spherical surface | 62.76 | 62.76 | 2.00 | 1.51633 | 64.1 | | | | | | |
| | Light exit surface | Flat surface | Flat | Flat | | | | | | | | | |
| First deflector 105a | Reflecting surface | Flat surface | Flat | Flat | | | | 0.00 | 0.00 | 0.00 | −28.00 | 0.00 | 0.00 |
| Second deflector 105b | Reflecting surface | Flat surface | Flat | Flat | | | | 0.00 | 5.80 | −3.91 | 157.75 | 0.00 | 000 |
| First scanning mirror 106a | Reflecting surface | XY polynomial equation | Flat* | Flat* | | | | 0.00 | 5.68 | 11.97 | 64.41 | 0.00 | 0.00 |
| Second scanning mirror 106b | Reflecting surface | XY polynomial equation | Flat* | Flat* | | | | 0.00 | −22.97 | 27.63 | 57.36 | 0.00 | 0.00 |
| Scanning lens 106c | Light incident surface | XY polynomial equation | Flat* | Flat* | | 1.52996 | 55.8 | 0.00 | 15.18 | −1.79 | 63.45 | 0.00 | 0.00 |
| | Light exit surface | XY polynomial equation | Flat* | Flat* | | | | 0.00 | 13.10 | 1.11 | 79.25 | 0.00 | 0.00 |
| Surface to be scanned 107 | Flat | | Flat | Flat | | | | 0.00 | −8.45 | 278.00 | 0.00 | 0.00 | 0.00 |

*mark denotes non-spherical shape, and indicates semi-diameter of base curved surface.

XY polynomial coefficient

| Optical surface | Light Exit direction | K | $C_{01}$ | $C_{02}$ | $C_{03}$ | $C_{04}$ | $C_{05}$ |
|---|---|---|---|---|---|---|---|
| First scanning mirror reflecting surface 106a | Minus side | 0.00000E+00 | 2.24329E−01 | −3.19137E−03 | 9.61433E−06 | 4.99269E−07 | 1.06115E−06 |
| | | $C_{09}$ 0.00000E+00 | $C_{0f}$ 0.00000E+00 | $C_{20}$ 2.17620E−03 | $C_{21}$ 4.14949E−04 | $C_{22}$ 3.63663E−05 | $C_{23}$ −2.34930E−06 |
| | | $C_{27}$ 0.00000E+00 | $C_{28}$ 0.00000E+00 | $C_{40}$ −1.81554E−05 | $C_{41}$ −1.44138E−06 | $C_{42}$ −5.23084E−07 | $C_{43}$ 8.72678E−08 |
| | | $C_{60}$ 4.17424E−07 | $C_{61}$ 3.35431E−08 | $C_{62}$ 2.45508E−09 | $C_{63}$ 0.00000E+00 | $C_{64}$ 0.00000E+00 | $C_{80}$ −1.42400E−09 |

| Optical surface | Light Exit direction | K | $C_{01}$ | $C_{02}$ | $C_{03}$ | $C_{04}$ | $C_{05}$ |
|---|---|---|---|---|---|---|---|
| Second scanning mirror reflecting surface 106b | Plus side | 0.00000E+00 | 4.60182E−01 | −1.07757E−02 | 2.51018E−04 | −2.00235E−05 | 6.73543E−07 |
| | | $C_{09}$ 0.00000E+00 | $C_{0f}$ 0.00000E+00 | $C_{20}$ −4.76994E−03 | $C_{21}$ 5.47292E−05 | $C_{22}$ 3.02652E−07 | $C_{23}$ 6.48617E−07 |
| | | $C_{27}$ 0.00000E+00 | $C_{28}$ 0.00000E+00 | $C_{40}$ −4.23231E−06 | $C_{41}$ 1.60060E−07 | $C_{42}$ −3.76665E−08 | $C_{43}$ 4.63134E−10 |
| | | $C_{60}$ 1.53896E−08 | $C_{61}$ 7.93136E−09 | $C_{62}$ −1.50342E−10 | $C_{63}$ 0.00000E+00 | $C_{64}$ 0.00000E+00 | $C_{80}$ −1.91289E−10 |

| Optical surface | Light Exit direction | K | $C_{01}$ | $C_{02}$ | $C_{03}$ | $C_{04}$ | $C_{05}$ |
|---|---|---|---|---|---|---|---|
| Scanning Lens Light incident surface 106ci | Plus side | 0.00000E+00 | 2.24267E−01 | 7.47247E−03 | −1.19278E−04 | −1.01762E−05 | 9.66693E−08 |
| | | $C_{09}$ 5.94180E−16 | $C_{0f}$ 8.08057E−19 | $C_{20}$ 5.45187E−03 | $C_{21}$ 2.11752E−04 | $C_{22}$ −2.03713E−06 | $C_{23}$ −7.28374E−08 |
| | | $C_{27}$ 1.72743E−14 | $C_{28}$ 1.57218E−16 | $C_{40}$ 8.08886E−05 | $C_{41}$ 1.58917E−07 | $C_{42}$ −1.38139E−08 | $C_{43}$ 1.06674E−10 |
| | | $C_{60}$ −2.83013E−09 | $C_{61}$ 3.93676E−11 | $C_{62}$ −3.93763E−12 | $C_{63}$ −3.01350E−14 | $C_{64}$ −3.97435E−16 | $C_{80}$ −2.30219E−11 |

| Optical surface | Light Exit direction | K | $C_{01}$ | $C_{02}$ | $C_{03}$ | $C_{04}$ | $C_{05}$ |
|---|---|---|---|---|---|---|---|
| Scanning Lens Light Exit surface 106co | Plus side | 0.00000E+00 | 2.04575E−02 | −1.47092E−02 | −2.55064E−04 | −1.70181E−06 | 2.41944E−07 |
| | | $C_{09}$ −8.44978E−15 | $C_{0f}$ 4.62696E−17 | $C_{20}$ −3.26515E−05 | $C_{21}$ −2.71223E−04 | $C_{22}$ −7.63765E−06 | $C_{23}$ 9.96845E−08 |
| | | $C_{27}$ −1.98513E−14 | $C_{28}$ −4.63868E−16 | $C_{40}$ 6.99536E−05 | $C_{41}$ −1.35477E−07 | $C_{42}$ −1.22392E−08 | $C_{43}$ 2.17085E−10 |
| | | $C_{60}$ 1.17737E−07 | $C_{61}$ 7.21209E−10 | $C_{62}$ −2.12685E−12 | $C_{63}$ 4.17795E−13 | $C_{64}$ −2.83597E−15 | $C_{80}$ 5.47179E−11 |

TABLE 1-continued

| Optical surface | Light Exit direction | $C_{06}$ | $C_{07}$ | $C_{08}$ |
|---|---|---|---|---|
| First scanning mirror reflecting surface 106a | Minus side | −1.72317E−07 | 1.67522E−08 | −8.27458E−10 |
| | | $C_{24}$ | $C_{25}$ | $C_{26}$ |
| | | 4.60847E−07 | −3.19559E−08 | 8.75670E−10 |
| | | $C_{44}$ | $C_{45}$ | $C_{46}$ |
| | | −7.56779E−09 | 0.00000E+00 | 0.00000E+00 |
| | | $C_{81}$ | $C_{82}$ | $C_{r0}$ |
| | | 0.00000E+00 | 0.00000E+00 | 0.00000E+00 |

| Optical surface | Light Exit direction | $C_{06}$ | $C_{07}$ | $C_{08}$ |
|---|---|---|---|---|
| Second scanning mirror reflecting surface 106b | Plus side | −7.78117E−09 | 1.94070E−11 | −3.44725E−13 |
| | | $C_{24}$ | $C_{25}$ | $C_{26}$ |
| | | −1.11895E−08 | −1.02675E−10 | 1.34573E−12 |
| | | $C_{44}$ | $C_{45}$ | $C_{46}$ |
| | | 9.43830E−12 | 0.00000E+00 | 0.00000E+00 |
| | | $C_{81}$ | $C_{82}$ | $C_{r0}$ |
| | | 0.00000E+00 | 0.00000E+00 | 0.00000E+00 |

| Optical surface | Light Exit direction | $C_{06}$ | $C_{07}$ | $C_{08}$ |
|---|---|---|---|---|
| Scanning Lens Light incident surface 106ci | Plus side | 4.81813E−09 | −5.91237E−12 | −3.52934E−13 |
| | | $C_{24}$ | $C_{25}$ | $C_{26}$ |
| | | 1.48071E−09 | 1.89391E−11 | −1.66738E−12 |
| | | $C_{44}$ | $C_{45}$ | $C_{46}$ |
| | | −3.06231E−12 | −8.86975E−14 | 1.79462E−15 |
| | | $C_{81}$ | $C_{82}$ | $C_{r0}$ |
| | | −2.45473E−12 | 3.11770E−14 | −3.78012E−15 |

| Optical surface | Light Exit direction | $C_{06}$ | $C_{07}$ | $C_{08}$ |
|---|---|---|---|---|
| Scanning Lens Light Exit surface 106co | Plus side | 5.59845E−09 | 2.33313E−11 | −1.36357E−13 |
| | | $C_{24}$ | $C_{25}$ | $C_{26}$ |
| | | −1.65288E−09 | 3.50823E−11 | −167956E−13 |
| | | $C_{44}$ | $C_{45}$ | $C_{46}$ |
| | | −4.13816E−12 | 6.02278E−15 | 7.01612E−16 |
| | | $C_{81}$ | $C_{82}$ | $C_{r0}$ |
| | | −3.74514E−14 | −2.42512E−14 | 2.01566E−13 |

TABLE 2

SCANNING DISTORTION

| | TV-Dist | Trapezoidal distortion |
|---|---|---|
| Upper side | −0.01% | 0.00% |
| Lower side | −0.01% | 0.00% |
| Left side | 0.00% | 0.00% |
| Right side | 0.00% | 0.00% |

TABLE 3

SCANNING DISTORTION

| | TV-Dist | Trapezoidal distortion |
|---|---|---|
| Upper side | 7.55% | 0.00% |
| Lower side | 6.49% | 0.00% |
| Left side | −0.84% | −2.01% |
| Right side | 0.84% | 2.01% |

TABLE 4

Constitution of Scanning optical system

| | | | | | | | | Surface vertex coordinates | | | | | |
|---|---|---|---|---|---|---|---|---|---|---|---|---|---|
| | | | | | | | | Coordinates (mm) | | | Inclination (deg) | | |
| Optical element | Surface | Surface shape | Ry | Rx | Thickness | Nd | vd | x | y | z | a | b | c |
| Convergent light beam converting optical system 204 | Light incident surface | Spherical surface | 81.63 | 70.09 | 2.00 | 1.51633 | 64.1 | | | | | | |
| | Light exit surface | Flat surface | Flat | Flat | | | | 0.00 | 0.00 | 0.00 | 20.00 | 0.00 | 0.00 |
| First deflector 205a | Reflecting surface | Flat surface | Flat | Flat | | | | 0.00 | −4.50 | −5.36 | 170.36 | 0.00 | 0.00 |
| Second deflector 205b | Reflecting surface | Flat surface | Flat | Flat | | | | 0.00 | −22.25 | 43.72 | −97.63 | 0.00 | 0.00 |
| First scanning mirror 206a | Reflecting surface | XY polynomial equation | Flat* | Flat* | | | | 0.00 | 2.64 | 57.62 | 89.76 | 0.00 | 0.00 |
| Second scanning mirror 206b | Reflecting surface | XY polynomial equation | Flat* | Flat* | | | | | | | | | |

TABLE 4-continued

| | | | | | | | | | | |
|---|---|---|---|---|---|---|---|---|---|---|
| Third scanning lens 206c | Light incident surface | XY polynomial equation | Flat* | Flat* | | 0.00 | −12.61 | 24.45 | 75.91 | 0.00 | 0.00 |
| Surface to be scanned 207 | | Flat | Flat | Flat | | 0.00 | −7.89 | 320.00 | 0.00 | 0.00 | 0.00 |

*mark denotes non-spherical shape, and indicates semi-diameter of base curved surface.

XY polynomial coefficient

| Optical surface | Light Exit direction | K | $C_{01}$ | $C_{02}$ | $C_{03}$ | $C_{04}$ | $C_{05}$ |
|---|---|---|---|---|---|---|---|
| First scanning mirror reflecting surface 206a | Minus side | 0.00000E+00 | 0.00000E+00 | 6.90677E−04 | −2.96381E−05 | −1.68234E−07 | −1.01547E−09 |
| | | $C_{09}$ | $C_{0r}$ | $C_{20}$ | $C_{21}$ | $C_{22}$ | $C_{23}$ |
| | | 0.00000E+00 | 0.00000E+00 | −5.48839E+04 | −8.96708E−05 | 1.14808E−06 | −1.65079E−08 |
| | | $C_{27}$ | $C_{28}$ | $C_{40}$ | $C_{41}$ | $C_{42}$ | $C_{43}$ |
| | | 0.00000E+00 | 0.00000E+00 | 6.24077E−06 | 1.98789E−08 | −1.12297E−08 | 1.20910E−10 |
| | | $C_{60}$ | $C_{61}$ | $C_{62}$ | $C_{63}$ | $C_{64}$ | $C_{80}$ |
| | | −4.76616E−08 | 1.01963E−09 | 7.24062E−11 | 0.00000E+00 | 0.00000E+00 | 1.25478E−10 |

| Optical surface | Light Exit direction | K | $C_{01}$ | $C_{02}$ | $C_{03}$ | $C_{04}$ | $C_{05}$ |
|---|---|---|---|---|---|---|---|
| Second scanning mirror reflecting surface 206b | Minus side | 0.00000E+00 | 0.00000E+00 | 1.09863E−02 | −3.46656E−04 | 3.10271E−06 | −1.814501E−09 |
| | | $C_{09}$ | $C_{0r}$ | $C_{20}$ | $C_{21}$ | $C_{22}$ | $C_{23}$ |
| | | 0.00000E+00 | 0.00000E+00 | 6.34366E−04 | −2.06945E−04 | 5.10969E−06 | −4.27537E−08 |
| | | $C_{27}$ | $C_{28}$ | $C_{40}$ | $C_{41}$ | $C_{42}$ | $C_{43}$ |
| | | 0.00000E+00 | 0.00000E+00 | 1.11875E−06 | 1.46998E−08 | 1.09368E−09 | −4.53812E−12 |
| | | $C_{60}$ | $C_{61}$ | $C_{62}$ | $C_{63}$ | $C_{64}$ | $C_{80}$ |
| | | 3.78737E−09 | 3.17814E−11 | −1.20471E−12 | 0.00000E+00 | 0.00000E+00 | −3.43161E−12 |

| Optical surface | Light Exit direction | K | $C_{01}$ | $C_{02}$ | $C_{03}$ | $C_{04}$ | $C_{05}$ |
|---|---|---|---|---|---|---|---|
| Third scanning mirror reflecting surface 206c | Plus side | 0.00000E+00 | 0.00000E+00 | −4.64756E−03 | 3.57109E−05 | −5.60662E−07 | −4.67436E−08 |
| | | $C_{09}$ | $C_{0r}$ | $C_{20}$ | $C_{21}$ | $C_{22}$ | $C_{23}$ |
| | | 0.00000E+00 | 0.00000E+00 | −1.99767E−04 | 4.46640E−05 | 2.58436E−07 | −3.32490E−09 |
| | | $C_{27}$ | $C_{28}$ | $C_{40}$ | $C_{41}$ | $C_{42}$ | $C_{43}$ |
| | | 0.00000E+00 | 0.00000E+00 | 1.64946E−06 | 4.83303E−08 | 8.10533E−10 | 1.17962E−11 |
| | | $C_{60}$ | $C_{61}$ | $C_{62}$ | $C_{63}$ | $C_{64}$ | $C_{80}$ |
| | | −5.34556E−10 | −4.24934E 11 | −5.24208E 13 | 0.00000E+00 | 0.00000E+00 | 1.49892E 13 |

| Optical surface | Light Exit direction | $C_{06}$ | $C_{07}$ | $C_{08}$ |
|---|---|---|---|---|
| First scanning mirror reflecting surface 206a | Minus side | 3.88639E−11 | 2.90014E−13 | −1.33131E−14 |
| | | $C_{24}$ | $C_{25}$ | $C_{26}$ |
| | | −9.57883E−10 | 4.04238E−12 | 3.79479E−13 |
| | | $C_{44}$ | $C_{45}$ | $C_{46}$ |
| | | −7.46986E−13 | 0.00000E+00 | 0.00000E+00 |
| | | $C_{81}$ | $C_{82}$ | $C_{r0}$ |
| | | 0.00000E+00 | 0.00000E+00 | 0.00000E+00 |

| Optical surface | Light Exit direction | $C_{06}$ | $C_{07}$ | $C_{08}$ |
|---|---|---|---|---|
| Second scanning mirror reflecting surface 206b | Minus side | −8.00015E−11 | 1.82438E−13 | −2.86708E−15 |
| | | $C_{24}$ | $C_{25}$ | $C_{26}$ |
| | | −1.30546E−10 | −7.97409E−13 | 2.90835E−14 |
| | | $C_{44}$ | $C_{45}$ | $C_{46}$ |
| | | 2.02151E−13 | 0.00000E−00 | 0.00000E+00 |
| | | $C_{81}$ | $C_{82}$ | $C_{r0}$ |
| | | 0.00000E+00 | 0.00000E−00 | 0.00000E+00 |

| Optical surface | Light Exit direction | $C_{06}$ | $C_{07}$ | $C_{08}$ |
|---|---|---|---|---|
| Third scanning mirror reflecting surface 206c | Plus side | −2.04677E−09 | −2.81007E−11 | 6.62185E−13 |
| | | $C_{24}$ | $C_{25}$ | $C_{26}$ |
| | | 9.51584E−10 | 5.80058E−11 | 1.59446E−12 |
| | | $C_{44}$ | $C_{45}$ | $C_{46}$ |
| | | −4.75222E−14 | 0.00000E+00 | 0.00000E+00 |
| | | $C_{81}$ | $C_{82}$ | $C_{r0}$ |
| | | 0.00000E+00 | 0.00000E+00 | 0.00000E+00 |

TABLE 5

| | SCANNING DISTORTION | |
|---|---|---|
| | TV-Dist | Trapezoidal distortion |
| Upper side | −0.07% | 0.00% |
| Lower side | 0.02% | 0.00% |
| Left side | −0.02% | −0.08% |
| Right side | 0.02% | 0.08% |

TABLE 6

Constitution of Scanning optical system

| | | | | | | | | Surface vertex coordinates | | | | | |
|---|---|---|---|---|---|---|---|---|---|---|---|---|---|
| | | | | | | | | Coordinates (mm) | | | Inclination (deg) | | |
| Optical element | Surface | Surface shape | Ry | Rx | Thickness | Nd | vd | x | y | z | a | b | c |
| Convergent light beam converting optical system 304 | Light incident surface | Spherical surface | 65.05 | 65.05 | 2.00 | 1.51633 | 64.1 | | | | | | |
| | Light exit surface | Flat surface | Flat | Flat | | | | | | | | | |
| Deflector 305 | Reflecting surface | Flat surface | Flat | Flat | | | | 0.00 | 0.00 | 0.00 | −30.38 | 0.00 | 0.00 |
| Folded mirror 309 | Reflecting surface | Flat surface | Flat | Flat | | | | 0.00 | 5.80 | −3.91 | 153.00 | 0.00 | 0.00 |
| First scanning mirror 306a | Reflecting surface | XY polynomial equation | Flat* | Flat* | | | | 0.00 | 7.64 | 16.50 | 63.22 | 0.00 | 0.00 |
| Second scanning mirror 306b | Reflecting surface | XY polynomial equation | Flat* | Flat* | | | | 0.00 | −23.85 | 26.17 | 37.62 | 0.00 | 0.00 |
| Scanning lens 306c | Light incident surface | XY polynomial equation | Flat* | Flat* | | 1.52996 | 55.8 | 0.00 | 14.27 | 1.29 | 63.43 | 0.00 | 0.00 |
| | Light exit surface | XY polynomial equation | Flat* | Flat* | | | | 0.00 | 12.22 | 0.43 | 82.67 | 0.00 | 0.00 |
| Surface to be scanned 307 | | Flat | Flat | Flat | | | | 0.00 | −8.24 | 278.00 | 0.00 | 0.00 | 0.00 |

*mark denotes non-spherical shape, and indicates semi-diameter of base curved surface.

XY polynomial coefficient

| Optical surface | Light exit direction | K | $C_{01}$ | $C_{02}$ | $C_{03}$ | $C_{04}$ | $C_{05}$ |
|---|---|---|---|---|---|---|---|
| First scanning mirror reflecting surface 306a | Minus side | 0.00000E+00 | 2.31358E−01 | −6.76192E03 | 7.40891E5 | 2.22119E06 | 5.875981−08 |
| | | $C_{09}$ | $C_{0r}$ | $C_{20}$ | $C_{21}$ | $C_{22}$ | $C_{23}$ |
| | | 0.00000E+00 | 0.00000E+00 | 3.78798E−03 | 3.42316E−04 | 1.93655E−05 | 1.11122E−06 |
| | | $C_{27}$ | $C_{28}$ | $C_{40}$ | $C_{41}$ | $C_{42}$ | $C_{43}$ |
| | | 0.00000E+00 | 0.00000E+00 | −2.42695E−05 | −4.42932E−07 | −5.17233E−08 | −3.47697E−09 |
| | | $C_{60}$ | $C_{61}$ | $C_{62}$ | $C_{63}$ | $C_{64}$ | $C_{80}$ |
| | | 2.46323E−07 | 1.00623E−08 | 7.80287E−10 | 0.00000E+00 | 0.00000E+00 | −5.24739E−10 |

| Optical surface | Light exit direction | K | $C_{01}$ | $C_{02}$ | $C_{03}$ | $C_{04}$ | $C_{05}$ |
|---|---|---|---|---|---|---|---|
| Second scanning mirror reflecting surface 306b | Plus side | 0.00000E+00 | 6.67945E 01 | 2.07530E−02 | 4.41993E−05 | −2.16465E−05 | 7.26594E−07 |
| | | $C_{09}$ | $C_{0r}$ | $C_{20}$ | $C_{21}$ | $C_{22}$ | $C_{23}$ |
| | | 0.00000E+00 | 0.00000E+00 | −3.93245E−03 | 6.62856E−05 | 2.27033E−07 | 7.20399E−07 |
| | | $C_{27}$ | $C_{28}$ | $C_{40}$ | $C_{41}$ | $C_{42}$ | $C_{43}$ |
| | | 0.00000E+00 | 0.00000E+00 | −6.15282E−06 | 3.62912E−08 | −3.97955E−08 | 5.13257E−10 |
| | | $C_{60}$ | $C_{61}$ | $C_{62}$ | $C_{63}$ | $C_{64}$ | $C_{80}$ |
| | | −2.90275E−09 | 7.12330E−09 | −1.62332E−10 | 0.00000E+00 | 0.00000E+00 | −9.17926E−11 |

| Optical surface | Light exit direction | K | $C_{01}$ | $C_{02}$ | $C_{03}$ | $C_{04}$ | $C_{05}$ |
|---|---|---|---|---|---|---|---|
| Scanning lens light incident surface 306ci | Plus side | 0.00000E+00 | 2.46274E−01 | 8.26454E−03 | −1.55677E−04 | −1.01029E−05 | 1.00685E−07 |
| | | $C_{09}$ | $C_{0r}$ | $C_{20}$ | $C_{21}$ | $C_{22}$ | $C_{23}$ |
| | | 1.36601E 15 | −3.28030E−17 | 5.41385E−03 | 1.97943E−04 | −2.54569E−06 | −6.41589E−08 |
| | | $C_{27}$ | $C_{28}$ | $C_{40}$ | $C_{41}$ | $C_{42}$ | $C_{43}$ |
| | | 1.12930E−14 | 2.60357E−16 | 8.01424E−05 | 1.73167E−07 | −1.48838E−08 | 1.38504E−10 |
| | | $C_{60}$ | $C_{61}$ | $C_{62}$ | $C_{63}$ | $C_{64}$ | $C_{80}$ |
| | | −5.27431E−09 | 6.21162E−11 | −4.27319E−12 | −3.25005E−14 | −1.81312E−15 | −5.13303E−12 |

| Optical surface | Light exit direction | K | $C_{01}$ | $C_{02}$ | $C_{03}$ | $C_{04}$ | $C_{05}$ |
|---|---|---|---|---|---|---|---|
| Scanning lens Light Exit | Plus side | 0.00000E+00 | 1.33160E−03 | −1.42817E−02 | −2.22399E−04 | 1.96987E−07 | 2.22888E−07 |
| | | $C_{09}$ | $C_{0r}$ | $C_{20}$ | $C_{21}$ | $C_{22}$ | $C_{23}$ |
| | | −1.37193E−14 | −9.57102E−17 | 5.65903E−04 | −3.05849E−04 | −7.39783E−06 | 8.30384E−08 |

TABLE 6-continued

| surface 306co | $C_{27}$ −2.20637E−14 $C_{60}$ 1.22283E−07 | $C_{28}$ −4.04726E−16 $C_{61}$ 8.62307E−10 | $C_{40}$ 6.56962E−05 $C_{62}$ −7.40729E−12 | $C_{41}$ −4.58442E−08 $C_{63}$ 3.90525E−13 | $C_{42}$ −1.14875E−08 $C_{64}$ −1.95607E−15 | $C_{43}$ 1.41769E−10 $C_{80}$ 5.41165E−11 |
|---|---|---|---|---|---|---|
| | Optical surface | Light exit direction | $C_{06}$ | $C_{07}$ | $C_{08}$ | |
| | First scanning mirror reflecting surface 306a | Minus side | −1.93146E−07 $C_{24}$ 1.60745E−08 $C_{44}$ −1.81916E−09 $C_{81}$ 0.00000E+00 | 5.12144E−08 $C_{25}$ 4.19949E−09 $C_{45}$ 0.00000E+00 $C_{82}$ 0.00000E+00 | −4.05578E−09 $C_{26}$ 1.81597E−10 $C_{46}$ 0.00000E+00 $C_{r0}$ 0.00000E+00 | |
| | Optical surface | Light exit direction | $C_{06}$ | $C_{07}$ | $C_{08}$ | |
| | Second scanning mirror reflecting surface 306b | Plus side | −5.15192E−09 $C_{24}$ 9.12479E−09 $C_{44}$ 1.76175E−11 $C_{81}$ 0.00000E+00 | 3.17111E−11 $C_{25}$ −3.69050E−11 $C_{45}$ 0.00000E+00 $C_{82}$ 0.00000E+00 | −2.54944E−12 $C_{26}$ −1.11119E−12 $C_{46}$ 0.00000E+00 $C_{r0}$ 0.00000E+00 | |
| | Optical surface | Light exit direction | $C_{06}$ | $C_{07}$ | $C_{08}$ | |
| | Scanning lens light incident surface 306ci | Plus side | 4.75880E−09 $C_{24}$ 1.43092E−09 $C_{44}$ −3.41984E−12 $C_{81}$ −2.42883E−12 | −4.77031E−12 $C_{25}$ 1.41549E−11 $C_{45}$ −9.32009E−14 $C_{82}$ −4.00126E−14p | −3.73638E−13 $C_{26}$ −1.43746E−12 $C_{46}$ 2.24289E−15 $C_{r0}$ −6.86578E−15 | |
| | Optical surface | Light exit direction | $C_{06}$ | $C_{07}$ | $C_{08}$ | |
| | Scanning lens Light Exit surface 306co | Plus side | 6.08721E−09 $C_{24}$ −1.26679E−09 $C_{44}$ −2.16530E−12 $C_{81}$ 1.19668E−13 | 7.97227E−11 $C_{25}$ 2.59313E−11 $C_{45}$ −3.44788E−14 $C_{82}$ −2.64117E−14 | 1.13160E−13 $C_{26}$ −3.33630E−14 $C_{46}$ 1.22965E−15 $C_{r0}$ 1.41509E−13 | |

TABLE 7

SCANNING DISTORTION

| | TV-Dist | Trapezoidal distortion |
|---|---|---|
| Upper side | 0.03% | 0.00% |
| Lower side | 0.02% | 0.00% |
| Left side | 0.01% | −0.01% |
| Right side | −0.01% | 0.01% |

This application claims priority from Japanese Patent Application No. 2004-373920 filed Dec. 24, 2004, which is hereby incorporated by reference herein.

What is claimed is:

1. An optical scanning device, comprising:
a scanning unit scanning a scanning surface with light from a light source unit in a first direction and a second direction orthogonal to the first direction, the scanning unit comprising a deflection surface which sine-wave-drives in at least the first direction, and
an optical unit guiding the light with which scanning is performed by the scanning unit onto the scanning surface,
wherein the optical unit has an optical surface, and each of shapes of the optical surface in first and second cross sections is a shape in which an optical power to diverge a light in a peripheral portion is stronger than that in a central portion, and in which a surface curvature radius in the peripheral portion is smaller than a surface curvature radius in the central portion,
wherein the first cross section and the second cross section are parallel to the first direction, the first cross section is parallel to the second cross section, the first cross section and the second cross section are located at different locations in the second direction within the optical surface, the first cross section is located at a fixed distance from a first edge of the optical surface in the second direction, the second cross section is located at the fixed distance from a second edge of the optical surface in the second direction, and the second edge is different than the first edge, and
wherein the shapes of the optical surface in the first and second cross sections are different from each other.

2. The optical scanning device according to claim 1, wherein
said optical surface has a shape in which the second order derivative of the function representing a cross sectional shape of an arbitrary cross section in said first direction increases toward the periphery from the center.

3. The optical scanning device according to claim 1, wherein said optical unit has an arcsine characteristic in said first direction.

4. The optical scanning device according to claim 1, wherein the following conditional expression is satisfied, $$0.7 \leq \theta x max/\phi ox \leq 0.95,$$

where $\phi ox$ represents the maximum deflection angle in said first direction of said deflection surface, and $\theta x max$ represents the maximum value of the deflection angle used in the actual optical scanning.

5. The optical scanning device according to claim 1, wherein said optical surface is a curved surface of a rotational asymmetrical shape.

6. The optical scanning device according to claim 1, wherein said optical surface is a refracting surface nearest to the side of said surface to be scanned from among said optical unit.

7. The optical scanning device according to claim 1, wherein said optical surface is provided in a refracting optical element disposed nearest side to said scanning surface from among said optical unit, and said refracting optical element has a meniscus shape where the cross section in the first direction has a concave surface on the side of said scanning surface.

8. The optical scanning device according to claim 1, wherein said optical unit has a plurality of reflecting surfaces of a rotational asymmetrical shape, and said plurality of reflecting surfaces are disposed so as to fold an optical path of the light from said scanning unit in the second direction.

9. The optical scanning device according to claim 1, wherein a field angle center light beam obliquely enters said scanning surface within the plane in the second direction.

10. The optical scanning device according to claim 1, wherein the following conditional expression is satisfied, $$0.3 \times Wi2/Wi1 < \theta d2/\theta d1 < 0.9 \times Wi2/Wi1$$

where $\theta d1$ represents the whole field angle in said first direction, $\theta d2$ represents the whole field angle in said second direction, $Wi1$ represents the width in said first direction of the image displayed on said scanning surface, and $Wi2$ represents the width in said second direction.

11. The optical scanning device according to claim 1, wherein the light from said light source unit obliquely enters the deflection surface of said scanning unit within the surface in the second direction.

12. The optical scanning device according to claim 11, wherein the light from said light source unit obliquely enters the deflection surface of said scanning unit from the side where the incidence angle toward said scanning surface is small when seen by the optical path from said scanning unit to said optical unit within the surface in the second direction.

13. The optical scanning device according to claim 1, wherein said optical unit has a negative optical power, and a convergent light enters said optical system.

14. The optical scanning device according to claim 1, wherein the following conditions are satisfied, $$Dx \leq 50 \text{ (mm)}$$

$$Dy \leq 30 \text{ (mm)}$$

$$Dz \leq 50 \text{ (mm)}$$

where $Dx$ represents the width in said first direction of said optical unit, $Dy$ represents the width in said second direction of said optical unit, and $Dz$ represents the width in a third direction orthogonal to both said first direction and second direction of said optical unit.

15. An optical scanning device according to claim 1, wherein the optical unit has a f·tan $\theta$ characteristic in said second direction.

16. An optical scanning device according to claim 1, wherein a driving frequency of said scanning unit in the second direction is lower than that in the first direction.

17. An optical scanning device according to claim 1, wherein the optical surface is a reflective surface.

* * * * *

UNITED STATES PATENT AND TRADEMARK OFFICE
CERTIFICATE OF CORRECTION

| | | |
|---|---|---|
| PATENT NO. | : 7,839,552 B2 | Page 1 of 1 |
| APPLICATION NO. | : 11/317919 | |
| DATED | : November 23, 2010 | |
| INVENTOR(S) | : Ishihara | |

It is certified that error appears in the above-identified patent and that said Letters Patent is hereby corrected as shown below:

Title page, item (56) References Cited correct an error in the references as follows:

REMOVE: 6,626,542 B2   9/2003   Yamamoto et al.

INSERT: --6,626,542 B2   9/2003   BABA et al.--

Signed and Sealed this
Fifteenth Day of February, 2011

David J. Kappos
*Director of the United States Patent and Trademark Office*